United States Patent [19]
Haynes et al.

[11] Patent Number: 6,013,299
[45] Date of Patent: Jan. 11, 2000

[54] PROCESS FOR MAKING ENZYME-RESISTANT STARCH FOR REDUCED-CALORIE FLOUR REPLACER

[75] Inventors: Lynn Haynes, Morris Plains; Norbert Gimmler, Ringwood; John P. Locke, III, Woodcliff Lake; Mee-Ra Kweon, Randolph; Louise Slade; Harry Levine, both of Morris Plains, all of N.J.

[73] Assignee: Nabisco Techology Company, Wilmington, Del.

[21] Appl. No.: 08/964,224

[22] Filed: Nov. 4, 1997

[51] Int. Cl.⁷ .......................... C08B 30/12; A23L 1/105; A21D 8/02
[52] U.S. Cl. .......................... 426/549; 426/28; 426/578; 426/391; 426/496; 127/38; 127/71
[58] Field of Search .............. 426/18, 28, 578, 426/658, 661, 804, 549, 556, 622, 391, 496, 520; 127/37, 38, 58, 60, 67, 65, 71

[56] References Cited

U.S. PATENT DOCUMENTS

| | | | |
|---|---|---|---|
| H937 | 7/1991 | Sloan | 426/549 |
| 2,400,494 | 5/1946 | Fisher | 260/225 |
| 2,611,767 | 9/1952 | Allen et al. | 260/225 |
| 3,023,104 | 2/1962 | Battista | 99/1 |
| 3,493,319 | 2/1970 | Berni et al. | 8/120 |
| 3,676,150 | 7/1972 | Glicksman et al. | 99/90 |
| 3,886,295 | 5/1975 | Burke et al. | 426/548 |
| 4,042,714 | 8/1977 | Torres | 426/62 |
| 4,219,580 | 8/1980 | Torres | 426/549 |
| 4,247,568 | 1/1981 | Carrington et al. | 426/321 |
| 4,371,562 | 2/1983 | Friedman et al. | 426/656 |
| 4,377,601 | 3/1983 | Dreese et al. | 426/472 |
| 4,442,132 | 4/1984 | Kim | 426/549 |
| 4,461,782 | 7/1984 | Robbins et al. | 426/549 |
| 4,631,195 | 12/1986 | Colliopoulos et al. | 426/548 |
| 4,774,099 | 9/1988 | Feeney et al. | 426/552 |
| 4,927,654 | 5/1990 | Barnett et al. | 426/548 |
| 4,950,140 | 8/1990 | Pflaumer et al. | 424/439 |
| 4,959,466 | 9/1990 | White | 536/119 |
| 5,051,271 | 9/1991 | Lyengar et al. | 426/658 |
| 5,073,387 | 12/1991 | Whistler | 426/7 |
| 5,077,074 | 12/1991 | Van Lengerich | 426/549 |
| 5,104,669 | 4/1992 | Wolke et al. | 426/94 |
| 5,194,284 | 3/1993 | Chin et al. | 426/589 |
| 5,230,913 | 7/1993 | Klemann | 426/97 |
| 5,281,276 | 1/1994 | Chiu et al. | 127/65 |
| 5,330,779 | 7/1994 | Watanabe | 426/549 |
| 5,348,758 | 9/1994 | Fuisz et al. | 426/660 |
| 5,356,644 | 10/1994 | Hendrick et al. | 426/99 |
| 5,364,652 | 11/1994 | Ohkuma et al. | 426/549 |
| 5,370,894 | 12/1994 | Singer | 426/567 |
| 5,374,442 | 12/1994 | Harris et al. | 426/573 |
| 5,378,486 | 1/1995 | Sullivan | 426/549 |
| 5,387,426 | 2/1995 | Harris et al. | 426/573 |
| 5,391,388 | 2/1995 | Lewis et al. | 426/618 |
| 5,393,550 | 2/1995 | Tarr et al. | 426/573 |
| 5,395,640 | 3/1995 | Harris et al. | 426/573 |
| 5,445,678 | 8/1995 | Whistler | 127/67 |
| 5,472,732 | 12/1995 | Ohkuma et al. | 426/658 |
| 5,505,982 | 4/1996 | Krawczyk et al. | 426/660 |
| 5,523,111 | 6/1996 | Nickel et al. | 426/661 |
| 5,593,503 | 1/1997 | Shi et al. | 127/71 |

FOREIGN PATENT DOCUMENTS

| | | |
|---|---|---|
| B-58059/94 | 7/1994 | Australia . |
| 0 086 527 A2 | 8/1983 | European Pat. Off. . |
| 0 443 788 A1 | 8/1991 | European Pat. Off. . |
| 0 506 166 A2 | 9/1992 | European Pat. Off. . |
| 549991 | 12/1942 | United Kingdom . |
| 605912 | 8/1948 | United Kingdom . |
| WO 89/00819 | 2/1989 | WIPO . |
| WO 90/15147 | 12/1990 | WIPO . |
| WO 91/07106 | 5/1991 | WIPO . |
| WO 94/14342 | 7/1994 | WIPO . |
| WO 96/00509 | 1/1996 | WIPO . |
| WO 96/22073 | 7/1996 | WIPO . |
| WO 96/22110 | 7/1996 | WIPO . |

OTHER PUBLICATIONS

Eerlingen, Formation, Structure and Properties of Enzyme Resistant Starch, Feb. 1994, 1–135.

Gault et al., Les ethers–sels cellulosiques solubles des acides gras superieurs, *Academie des Sciences* Jul. 9, 1923, 124–127.

Huang, New perspectives on starch and starch derivatives for snack applications, *Cereal Foods World,* Aug. 1995, 1–5.

Sheppard et al., (1935) Some Properties of Cellulose Esters of Homologous Fatty Acids, *Journal of Phys. Chem.,* 39: 143–152.

Thomas et al., (1991) Subchronic Oral Toxicity of Cellulose Acetate in Rats, *Fd. Chem. Toxic.,* 29: 453–458.

Kobayashi, T., "Susceptibility of heat–moisture–treated starches to pancreatic alpha–amylase, and the formation of resistant starch by heat–moisture treatment," *Denpun–Kagaku,* 40 (3) 285–290 (1993).

(List continued on next page.)

*Primary Examiner*—Keith Hendricks

[57] ABSTRACT

An enzyme resistant starch type III which has a melting point or endothermic peak of at least about 140° C. as determined by differential scanning calorimetry (DSC) is produced in yields of at least about 25% by weight, based upon the weight of the original starch ingredient. A gelatinization stage, nucleation/propagation stage, and preferably a heat-treatment stage are used to produce reduced calorie starch-based compositions which contain the enzyme resistant starch type III. The enzyme resistant starch is produced using crystal nucleation and propagation temperatures which avoid substantial production of lower melting amylopectin crystals, lower melting amylose crystals, and lower melting amylose-lipid complexes. The nucleating temperature used is above the melting point of amylopectin crystals. The propagating temperature used is above the melting point of any amylose-lipid complexes but below the melting point of the enzyme resistant starch. Starch-based compositions comprising the high-melting RS type III of the present invention exhibit unexpectedly superior baking characteristics, such as cookie spread, golden brown color, pleasant aroma, and surface cracking which are comparable to those achieved with conventional wheat flour. The high melting point of the enzyme resistant starch, as measured by DSC, permits its use in baked good formulations without substantial loss of enzyme resistance upon baking.

37 Claims, 18 Drawing Sheets

OTHER PUBLICATIONS

Kwatra et al., (1992) Synthesis of Long Chain Fatty Acids Esterified onto Cellulose via the Vacuum–Acid Chloride Process, *Ind. Eng. Chem. Res.,* 31:2647–2651.

Tovar et al., "Steam–Cooking and Dry Heating Produce Resistant Starch in Legumes," *J. Agric. Food Chem.* 44, pp. 2642–2645 (1996).

*Starch: Properties and Potential,* T. Galliard, ed., John Wiley & Sons, p. 17 (1987).

*Cereal Chem.,* vol. 56, No. 5, p. 477 (1979).

Atwell et al., "The Terminology and Methodology Associated With Basic Starch Phenomena," *Cereal Foods World,* vol. 33, No. 3, pp. 306–311 (Mar. 1988).

AOAC, *J. Assoc. Anal. Chem.,* 68(2) p. 399 (1985).

AOAC, Official Methods of Analysis, *J. Assoc. Anal. Chem.* 15th ed. pp. 1105–1106 (1990).

Total Dietary Fiber Assay Kit, Mar. 1993 Technical Bulletin No. TDFAB–2, pp. 1–8, Sigma Chemical Company (1993).

Technical Service Bulletin for Novelose, National Starch and Chemical Company, 1994.

PROCESS FOR MAKING ENZYME-RESISTANT STARCH FOR REDUCED-CALORIE FLOUR REPLACER

FIELD OF THE INVENTION

This invention relates to the production of enzyme-resistant starch in high yield for a reduced-calorie flour replacer. Doughs and cookies containing the enzyme-resistant starch are also contemplated by the present invention. This invention also relates to reduced-calorie baked goods which contain the enzyme-resistant starch for substantial calorie reduction.

BACKGROUND OF THE INVENTION

Enzyme-resistant starch (RS) is a fraction of starch not digested in the small intestine of healthy individuals. Microflora may partially ferment certain types of resistant starch in the large bowel. According to a doctoral thesis by Relinde Eerlingen entitled "Formation, Structure and Properties of Enzyme Resistant Starch," Katholieke Universiteit te Leuven (February 1994), enzyme-resistant starch may be defined as the sum of starch and products of starch degradation not absorbed in the small intestine, and it may be classified into four types. Physically inaccessible starch, which is locked in the plant cell, is classified as type I resistant starch. It is a fraction which can be found in foodstuffs with partially milled grains and seeds and legumes. Native granular starch found in uncooked ready-to-eat starch-containing foods, such as in bananas, is classified as type II resistant starch. Enzyme susceptibility of type II resistant starch is reduced by the high density and the partial crystallinity of the granular starch. The amount of type I and type II resistant starches is generally less than about 12% by weight, based upon the total amount of uncooked or raw starch contained in the starch source. However, the type I and type II resistant starches have low melting points, do not survive a baking process, and do not exhibit good baking functionality. For example, granular starches in the presence of excess water melt at a temperature of about 80° C. to about 100° C., which is generally below baking temperatures for cookies and crackers. Additionally, yields of resistant starch substantially greater than 12% by weight of the original starch component are desirable for the mass production of baked products having substantially reduced calorie content.

Starch may be treated to obtain an indigestible starch fraction. Depending upon the type of treatment, a type III resistant starch or a type IV resistant starch may be produced. An indigestible starch fraction which forms after certain heat-moisture treatments of the starch, which may be present in, for example, cooled, cooked potatoes and canned peas or beans, is type III enzyme-resistant starch.

In type IV resistant starch, the enzyme resistance is introduced by chemically modifying or thermally modifying the starch. The modification may be the formation of glycosidic bonds, other than alpha-(1-4) or alpha-(1-6) bonds, by heat treatment. Formation of these other glycosidic bonds may reduce the availability of starch for amylolitic enzymes. These types of bonds may be present, for example, in products of caramelization and products of Maillard reactions.

U.S. Pat. No. 5,330,779 to Watanabe discloses a food additive which is slowly absorbed and digested, comprising a mixture of starches comprising a starchy material having a high amylose content and a modifier which modifies the enzymatic reaction ratio with amylase, such that it is not more than 95% digested, as compared to an unmodified starch mixture. The modifier may be a saccharide or a fatty acid compound.

U.S. Pat. Nos. 5,364,652 and 5,472,732 and European patent application publication 443,788A1 (published Aug. 28, 1991), each to Ohkuma et al., disclose the production of indigestible dextrins or pyrodextrins by heat-treating potato starch in the presence of an acid and then refining the product. According to U.S. Pat. Nos. 5,364,652 and 5,472,732, attempts to increase the amount of pyrodextrin produced by increasing the reaction time and reaction temperature result in a colored substance, release a stimulative odor, and result in a product which is not practically useful. Each of the U.S. patents and the European patent publication disclose refining of the pyrodextrin by the use of hydrolysis with alpha-amylase, followed by separation of the dextrin fraction from the digestible components by continuous chromatography with use of an ion-exchange resin.

In addition, the digestibility of starch may be reduced by cross-linking or the presence of various substituents such as hydroxypropyl groups. However, the chemical or thermal modification of the starch, which results in a type IV resistant starch, often affects the baking characteristics of the starch. In addition, chemically or thermally modified starches may exhibit undesirable flavors or colors when used in substantial amounts in baked goods. Legal limitations by the U.S. Food and Drug Administration (FDA) have also been placed upon the use of various chemically modified starches in baked goods.

However, to produce enzyme-resistant starch type III, heat-moisture treatments of the starch create crystalline regions, without the formation of glycosidic bonds other than alpha-(1-4) or alpha-(1-6) bonds. The type III resistant starch is thermally very stable, which is highly advantageous for producing reduced-calorie baked goods. If the crystal structure which provides enzyme resistance is destroyed or melts during baking, and if the crystal recrystallizes into a lower-melting form which is not enzyme resistant, then calorie reduction will not be achieved in the baked product. According to the Eerlingen dissertation, when RS type III is heated in the presence of water, an endotherm is revealed at about 150° C., with enthalpy values ranging from 8 mJ/mg to 30 mJ/mg. Heating to 180° C., it is reported, leads to partial thermal degradation of the RS chains. During cooling, an exotherm with an enthalpy value of about -22 mJ/mg, starting at about 60° C., can be observed. The exotherm has been attributed to reassociation of the resistant-starch chains.

Reported chain lengths for resistant starch type III vary between an average degree of polymerization, $DP_n$, of 22 and 65 glucose residues, with the chains being linear. Accordingly, RS type III is reported as consisting of short linear segments of alpha-glucans arranged in a crystalline structure.

To produce enzyme-resistant starch type III from native starch granules, the starch has to be gelatinized and then retrograded. Factors which affect the yield of enzyme-resistant starch type III include: amylose content of the starch, the number of autoclaving-cooling cycles used to form the RS type III, the water content of the starch, the autoclaving temperature, and the presence of complexing lipids. It has been reported that higher amylose-content starches result in increased resistant-starch yield. According to Eerlingen, high yields of more than 20% resistant starch can be obtained from autoclaved amylomaize starch containing 70% amylose. This yield, it is stated, can even be raised to levels of 40% by increasing the number of autoclaving-cooling cycles up to 20 cycles. A starch:water ratio of 1:3.5 is disclosed as providing an optimum in resistant-starch yield. The effect of autoclaving temperature upon resistant-starch yield has been reported to depend upon the starch type. According to Eerlingen, increasing the autoclaving temperature from 100° C. to 134° C. increased the RS yield for wheat starch, but did not significantly affect the yield for amylomaize starch. It is also disclosed that the formation of amylose-lipid complexes, due to the addition of an excess of complexing lipids, decreases resistant-starch yields.

Several methods are available for the in vitro determination of resistant starch. The resistant-starch levels and yields determined in vitro depend upon the method used. The methods differ in the enzymes used and the temperature-time conditions of incubation. Lower resistant-starch yields are obtained when more severe conditions are applied, such as higher incubation temperatures, longer incubation times, and higher enzyme levels. For example, in one procedure, starch is incubated for 16 hours with pancreatin at 37° C. In another procedure, known as the Prosky method, a fiber fraction is isolated in the starch samples after incubation with different enzymes, such as a heat-stable alpha-amylase at 100° C. In this residue, RS was determined as the starch available for amyloglucosidase digestion at 60° C., only after solubilization with 2N potassium hydroxide. The resistant-starch yields in the more severe or Prosky method are lower than when the first method is used. When using incubation temperatures of 100° C., the starch is gelatinized and RS type II is not quantified. Additionally, retrograded amylopectin, which exhibits a melting temperature of about 50° C., and amylose-lipid complexes, with melting temperatures in the range of 90–110° C., are easily hydrolyzed when incubated with a heat-stable alpha-amylase at 100° C. However, hydrolysis with pancreatin at 37° C., according to the first method, depends upon incubation time, enzyme-:substrate ratio, and on the degree of organization of the substrate. Additionally, retrograded amylopectin and amylose-lipid complexes, which melt above 37° C. but below 100° C., may falsely be included as a higher-melting (e.g. 150° C.) RS type III.

Thus, although Eerlingen discloses that yields of more than 20% and up to 40% of resistant starch have been obtained, these yields are apparently determined by the much less stringent method of using pancreatin at 37° C. The yields would include production of the high-melting (150° C.) RS type III as well as lower-melting retrograded amylopectin, amylose-lipid complexes, and any other starch complexes which melt above 37° C. The substantial difference in yields obtained using the two different in vitro resistant-starch determination methods is demonstrated in the Eerlingen thesis at pages 107–108. Measurement of resistant-starch contents was made using pancreatin and amyloglucosidase at 37° C. This method resulted in the measurement of the total RS content which included three types of resistant starch: physically inaccessible starch, resistant-starch granules, and retrograded starch. The total RS content (for the three types of resistant starch) was highest for high-amylose corn starch and is reported as 83.2% of dry matter. However, when the more stringent conditions used to determine dietary fiber contents (DF contents) were used (Termamyl, a thermostable alpha-amylase from Bacillus Licheniformis, at 100° C. and amyloglucosidase at 60° C.), the dietary fiber content was only 17% of dry matter. It is further concluded that the dietary fiber (DF) of the high-amylose corn starch probably consisted of very resistant starch granules or granule remnants rather than retrograded starch or resistant starch type III.

Additionally, for a sample of extruded retrograded high-amylose corn starch (ERHA), the RS content was 29.5% of dry matter, but the DF content was only 15.5% of dry matter. It was concluded that the DF of ERHA most likely consisted of retrograded amylose, because retrograded amylopectin melts at 40 to 60° C. Eerlingen further reports that the ERHA sample had a drastic impact on moisture binding, required much longer dough-mixing times, and gave significantly smaller loaf volumes, compared to control breads made with wheat flour.

According to Eerlingen, resistant-starch yields depend upon storage temperature, between the glass transition and melting temperature, and on storage time to a great extent. Nucleation, it is disclosed, is favored at temperatures far below the melting temperature of the amylose crystals but above the glass transition temperature, while propagation is limited under these conditions. However, at temperatures far above the glass transition temperature but below the melting temperature, it is disclosed, propagation is favored, while nucleation is limited.

In an attempt to obtain a maximum yield of resistant starch in a minimum of time, Eerlingen conducted nucleation at 0° C., followed by propagation at a higher temperature of 68° C. or 100° C. The greatest yields were expected for incubation at 0° C. (30 minutes), where nucleation is favored, and subsequent storage at 100° C., where propagation is favored. However, it was observed that the yield of resistant starch formed at 100° C. after incubation at 0° C. (30 minutes) did not increase significantly. It is further reported that yields did not increase even after incubation times at 100° C. Resistant-starch yield did not significantly increase, when incubation of autoclaved water-starch mixtures was conducted at 68° C., after storage at 0° C.

According to Eerlingen, the results demonstrate that to achieve a high amount of RS in a relatively short time, a two-step procedure with subsequent incubation at 0° C. and a higher temperature is not the best way to proceed. A higher amount of resistant starch (about 10% RS for wheat starch) can be obtained by a single-step procedure at 100° C., but storage times of three days or more are necessary (see pages 62–68 of the Eerlingen dissertation). The enzyme-resistant starch contents were determined using the heat-stable-alpha-amylase at 100° C. and an amyloglucosidase at 60° C. Differential scanning calorimetry of the isolated RS residues showed a melting endotherm with a peak temperature at about 155° C.

U.S. Pat. No. 5,051,271 and corresponding International patent publication no. WO 91/07106 (published May 30, 1991), each to Iyengar et al., disclose the production of a retrograded starch product for use as a bulking agent, extender, or substitute for sugar, flour, or fat in foods. A starch sample is dispersed in an aqueous medium containing at least 80% by volume of water, to obtain a suspension having up to about 10% (w/v) of starch. The dispersion is then incubated at an elevated temperature of preferably about 60°–120° C. for a period of time sufficient to cause retrogradation to occur, for example, about 5 to about 10 hours. The product is then cooled and incubated at a lower temperature of about 4° to about 20° C. for about 0.5 to about 4 days. According to Iyengar et al., at this point at least 50% by weight of the starch consists of crystalline regions. The first step of the process, it is disclosed, can be accelerated by enzymatic conversion of amylopectin to amylose prior to retrogradation, because retrogradation of amylose is retarded by the presence of the amylopectin in the starch. Digestibility of the product is determined using the less stringent method which employs pancreatin with incubation at 37° C. Foods which can be formulated using the retrograded starch products, it is disclosed, include cookies, fudge, brownies, low-fat margarine spreads, and frozen desserts. The water-holding capacity of amylose, it is disclosed, was found to be 6.4 g/g. However, retrogradation and enzymatic treatment resulted in a decreased level of water-holding capacity. The water-holding capacity for retrograded amylose (RA) was found to be 3.4 g/g, and was 2.0 g/g for crystalline water-insoluble enzyme-modified retrograded amylose (EMRA). The melting temperature of the retrograded amylose, as determined by differential scanning calorimetry (DSC), is not disclosed. However, cooling and incubation at 4° C. to 20° C. would promote the crystallization of amylopectin.

International patent publication no. WO 90/15147 (published Dec. 13, 1990) to Pomeranz et al. discloses the production of purified resistant-starch products having at least 50% resistant-starch content by forming a water-starch suspension wherein the ratio of starch to water is approximately 1:2 to 1:20 and heating the water-starch suspension in an autoclave at temperatures above 100° C. to ensure full starch gelatinization. The mixture is then cooled to allow amylose retrogradation to take place. As indicated in Example 1, autoclaving was at either 121° C., 134° C., or 148° C. Each of the samples was allowed to cool to room temperature overnight for the retrogradation to take place. It is reported that best results were obtained at a temperature of 134° C., with four heating and cooling cycles and a starch:water ratio of 1:3.5. The resistant starch is purified by comminuting the starch gel and mixing it with an amylase to digest non-resistant starch fractions, leaving resistant starch. The amylase is inactivated by heat treatment above 100° C. Resistant-starch yield from amylomaize VII, using Termanyl or Takalite bacterial alpha-amylase, is reported as 16.2%, based upon the weight of the starch used to prepare the sample in Example 3, wherein one cooling cycle to room temperature overnight was utilized. It is also reported in Example 13 that cookies prepared using standard cookie flour supplemented to provide 3%, 5%, and 7% concentrations of 70% purified (i.e. after removal of 30% by weight of amylase digestible starch) resistant starch showed reduced cookie diameter and paler cookie color, compared to cookies prepared with similar levels of wheat bran or soy fiber. Both the crude, heat- and moisture-treated starch and purified resistant-starch products are reported as having a transition temperature $T_p$ (the temperature at the maximum of the endothermic melting peak) of from 149.1° C. to 154.5° C.

U.S. Pat. No. 5,281,276 to Chiu et al. discloses the preparation of a starch product containing amylase-resistant starch, by gelatinizing a slurry of a starch that contains amylose in an amount greater than 40%, treating the gelatinized starch with a debranching enzyme to effect essentially complete debranching, deactivating the enzyme, and isolating the starch product by drying, extrusion, or crystallization by the addition of salt. According to Chiu et al., the method does not require repeated cycles of gelatinization and incubation at low temperatures to produce the resistant-starch product. The starch product, it is disclosed, contains a minimum of about 15% resistant starch. The dietary fiber is determined by using the Prosky method, wherein incubation with Termanyl is conducted at 100° C. To isolate the starch product, an inorganic salt is added to the starch dispersion, and the mixture is incubated at 50° C. to 100° C. The salt acts to help draw out the water of gelatinization, it is disclosed, thereby permitting the association of the linear starch molecules and the formation of amylase-resistant starch. However, the process requires large amounts of salt, which may adversely affect taste. The salts are added to the deactivated starch slurry in a minimum of 10% of the solids content.

U.S. Pat. Nos. 5,374,442, 5,387,426, and 5,395,640, each to Harris et al., disclose the preparation of a fragmented starch precipitate for use in preparing reduced-fat foods. In the process of U.S. Pat. No. 5,395,640, a debranched amylopectin starch is precipitated and then fragmented. The debranched amylopectin starch may be derived from a starch which contains amylopectin, for example, common corn starch and waxy maize starch, by gelatinizing the starch, followed by treatment with a debranching enzyme, such as isoamylase or pullulanase, and precipitation of the debranched starch. To form the precipitate, the solution is cooled, for example, to ambient temperature, to reduce the solubility of the debranched starch. The precipitate may then be heated to about 70° C., while in contact with a liquid medium, to dissolve at least a portion of the precipitate. Reprecipitation by cooling of the suspension/solution may then be employed. Repetition of the dissolving and the reprecipitation, it is disclosed, tends to improve the temperature stability of the resulting aqueous dispersion. In Example 15, a water bath was used to heat debranched waxy maize starch to 99° C., the temperature was held there for 60 minutes, then the starch was cooled to 4° C. and held at that temperature for 60 minutes. The cycle of heating and cooling was repeated a total of eight times. DSC analysis indicated a melting-onset temperature of 46° C. to 47° C. and a melting-end temperature of 121° C. to 132° C., depending upon the number of crystallization cycles completed. It was also observed that a major peak centered at about 115° C. increased, while the size of the peak at about 85° C. was reduced, as the number of crystallization cycles increased.

In the process of U.S. Pat. No. 5,374,442, a starch having both amylose and amylopectin is gelatinized to allow preparation of pure amylose as a permeate of membrane filtration. The amylose is precipitated, recrystallized, and then fragmented to form an aqueous dispersion for use in replacing fat. The solution of amylose is allowed to form a precipitate by cooling to ambient temperature to reduce the solubility of the amylose. Subjecting the precipitate to recrystallization, by slow heating and slow cooling over a temperature range of about 50° C. to 100° C., is disclosed as making the precipitate much more stable (i.e., resistant to solubilization) at elevated temperatures.

In the process of U.S. Pat. No. 5,387,426, retrograded, hydrolyzed, heat-treated, and fragmented amylose starch is made by the sequential steps of gelatinization, retrogradation, hydrolysis, heat treatment, and fragmentation of a starch material containing amylose. The solution of gelatinized, optionally debranched starch is allowed to form a precipitate of retrograded starch by cooling from the temperature at which the starch is pasted, to reduce the solubility of the gelatinized starch. The solution, it is disclosed, is typically held at an elevated temperature, for example, 65° C. to 90° C., until substantial equilibrium is achieved between the supernatant and the precipitate. Heating of the particles (for example, to about 70° C.), it is disclosed, and then cooling of the suspension/solution tends to make the particles resistant to melting or dissolving, when an aqueous dispersion of the particles is exposed to heat in processing. In Example 1 of U.S. Pat. No. 5,387,426, a high-amylose starch was solubilized in water at about 150° C. The resulting solution was cooled to room temperature (about 25° C.) and allowed to stir for 20 hours, during which time a thick mass of crystals precipitated. The crystals were hydrolyzed in acid, and then insoluble product was isolated by centrifugation. It is reported that the DSC endotherm of the hydrolysis product was very broad, beginning at about 80° C. and ending at about 138° C. Two domains, peaking at about 100° C. and about 115° C., respectively, were reported. The material in the higher temperature domain, it is disclosed, could be isolated by washing the material with water at a temperature above 100° C., for example, from about 105° C. to about 110° C. In Example 2 of U.S. Pat. No. 5,387,426, a product having a DSC endotherm having a single domain which peaked at about 120° C. is reported.

Thus, even though the methods of Harris et al.'s U.S. Pat. Nos. 5,374,442, 5,387,426, and 5,395,640 involve subjecting starches to gelatinization, precipitation, and optionally heating and cooling cycles, the resulting retrograded amylose products are reported in the latter two patents to have DSC endothermic peaks at no more than about 120° C. The results obtained in the Harris et al. patents indicate that retrograded amylose may have melting points above 100° C. but below the approximately 150° C. melting point of RS type III. Accordingly, reported resistant-starch content or dietary fiber content, determined even by the more stringent Prosky method wherein treatment at 100° C. is utilized, may often include crystalline forms which melt substantially below the approximately 150° C. endothermic peak of RS type III.

Heat-treating of dehydrated starch for a time and at a temperature to inhibit the starch or flour is disclosed in PCT International Patent Publication Nos. WO 96/22073 and 96/22110 (each published Jul. 25, 1996). The thermally inhibited starches of WO 96/22073 are used in cosmetic compositions as emulsifiers, thickeners, and aesthetic control agents. The heat treatment, it is disclosed, improves the starch's viscosity stability when dispersed in water. The thermally inhibited starches of WO 96/22110 are used in pharmaceutical products as a diluent, filler, thickener, and the like.

Repeated heat-moisture treatment is reported as being associated with a decrease in the hydrolysis limit of pancreatic alpha-amylase and increased formation of resistant starch in Kobayashi, T., "Susceptibility of heat-moisture-treated starches to pancreatic alpha-amylase, and the formation of resistant starch by heat-moisture treatment," Denpun-Kagaku, 40 (3) pp. 285–290 (1993). However, the starch is not a heat-stable, indigestible starch.

Production of resistant starch in legumes by steam-cooking and dry-heating is disclosed in Tovar et al., "Steam-Cooking and Dry Heating Produce Resistant Starch in Legumes," J. Agric. Food Chem. 44, pp 2642–2645 (1996). Seeds were steam-cooked under pressure by placing them in an open glass flask which was then autoclaved at 121° C. for 15 minutes. This pressure treatment was also carried out in capped flasks, in order to prevent direct steam/seed contact ("dry pressure heating"). According to Tovar et al., isolates from steam-heated legumes were rich in indigestible (resistant) starch (19–31%, dmb), a fact not observed when raw seeds were used. Retrogradation, it is disclosed, is suggested as being the major mechanism behind the reduction in digestibility. Prolonged steaming, as well as short dry pressure heating, decreased the enzymatically assessed total starch content of whole beans by 2–3% (dmb), indicating that these treatments may induce formation of other types of indigestible starch.

The present invention provides a process for producing a starch-based composition comprising an enzyme-resistant starch type III which has a melting point of at least about 140° C., as determined by differential scanning calorimetry (DSC). The very high melting-point, enzyme-resistant starch may be produced on a batch, semi-continuous or continuous basis in high yields of at least about 25% by weight, based upon the weight of the original starch ingredient, as determined by the stringent Prosky method. The enzyme-resistant starch is produced under conditions to avoid discoloration, malodors, and substantial production of lower-melting amylopectin crystals, lower-melting amylose crystals, and lower-melting amylose-lipid complexes. The starch-based compositions comprising the high-melting RS type III of the present invention exhibit unexpectedly superior baking characteristics, such as enhanced cookie spread, golden brown color, pleasant aroma, and surface cracking, which are comparable to those achieved with conventional wheat flour. The water-holding capacity of the starch-based composition is comparable to that of conventional wheat flour. The high melting point of the enzyme-resistant starch, as measured by DSC, permits its use in baked good formulations without substantial loss of enzyme resistance upon baking. It may therefore be used for the production of reduced-calorie baked goods such as cookies.

The present invention also provides a method for heat-treating an enzyme-resistant starch composition. The enzyme-resistant starch composition which is subjected to the heat-treatment may comprise enzyme-resistant starch type I, II, III, or IV. The heat-treatment substantially increases the yield of enzyme-resistant starch or dietary fiber content of the composition and enhances its baking characteristics.

SUMMARY OF THE INVENTION

The present invention provides a process for producing enzyme-resistant starch type III having an endothermic melting peak of at least 140° C., preferably at least 145° C., most preferably at least about 150° C., as determined by modulated differential scanning calorimetry (MDSC). The very-high-melting, enzyme-resistant starch component is substantially unaltered by baking, that is, it remains substantially enzyme resistant and exhibits a reduced caloric value of less than about 0.5 Kcalories/gram (100% by weight RS type III, having a melting point or endothermic peak temperature of at least 140° C.), as determined by fiber analysis after baking.

Enthalpy values for the isolated high-melting enzyme-resistant starch may range from greater than about 5 Joules/g, preferably from about 8 Joules/g to about 15 Joules/g, at a temperature of from 130° C. to about 160° C. The enthalpy value may depend upon the perfection of the crystals or the presence of amorphous regions or sections in the crystal. Higher degrees of perfection and higher enthalpy values may be achieved by increasing the number of cooling and heating cycles during production of the crystals. The enzyme-resistant starch may have crystalline chains of at least about 20 glucose units, preferably at least about 100 glucose units, derived from amylose or amylopectin.

The starch may be any starch having both amylose and amylopectin, but high-amylose starches such as amylomaize starch, or legume starch, such as wrinkle pea starch, are preferred. In embodiments of the invention, brewer's spent grain may be used as a low-cost source of amylose for the production of the resistant starch type III.

The very-high-melting, enzyme-resistant starch is produced in high yield, as determined by the more stringent Prosky method for the determination of dietary fiber. High yields of the enzyme-resistant starch may be achieved on a continuous, consistent basis using relatively short crystal-nucleation and crystal-propagation times. High yields of the enzyme-resistant starch are achieved using processing conditions which avoid substantial discoloration or the production of components which impart offensive odors to the product. In addition, the production of lower-melting-point amylopectin crystals, lower-melting-point amylose crystals, and lower-melting-point amylose-lipid complexes, all of which tend to reduce yield of the high-melting resistant starch type III crystals, is substantially avoided in the process of the present invention.

In accordance with the method of the present invention, in a first stage of the process, a starch ingredient is heated in the presence of water to at least substantially, preferably completely, gelatinize the starch. The gelatinization is conducted at a temperature above the melting point of any amylose-lipid complex which may be present in the starch ingredient, but below the melting point of the enzyme-resistant starch Type III. In preferred embodiments, the starch is pasted as well as gelatinized. Exemplary starch-gelatinization temperatures which may be employed may range from about 110° C. to about 130° C. The weight ratio of starch to water may range from about 0.15:1 to about 1:1, preferably from about 0.4:1 to about 0.7:1, during gelatinization as well as during the subsequent nucleation and propagation steps.

A second stage of the process involves at least one cycle of crystal nucleation and propagation. In a critical cooling step, the gelatinized starch is cooled to a crystal nucleating temperature above the melting point of amylopectin starch. The nucleating temperature employed is also preferably not favorable to nucleation of any amylose-lipid complex which may have been present in the starch ingredient. By not cooling below the melting point of amylopectin, nucleation and growth of amylopectin crystals, which are believed to compete with or impede the nucleation and growth of high-melting amylose crystals, is avoided. Exemplary nucleating temperatures range from about 55° C. to about 100° C., preferably from about 60° C. to about 80° C. The gelatinized starch is maintained at the nucleating temperature for a period of time sufficient to nucleate a substantial amount of crystals of the high-melting point, enzyme-resistant starch. Exemplary nucleation times range from about 0.5 hours to about 3 hours. Longer nucleation times, for example up to about 24 hours, may be used but do not substantially increase yields. The rate of cooling of the gelatinized starch to the nucleating temperature should be as fast as possible and may be at least about 1° C./min, preferably at least about 3° C./min, most preferably at least about 4° C./min.

After maintaining the gelatinized starch at the nucleating temperature, the temperature of the gelatinized starch is raised above the melting point of any amylose-lipid complexes, to a crystal-propagating temperature which is below the melting point of the desired enzyme-resistant starch. Thus, any amylose-lipid complex which may have been formed during nucleation would be remelted during propagation or growth of the enzyme-resistant starch crystals. The temperature may be raised from the nucleating temperature to the crystal-propagating temperature at a rate of from at least about 1° C./min, preferably at least about 3° C./min, most preferably at least about 4° C./min to avoid any substantial propagation of undesirable crystals, such as amylose-lipid complexes. Exemplary crystal-propagating temperatures for growing crystals of the enzyme-resistant starch may range from about 115° C. to about 135° C., preferably from about 120° C. to about 130° C. Exemplary times for maintaining the temperature at the crystal-propagating temperature are generally less than about 12 hours, preferably less than about 5 hours, most preferably from about 0.5 to about 3 hours.

The steps of cooling the gelatinized starch, maintaining the gelatinized starch at the nucleating temperature, raising the temperature of the gelatinized starch to a crystal-propagating temperature, and maintaining the temperature at the crystal-propagating temperature to grow crystals may be sequentially performed in at least one cycle, preferably from two to four cycles, to increase yields of the high-melting enzyme-resistant starch. In embodiments of the invention, up to about 10 to 12 cycles may be utilized.

After the last step of crystal propagation, the gelatinized starch may be cooled to about room temperature and then dried. The temperature cycling increases yield and achieves high calorie reduction, without the need to isolate the high-melting enzyme-resistant starch type III. The dried composition may be used as a bulking agent, or flour substitute or replacer, thereby avoiding crystal solids losses and increased costs associated with isolation of the high-melting resistant starch type III.

In embodiments of the invention, a debranching enzyme such as pullulanase may be used to increase the yield of the high-melting enzyme-resistant starch type III. The debranching may occur prior to, or preferably after, a substantial amount of high-melting enzyme-resistant starch type III has been propagated.

In other embodiments of the invention, seed crystals of the high-melting enzyme-resistant starch type III may be admixed with the gelatinized starch above the melting point of amylopectin crystals and above the melting point of any amylose-lipid complexes, but below the melting point of the high-melting enzyme-resistant starch, to nucleate crystals of the enzyme-resistant starch type III.

In preferred embodiments, a third stage may be conducted, involving heat treatment of the enzyme-resistant starch type III product obtained from the second-stage nucleation/propagation temperature cycling. The heat treatment substantially increases the amount or yield of enzyme-resistant starch or total dietary fiber. The heat treatment also substantially improves the baking characteristics or baking functionality of the second-stage product. The higher enzyme-resistant starch content or dietary fiber content is achieved, without substantially adversely affecting the content of enzyme-resistant starch type III which melts at a temperature of at least about 140° C. The heat treatment is believed to increase the amorphous or non-crystalline, enzyme-resistant starch content of the second-stage product.

The heat treatment may be conducted at a temperature of from about 100° C. to about 140° C., preferably from about 125° C. to about 135° C., most preferably from about 128° C. to about 132° C. Heat-treatment times may range from about 5 minutes to about 6 hours, preferably from about 30 minutes to about 90 minutes, most preferably from about 50 minutes to about 70 minutes. The moisture content of the enzyme-resistant starch during heat treatment may be from about 1% by weight to about 30% by weight, preferably from about 14% by weight to about 24% by weight, most preferably from about 16% by weight to about 20% by weight.

In other embodiments of the invention, the heat treatment may also be used to treat other enzyme-resistant starch-containing compositions. Thus, compositions comprising enzyme-resistant starch type I, II, or IV may be subjected to the heat treatment of the present invention to increase the dietary fiber content or enzyme-resistant starch content of the compositions and to improve their baking characteristics.

The products obtained by the process of the present invention may comprise at least about 25% by weight, preferably at least 30% by weight, most preferably at least about 35% by weight, of enzyme-resistant starch type III as determined by the rigorous Prosky method. The balance of the product may comprise gelatinized, amorphous, or non-crystallized starch, a substantial portion of which may be enzyme resistant and contribute to the dietary fiber content of the resulting product.

The resulting product may be used as a bulking agent or flour substitute in the production of reduced-calorie baked goods. Even though the product contains high amounts of gelatinized starch, it exhibits excellent cookie-baking characteristics in terms of oven spread, edge contour, oil release, surface cracking, odor, color or browning, mouthfeel, and texture. It may be used alone or preferably in combination with non-gelatinized, conventional wheat flour to obtain doughs for the production of reduced-calorie baked goods such as cookies.

The doughs of the present invention comprise at least about 12.5% by weight of enzyme-resistant starch having a melting point of at least about 140° C., said weight percentage being based upon the total starch content of the dough. The amount of gelatinized starch-based bulking agent may generally be at least about 25% by weight, for example at least about 40% by weight, preferably from about 50% by weight to about 75% by weight, based upon the total weight of the gelatinized bulking agent and ungelatinized wheat flour.

In preferred embodiments, the water-holding capacity of the gelatinized, enzyme-resistant bulking agent or flour substitute is comparable to that of conventional ungelatinized wheat flour, so as to avoid excessive or too little cookie spread upon baking. In embodiments of the invention, the water-holding capacity of the resistant-starch ingredient is less than 3 grams of water per gram of dry matter. Exemplary water-holding capacities are less than about 250% by weight, and preferably range from about 100% by weight to about 200% by weight (e.g., 1 gram water/gram dry resistant-starch ingredient to 2 grams water/gram dry resistant-starch ingredient). The enthalpy of the enzyme resistant bulking agent or flour substitute used in baking, may range from about 0.5 J/g to about 4 J/g, at a temperature within the range of about 130° C. to about 160° C., generally from about 1 J/g to about 3 J/g, for example about 2.5 J/g, based upon the weight of the bulking agent or flour substitute.

DETAILED DESCRIPTION OF THE INVENTION

Figure 1A:
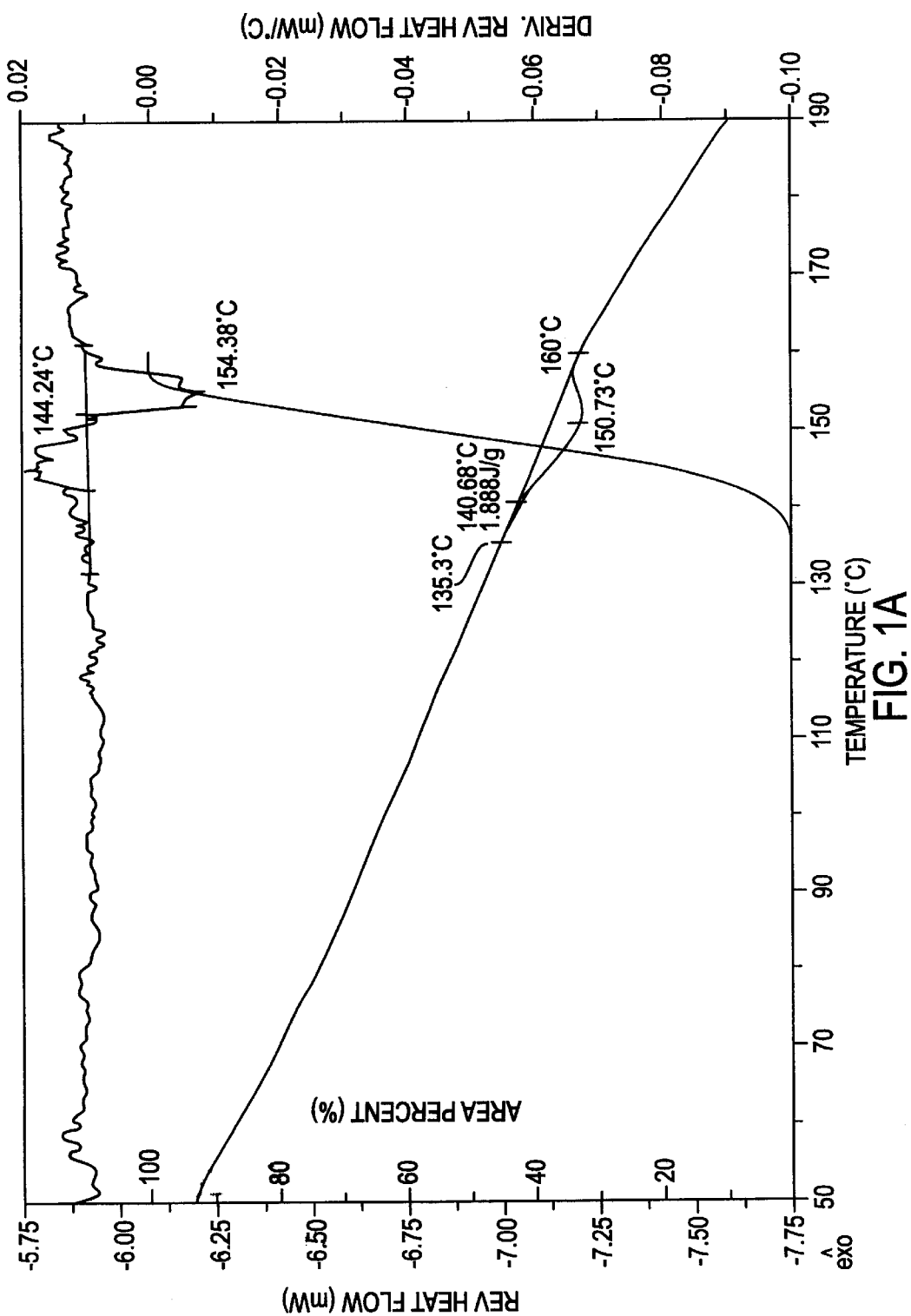
FIG. 1A shows a modulated differential scanning calorimetry (MDSC) curve for an enzyme-resistant starch type III ingredient or bulking agent, obtained in Example 1A using a nucleation temperature of about 70° C. and a propagation temperature of about 130° C., in accordance with the present invention.
Figure 1B:
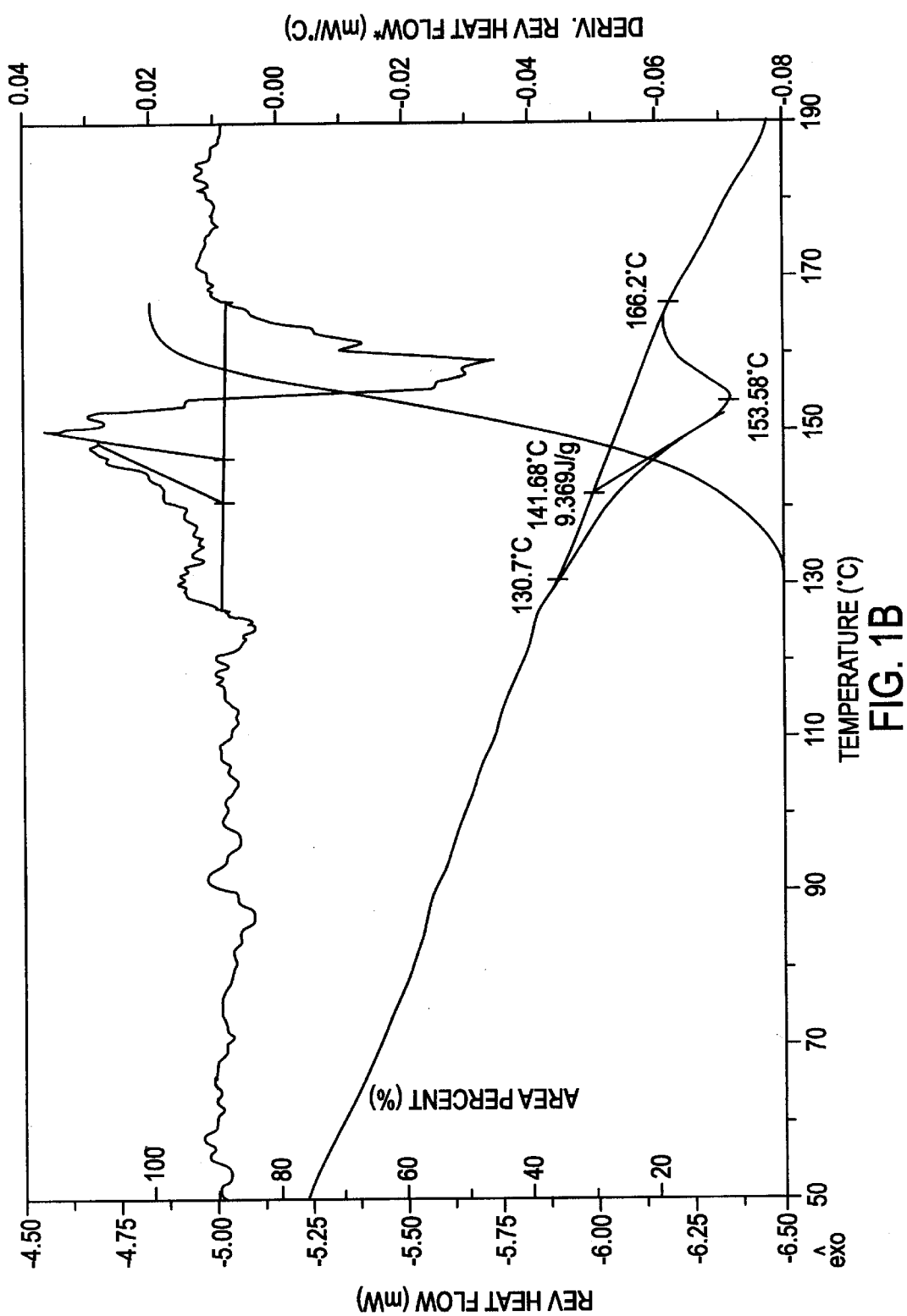
FIG. 1B shows a MDSC curve for an isolated enzyme-resistant starch type III, obtained in Example 1B, which was isolated from the ingredient or bulking agent of Example 1A.

High-melting-point, enzyme-resistant starch type III (also referred to as RS III) is obtained in high yield by using a nucleating temperature above the melting point of amylopectin crystals. The enzyme-resistant starch type III has a melting point or endothermic peak temperature of at least about 140° C., preferably at least about 145° C., most preferably at least about 150° C., as determined by modulated differential scanning calorimetry (MDSC). Exemplary MDSC curves for enzyme-resistant starch type III ingredients or bulking agents, and isolates thereof, produced in accordance with the present invention are shown in FIGS. 1A, 1B (isolate), 2A, 2B, 3, 4, 5A, 5B (isolate), 5C (isolate), 5D, 5E, and 5F (isolate). Production of the products is described in Examples 1–4 and 6. As exemplified in the Figures, the enzyme-resistant starch type III compositions of the present invention generally melt within a temperature range of about 130° C. to about 160° C. and have an endothermic peak temperature or melting point of at least about 140° C. As shown in the Figures, essentially no other peaks occur down to 50° C. or below, except in a few samples, for which a small peak may be present, indicating the presence of a small amount of amylose-lipid complexes.

The RS III is nucleated from a gelatinized starch composition which is at least substantially free of amylopectin crystals and amylose-lipid complexes, so as to increase the yield of RS type III. In accordance with the methods of the present invention, yields of RS type III may be at least about 25% by weight, preferably at least about 30% by weight, most preferably at least about 35% by weight, based upon the weight of the original or starting starch ingredient. The yields are determined by the more stringent Prosky fiber analysis. Consistently high yields may be obtained on a mass production basis in a batch process, or in a semi-continuous or continuous manner, using relatively few temperature cycles in a short period of time.

The enzyme-resistant starch type III produced in the present invention is resistant to enzymes such as α-amylase, β-amylase, amyloglucosidase, and pancreatin and provides a reduced-calorie or low-calorie, highly functional ingredient for baked goods.

The starches used in preparing the enzyme-resistant starch may be derived from any source. Exemplary of starches which may be employed are corn, potato, sweet potato, wheat, rice, sago, tapioca, waxy maize, sorghum, legume starch, brewer's spent grain, and mixtures thereof. Examples of legume starches which may be employed are pea starches, such as wrinkled pea or smooth pea starch, faba bean, mung bean, red kidney bean, and lentil bean starch. The amylose content of various cereal starches, legume starches, and root and tuber starches is disclosed, for example, in *Starch: Properties and Potential*, T. Galliard, ed., John Wiley & Sons, pg. 17 (1987) and *Cereal Chem.*, Vol. 56, No. 5, pg. 477 (1979), herein incorporated by reference in their entireties. The starch may be defatted or chemically modified, for example, converted, derivatized, or crosslinked, and still yield resistant starch. The starch may also be partially or completely pregelatinized. However, commercially available pregelatinized starches may be gelatinized at temperatures which melt or destroy crystals of naturally present resistant starch type III. Accordingly, it is generally preferable to use raw starches as starting starches in the processes of the present invention.

Starches which have high contents of amylose or high contents of amylopectins which have long, straight branch chains are preferred. The long, straight branch chains of the amylopectins function as amylose, in terms of crystallization, and analyze as amylose by the iodine test. The starting starch for use in the present invention preferably has a high content of straight chains, to provide a resistant starch having crystalline chains of at least about 20 glucose units, preferably at least about 100 glucose units, derived from amylose and/or from amylopectin.

Preferred as a starting starch is a starch containing greater than 40% amylose, preferably at least about 50% amylose, most preferably at least about 60% by weight amylose, based upon the total weight of amylose and amylopectin. The starting starch also preferably has a low lipid content, for example less than about 0.1% by weight, preferably less than about 0.05% by weight so as to avoid the production of undesirable amylose-lipid complexes. Examples of preferred starting starches for use in the present invention are amylomaize starch and wrinkled pea starch, because of their high amylose contents or high apparent amylose contents. Amylomaize may have an amylose content of about 52% by weight to about 80% by weight and a lipid content of about 0.09% by weight. The amylose content of wrinkled pea starch may be from about 63% by weight to about 75% by weight. In addition, the lipid content of wrinkled pea starch is only about 0.01% by weight, which is advantageous for avoiding the formation of amylose-lipid complexes. Commercially available high amylose-content starches which may be used as the starting starch in the processes of the present invention are HYLON V, a corn starch containing about 50% amylose, or HYLON VII, a corn starch containing about 70% amylose, both products of National Starch and Chemical Company, Bridgewater, N.J.

The starting starch may be gelatinized by admixing it with water to form an aqueous slurry at sufficient temperature and pressure to effect gelatinization. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306–311 (March 1988). In embodiments of the present invention, the starch granules of the pregelatinized starches may be at least about 90% gelatinized, preferably at least about 95% gelatinized, most preferably completely gelatinized.

In embodiments of the invention, the starting starch and water are admixed to form an aqueous starch dispersion which is heated to gelatinize the starch. If the water content is too low, gelatinization may require excessively high temperatures which may destroy or melt crystals of native or inherent resistant starch type III. Excessively high water contents during gelatinization can result in prolonged drying times for the resistant-starch composition. The weight ratio of the starch to water during gelatinization may range from about 0.15:1 to about 1:1, preferably from about 0.4:1 to about 0.7:1.

The gelatinization of the starting starch ingredient should be conducted at a temperature which is sufficiently high to melt any amylopectin crystals and amylose-liquid complexes, without substantial melting or destruction of any high-melting enzyme-resistant starch type III inherently or naturally present in the starch source. Although gelatinization may be effected by any of the methods known in the art, such as batchwise in an upright mixer, it is preferred to use a continuous process such as passing the aqueous starch mixture through a continuous mixer. In preferred embodiments, the starting starch and water may be conveyed into a low-shear continuous mixer/heat exchanger or continuous kneader/heat exchanger such as produced by LIST, Inc., Acton, Mass. The counterrotating twin screws of the LIST low shear, continuous mixer/kneader may be equipped with hook-like elements for gentle mixing and conveying of the ingredients. The jacketed barrels and the rotary shafts may be heated by an ethylene glycol heating medium or steam. In other embodiments of the invention, the starch may be gelatinized in a pressure cooker, which helps to prevent the escape of steam and thereby maintain a substantially constant starch-to-water ratio.

In embodiments where direct steam injection is used, the steam may be supplied to the LIST mixer or other mixing device at a temperature of about 212° F. to about 350° F. Supply pressures may range up to about 125 pounds per square inch. The steaming temperatures and pressures can vary depending on the equipment used. As the steam contacts the colder composition, the steam condenses and increases the water content of the composition.

In other embodiments, the gelatinization may be conducted by forcing the starch slurry through a jet-cooker. Jet-cookers are well known in the industry and consist of a cooking chamber in which the starch slurry is contacted with live steam under elevated temperatures.

Generally, the conditions which may be used for gelatinization are temperatures from about 110° C. to about 130° C., and pressures from about 1.05 kg/cm$^2$ to about 21 kg/cm$^2$ (about 15 psi to about 30 psi).

After gelatinization, the gelatinized starch is subjected to nucleation and propagation to form and grow crystals of the high-melting-point resistant starch type III. During nucleation and propagation, the weight ratio of the starch to water may be within the same range as during gelatinization. It is generally not necessary to add or remove water after the gelatinization to conduct the nucleation and propagation steps. However, adjustments in water level may be made to obtain proper viscosities for mixing and pumping of the aqueous dispersion of starch. Also, if the water content is too low, mobility of the starch molecules may be impeded, which may adversely affect nucleation and propagation. During nucleation and propagation, the starch-to-water weight ratio may be from about 0.15:1 to about 1:1, preferably from about 0.4:1 to about 0.7:1.

After gelatinization, it is critical to maintain the temperature of the gelatinized starch above the melting point of amylopectin starch to prevent the amylopectin from nucleating and propagating. Thus, for nucleation of the resistant-starch type III crystals, the gelatinized starch is cooled to a crystal-nucleating temperature which is above the melting point of amylopectin starch. The amylopectin, specifically amylopectin B crystals, has a melting point substantially below the melting point of enzyme-resistant starch type III. If the gelatinized starch is cooled below the melting point of the amylopectin, then substantial amounts of crystals of the amylopectin will tend to nucleate and propagate. The nucleation and growth of amylopectin B crystals is believed to compete with or impede the nucleation and growth of high-melting amylose crystals, and high-melting linear branches of amylopectin crystals. By maintaining the crystal-nucleation temperature above the melting point of the amylopectin B crystals, the yield and quality of the resistant starch type III crystals is substantially increased.

In addition, the nucleation is preferably conducted at a temperature which is not favorable to nucleation of amylose-lipid complexes. Thus, slow growth, if any, is maintained for the amylose lipid complexes while promoting nucleation of the high melting point RS III crystals to provide numerous growth sites for propagation of the high melting point RS III crystals of the present invention.

Exemplary enzyme-resistant starch type III nucleating temperatures which may be used in the present invention are from about 55° C. to about 100° C., preferably from about 60° C. to about 80° C. The gelatinized starch may be maintained at the nucleating temperature for a period of time which is sufficient to nucleate a substantial amount of crystals of the high-melting-point enzyme-resistant starch. Exemplary nucleation times may be from about 0.5 hours to about 3 hours. Longer nucleation times, for example up to about 24 hours, may be used. Generally, nucleation times of about 1 hour may be employed in embodiments of the present invention to obtain high yields in relatively short processing times.

The rate of cooling of the gelatinized starch to the nucleating temperature should be as fast as possible and may be at least about 1° C./min on average, preferably at least about 3° C./min on average, most preferably at least about 4° C./min on average. By cooling to the nucleation temperature rapidly, the propagation of undesirable crystal forms, such as amylose-lipid complexes, is substantially reduced or eliminated. Also, rapid cooling generally promotes the generation of large numbers of small seed crystals, rather than fewer, larger crystals.

After nucleation, the nucleated crystals of enzyme-resistant starch type III may be propagated or grown by raising the temperature of the gelatinized starch from the nucleation temperature to a crystal-propagating temperature. Propagation of the resistant starch type III crystals may be achieved at a temperature above the melting point of any amylose-lipid complexes which may have been formed during nucleation. Thus, use of a crystal-propagating temperature above the melting point of the amylose-lipid complexes remelts the complexes, thereby making more amylose available for the formation of resistant starch type III. However, the crystal-propagation temperature is maintained below the melting point of the desired crystals of enzyme-resistant starch type III to avoid melting or destroying them. The temperature is preferably raised from the nucleating temperature to the crystal-propagating temperature at a rapid rate to avoid any substantial propagation of undesirable crystals, such as amylose-lipid complexes. Exemplary heating rates which may be used are at least about 1° C./min on average, preferably at least about 3° C./min on average, most preferably at least about 4° C./min on average. Exemplary crystal-propagating temperatures for growing crystals of the enzyme-resistant starch type III may range from about 115° C. to about 135° C., preferably from about 120° C. to about 130° C. Exemplary times for maintaining the temperature at the crystal-propagating temperature are generally less than about 12 hours, preferably less than about 5 hours, most preferably from about 0.5 to about 3 hours.

Temperature cycling may be used in embodiments of the present invention to increase yields of the high-melting enzyme-resistant starch type III. The increased yield achieves higher calorie reduction, without the need to isolate the high-melting enzyme-resistant starch type III from the gelatinized, amorphous starch or lower-melting starch crystals. Thus, the steps of: 1) cooling the gelatinized starch to a nucleating temperature, 2) maintaining the gelatinized starch at the nucleating temperature, 3) raising the temperature of the gelatinized starch from a nucleating temperature to a crystal-propagating temperature, and 4) maintaining the temperature at the crystal-propagating temperature to grow crystals may be performed sequentially in one or more cycles. For example, these steps may be performed only once, or sequentially repeated at least once. Preferably, a total of from two to four cycles of nucleation and propagation are performed to increase yields of the high-melting enzyme-resistant starch. In embodiments of the invention, up to about 10 to 12 cycles may be utilized. Generally, increasing the number of cycles increases yields of the enzyme-resistant starch type III. The nucleating temperatures and times, propagating temperatures and times, cooling rates, and heating rates in each cycle may be the same or different, but are preferably at least substantially the same. For example, it is preferable to use the same nucleating temperature in each cycle and the same propagating temperature in each cycle.

After the last step of crystal propagation, the gelatinized starch may be cooled to a temperature of from about room temperature or about 20° C. to about 50° C. The gelatinized starch may then be dried to obtain a bulking agent for producing a flour substitute or baked goods of reduced calorie content. The cooling is preferably performed rapidly, so as to avoid the propagation of undesirable crystals such as amylose-lipid complexes. Exemplary cooling rates may be at least about 1° C./min on average, preferably at least about 3° C./min on average, most preferably at least about 4° C./min on average. In embodiments of the invention, the drying may be performed at room temperature or at elevated temperatures. Thus, the gelatinized starch may be cooled from the crystal-propagating temperature to room temperature or to a drying temperature which is above room temperature. Exemplary drying temperatures may range from about 20° C. to about 130° C., depending on mode of drying, preferably from about 75° C. to about 85° C., e.g. about 80° C., for oven-drying. Known drying methods for the drying of starch, which do not substantially destroy or melt the crystals of resistant starch type III, may be employed. Exemplary drying methods which may be used include freeze-drying, oven-drying, vacuum-drying, spray-drying, flash-drying, belt-drying and drum-drying.

The drying of the high-melting-point resistant starch type III composition is conducted to achieve a shelf-stable water activity or relative humidity of less than about 0.7. In embodiments of the present invention, the water content of the dried product may approximate that of commercially available flour. Exemplary moisture contents of the dried, bulking agent or flour substitute or replacer of the present invention may range from about 8% by weight to about 14% by weight.

Separation or isolation of the enzyme resistant starch type III from the readily digestible, amorphous starch or lower melting crystals may be achieved by enzymatic hydrolysis catalyzed by a glycosidase, or a mixture of glycosidases or by acid-catalyzed hydrolysis. However, such separation or isolation is not preferred and is not needed to substantially reduce the calorie content of starch. The temperature cycling in accordance with the present invention increases yield and crystal perfection of the resistant starch type III to such a degree that high calorie reduction is achieved without the need to isolate the high melting enzyme resistant starch type III. Additionally, the substantial calorie reduction is achieved without substantial loss of baking functionality of starch. The dried composition may be used directly, or "as is," as a bulking agent for reduced calorie flour substitutes or replacers and for reduced calorie baked goods. This avoids loss of resistant starch type III crystal solids and increased costs associated with removal of the readily digestible starch components.

In embodiments of the invention, seed crystals of resistant starch type III may be added in the crystal nucleation step to increase yields of resistant starch type III in fewer cycles. The RS III seed crystals may be obtained in at least substantially purified form by isolation from a previous batch of a starch composition comprising enzyme resistant starch type III and readily digestible starch components. The seed crystals may be admixed or dry blended with the starch prior to gelatination of the starch. In other embodiments, the seed crystals may be admixed with the gelatinized starch. The seed crystals of the high melting enzyme resistant starch type III may be admixed with the gelatinized starch at a temperature preferably above the melting point of amylopectin crystals and above the melting point of any amylose-lipid complexes but below the melting point of RS III crystals to nucleate crystals of the enzyme resistant starch type III. The seeded mixture may then be cooled, as described above, to a RS III nucleation temperature which is above the melting point of amylopectin starch. After nucleation, the temperature may be raised to a crystal propagation temperature to propagate or grow crystals of resistant starch type III as described above. The nucleation and propagation steps may optionally be repeated, followed by cooling and drying as described above.

In embodiments of the present invention, the gelatinized starch may be subjected to enzymatic debranching prior to or after crystallization of the enzyme resistant starch type III to increase its yields. Debranching prior to crystallization may, for example, result in a RS III yield increase of about 1% to 2%. In a preferred embodiment, after subjecting the gelatinized starch to nucleation and propagation, the resistant starch type III containing mixture is subjected to enzymatic debranching to further increase yields of resistant starch type III. For example, debranching after crystallization may increase yields about 5% to about 10% by removing amorphous portions of the starch and then subjecting the partly crystallized starch to additional crystal propagation. It is believed that subjecting crystalline resistant starch type III rather than noncrystallized starch to debranching facilitates further crystallization of the remaining portions of the starch involved in branch points.

For debranching, the starch solids content may be adjusted to a higher solids level to facilitate subsequent drying of the starch. For example, higher solids levels may be achieved by draining off the water, evaporation, or centrifugation. Exemplary solids levels for debranching may be from about 5% by weight to about 40% by weight, preferably from about 12% by weight to about 25% by weight solids, based upon the weight of the starch mixture subjected to the debranching enzyme.

After the solids content is fixed, the temperature and pH of the starch dispersion may be readjusted to provide optimum enzyme activity. These parameters will vary depending upon the type and source of enzyme used, the enzyme concentration, the substrate concentration, and the presence or absence of inhibitors.

The enzymatic debranching may be achieved with preferably pullulanase (E.C. 3.2.1.41; pullulan 6-glucanohydrolase), a heat stable enzyme obtained from a species of Bacillus. Pullulanase will catalyze the hydrolysis of the alpha-1,6 linkages in pullulan and amylopectin, provided that there are at least two glucose units in the side chain. A commercially available pullulanase which may be used is Promozyme 200L sold by Nordisk, Inc. Other endo-alpha-1,6-glucanohydrolases, such as isoamylase (E.C. 3.2.1.68), or any other endo-enzyme that exhibits selectivity in cleaving the 1,6-linkages of the starch molecule, leaving the 1,4-linkages substantially intact, may also be used to debranch the starch.

The debranching reaction with Bacillus pullulanase may be carried out in a pH range from about 3.0 to about 7.5, preferably from about 4.5 to about 5.5. Buffers, such as acetates, phosphates, citrates, or the salts of other weak acids can be added to adjust or maintain the pH at an optimum level throughout the debranching. During enzymatic debranching by the Bacillus pullulanase, at a pH of 5.0 for example, the temperature of the aqueous starch dispersion may range from about 25° C. to about 75° C., preferably from about 50° C. to about 65° C. which may be within the low end of the nucleation temperature range used in the present invention. If shorter treatment times are desired, the optimum temperature range can be increased to 60°–65° C. or higher, if the debranching enzyme is thermally stable at the higher temperatures, or a higher enzyme concentration can be used. As with other parameters of the enzyme reaction, the preferred and optimum temperature ranges will vary with changes in other parameters that affect enzyme activity, such as substrate concentration and pH, and these can be determined by the practitioner. However, it is preferable to conduct the debranching at a temperature above the melting point of amylopectin crystals so as to avoid nucleation and propagation of them. Thus, debranching by pullulanase and further nucleation of crystals or crystalline regions of resistant starch type III may be conducted at a temperature of about 55° C. to about 65° C.

Optimum concentrations of enzyme and substrate are governed by the level of enzyme activity. The enzyme activity depends upon the enzyme source, the enzyme supplier, and the concentration of the enzyme provided in commercially available batches. In general, pullulanase is effective at 1500 PUN (pullulanase units novo/kg starch) using a HYLON V or VII starch substrate at 15% solids content. The enzyme may be used in solution, or the enzyme may be immobilized on a solid support.

The enzymatic treatment may be permitted to continue to substantially or essentially completely debranch the starch. Generally, debranching may be achieved within about 4 to 8 hours. After the desired extent of starch debranching has been accomplished, the enzyme may be deactivated by known deactivation techniques. For example, deactivation or pH adjustment, may be used under conditions which do not substantially destroy or melt the crystals of high melting enzyme resistant starch type III. Bacillus pullulanase, for example, may be rapidly deactivated at temperatures above about 70° C. (158° F.). The reaction using pullulanase may therefore be terminated by increasing the temperature of the starch dispersion to at least about 75° C. but below the melting point of the high melting resistant starch type III, for about 15 minutes. In other embodiments, the enzyme may be deactivated by adjusting the pH of the starch dispersion to below 3.0 and holding at that pH for about ½ hour. In preferred embodiments, it is preferable to further subject the debranched, resistant starch type III composition to crystal propagation temperatures to grow additional regions or crystals of resistant starch III. Thus, after debranching, the temperature of the composition comprising debranched, enzyme resistant starch type III may be raised to an enzyme deactivating and crystal propagating temperature of from about 115° C. to about 135° C., preferably from about 120° C. to about 130°. Heating rates and times for the propagation, and subsequent cooling rates and times may be the same as described above. Likewise, after debranching and deactivation of the enzyme, the starch may be dehydrated or dried to a shelf-stable moisture content as described above to obtain a bulking agent or flour substitute or replacer having a reduced calorie content.

If the end-use application requires purification of the starch product, the reaction impurities and by-products of the enzymatic debranching reaction may be removed by dialysis, filtration, ion exchange processes, centrifugation or any other method known in the art for purifying starch. These same purification methods may also be used to isolate or separate enzyme resistant starch type III crystals, such as seed crystals, from impurities and by-products of an enzyme-catalyzed hydrolysis or acid-catalyzed hydrolysis.

In preferred embodiments, after completion of the nucleation/propagation temperature cycling, the enzyme resistant starch type III product obtained may be subjected to heat-treatment. The heat-treatment substantially increases the amount or yield of enzyme resistant starch or total dietary fiber. The heat-treatment also substantially improves the baking characteristics or baking functionality of the enzyme resistant starch product in terms of dough cohesiveness, oven spread or geometry of the baked good, baked good tenderness, and browning.

The higher enzyme resistant starch content or dietary fiber content in the bulk ingredient may be achieved by the heat-treatment without substantially adversely affecting the content of enzyme resistant starch type III which melts at a temperature of at least about 140° C. The heat-treatment is believed to decrease digestibility of amorphous, non-crystalline starch content of the second stage product. This is evidenced by: 1) a rise in the enzyme resistant starch content or total dietary fiber content after heat-treatment, but 2) no increase in the enthalpy of the crystalline enzyme-resistant starch type III melting within the temperature range of about 130° C. to about 160° C. after heat-treatment, and 3) the absence of any additional endothermic peaks in the MDSC curves. It is believed that the heat-treatment in the presence of water results in densification of the amorphous regions of the starch thereby making those regions less accessible to enzymes. The reduced accessibility increases the amount of enzyme resistant starch or total dietary fiber. However, no change in the enthalpy is interpreted to mean that the heat-treatment increases the amount of enzyme resistant starch which is not crystalline.

Figure 6:
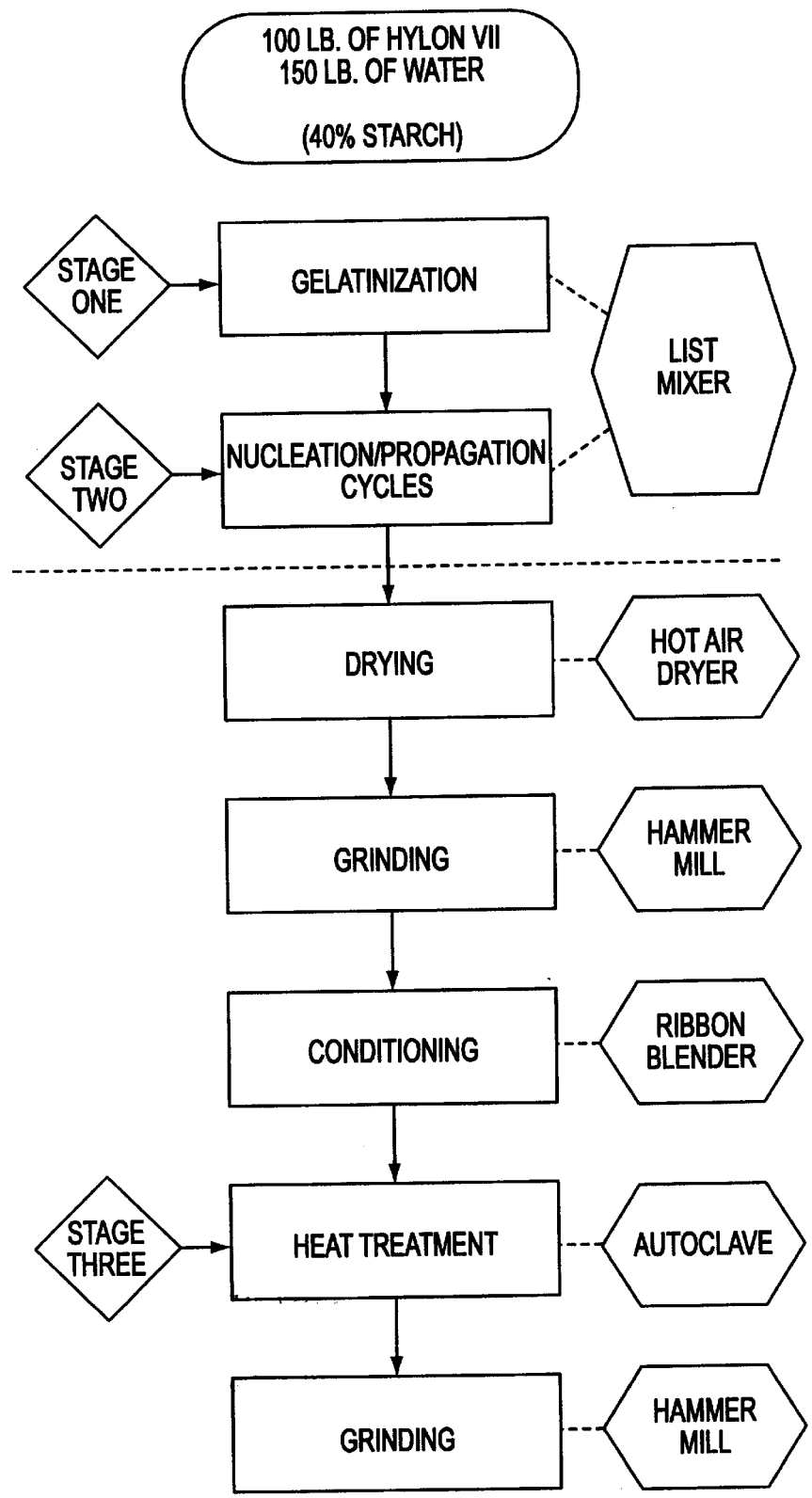
FIG. 6 shows a process flow sheet for the production of enzyme-resistant starch type III using a heat-treatment stage in accordance with a preferred embodiment of the present invention.

As shown in FIG. 6, after gelatinization (stage 1) and nucleation/propagation temperature cycling (stage 2), the enzyme resistant starch type III obtained from stage 2 may be prepared for the stage 3 heat-treatment by drying, grinding, and/or conditioning or moisture content adjustment. In embodiments of the invention, the drying may be conducted to obtain a desired or target moisture content for heat-treating. In other embodiments, the stage 2 product may be dried to a moisture content below a desired moisture content and then moisture may be added to obtain the desired moisture content. The drying may be conducted in a hot air dryer or other conventional dryer at a temperature which does not melt or destroy the RS type III. Exemplary drying temperatures may range from about 20° C. to about 130° C., preferably from about 75° C. to about 85° C., e.g. about 80° C. when oven-drying. The drying may be conducted to obtain a shelf stable moisture content for storage prior to subsequent heat-treating or one which is within a desired range for grinding to a flowable particulate composition. Exemplary moisture contents for storage may range from about 0% by weight to about 15% by weight, preferably from about 10% by weight to about 13% by weight. Exemplary moisture contents generally range from about 0% by weight to about 30% by weight, preferably from about 16% by weight to about 20% by weight for grinding prior to heat treatment.

In preferred embodiments, as shown in FIG. 6, the dried, enzyme resistant starch type III is ground and screened prior to heat-treatment to enhance yield of enzyme resistant starch. Large chunks of starch generally do not respond well to heat-treatment due to non-uniform moisture content and reduced surface area. The grinding may be performed using conventional starch grinding equipment such as a Hammer mill. The extent of grinding may generally be such so as to avoid substantial destruction of the starch crystals. The screening may be conducted through a U.S. mesh no. 20 screen and a U.S. mesh no. 80 screen. Exemplary particle sizes which may be used are less than about 355 μm but greater than about 45 μm.

As shown in FIG. 6, the ground enzyme resistant starch type III may be conditioned by blending with water to obtain a desired or target moisture content for heat-treatment. The conditioning step at least substantially uniformly hydrates the enzyme resistant starch type III and it may be performed in a Ribbon blender, continuous mixer, or other conventional blending or mixing equipment. The moisture content of the enzyme resistant starch during heat treatment may be from about 1% by weight to about 30% by weight, preferably from about 14% by weight to about 24% by weight, most preferably from about 16% by weight to about 20% by weight.

The heat-treatment may be conducted at a temperature of from about 100° C. to about 140° C., preferably from about 125° C. to about 135° C., most preferably from about 128° C. to about 132° C. Heat-treatment times may range from about 5 minutes to about 6 hours, preferably from about 30 minutes to about 90 minutes, most preferably from about 50 minutes to about 70 minutes. The heat-treatment may be conducted in an autoclave, LIST mixer, jacketed continuous mixer, extruder, or other conventional heating vessels where a substantially constant moisture content may be maintained.

The heat-treated enzyme resistant starch, as shown in FIG. 6 may be ground and screened using conventional flour production equipment to obtain a particle size distribution the same as or compatible with the particle size distribution of conventional wheat flour. The heat-treated enzyme resistant starch may be dried prior to or after grinding to obtain a shelf stable moisture content.

In other embodiments of the invention, the heat-treatment may also be used to treat other enzyme resistant starch-containing compositions. Thus, commercially available or known compositions comprising enzyme resistant starch type I, II, or IV may be subjected to the heat-treatment of the present invention to increase the dietary fiber content or enzyme resistant starch content of the compositions and to improve their baking characteristics. Exemplary enzyme resistant starch compositions which may be subjected to the heat-treatment of the present invention are Novelose 240 which is an enzyme resistant granular starch, and Novelose 330 which is an enzyme resistant retrograded starch, each produced by National Starch and Chemical Co., Bridgewater, N.J., and Crystalean which is a retrograded starch produced by Opta food Ingredients, Inc., Cambridge, Mass.

The non-purified resistant starch type III ingredient or bulking agent obtained by the process of the present invention comprises at least about 25% by weight, preferably at least 30% by weight, most preferably at least 45% by weight of enzyme resistant starch type III as determined by the stringent Prosky method. The balance of the product comprises gelatinized, amorphous, or non-crystallized starch. In preferred embodiments, it is at least substantially free, most preferably essentially or completely free of amylose-lipid complexes and other crystallized starch products having a melting point below that of resistant starch III.

In embodiments of the invention, the water holding capacity of the resistant starch type III ingredient is less than 3 grams of water per gram of dry matter, depending upon the yield of resistant starch type III and the quality of the crystals. Generally, the fewer the amorphous regions and the greater the crystalline regions, the less is the ability of the resistant starch ingredient to bind or hold water. The lower water holding capacities generally result in a lower viscosity dough and a beneficial effect upon spread and baking characteristics. The water holding capacity of conventional ungelatinized wheat flour may be about 0.6 grams of water per gram of dry flour. In preferred embodiments, the water holding capacity of the gelatinized, enzyme-resistant bulking agent or flour substitute or replacer approaches that of conventional ungelatinized wheat flour so as to avoid excessive or too little spread upon baking. Exemplary water holding capacities for the resistant starch type III ingredient are less than about 250% by weight, and preferably range from about 100% by weight to about 200% by weight (e.g., 1.0 gram water/gram dry RS III ingredient to 2.0 grams water/gram dry RS III ingredient).

Enthalpy values for the isolated high-melting enzyme-resistant starch may range from greater than about 5 J/g, preferably from about 8 J/g to about 15 J/g depending upon the perfection of the crystals or the number of amorphous regions or sections in the crystal. Generally, higher enthalpy values indicate, that there are fewer amorphous regions, and the water holding capacity is lower. The enthalpy of the enzyme resistant bulking agent or flour substitute, at a temperature within the range of about 130° C. to about 160° C., may range from about 0.5 J/g to about 4 J/g, preferably from about 1 J/g to about 3 J/g, most preferably about 2.5 J/g, based upon the weight of the bulking agent or flour substituent.

The enzyme resistance and low caloric value of the very high melting enzyme resistant starch type III ingredient or component is substantially unaltered by baking. The pure, or 100% by weight (100% yield) enzyme resistant starch type III (having a melting point or endothermic peak of at least 140° C.) has a calorific value of essentially zero, or less than about 0.5 calories/gram even after baking. The calorific value for starch which is not resistant starch type III is about 4 calories/gram. Thus, a resistant starch type III ingredient or bulking agent with at least a 30% yield of RS type III will exhibit a calorific value of less than about 2.8 calories/gram (0.7×4 cal/g+0.3×0 cal/g =2.8 cal/g).

Even though the resistant starch type III ingredient or bulking agent contains high amounts of gelatinized starch, it exhibits excellent baking characteristics in terms of oven spread, edge contour, oil release, surface cracking, odor, color or browning, mouthfeel, and texture. It may be used alone or preferably in combination with non-gelatinized, or substantially ungelatinized flour to obtain doughs for the production of reduced calorie baked goods such as reduced calorie cookies and crackers.

In embodiments of the present invention, substantial calorie reduction in baked goods may be achieved by replacing a substantial amount of conventional, non-gelatinized, flour with the resistant starch type III ingredient or bulking agent. The present invention provides flour substitutes comprising substantially ungelatinized flour (non-calorie reduced flour) and calorie reducing amounts of the gelatinized, starch-based bulking agent (reduced calorie flour replacer). The flour substitute may be combined with cookie and cracker ingredients to provide doughs which exhibit good machinability on conventional dough forming equipment, and excellent baking characteristics. In embodiments of the invention, the flour substitute may have a calorie reduction of at least about 12.5%, preferably at least about 15%, most preferably at least about 25%, for example about 35% to about 40% by weight, compared to a conventional, non-calorie reduced flour. The flour substitute may be used with other reduced calorie bulking agents or sugar substitutes, such as polydextrose, to obtain doughs for producing reduced calorie baked goods having a calorie reduction of at least about 25%.

The flour substitutes and doughs of the present invention may comprise at least about 12.5% by weight, preferably at least about 15% by weight, most preferably at least about 25% by weight, for example about 35% by weight to about 40% by weight, of enzyme resistant starch having a melting point of at least about 140° C., said weight percentage being based upon the total starch content of the flour substitute or dough, respectively.

The flour component or farinaceous materials which may be combined with the resistant starch type III ingredient or bulking agent in producing the flour substitutes and doughs of the present invention may be any comminuted cereal grain or edible seed or vegetable meal, derivatives thereof and mixtures thereof. Exemplary of the flour component or farinaceous materials which may be used are wheat flour, corn flour, corn masa flour, oat flour, barley flour, rye flour, rice flour, potato flour, grain sorghum flour, tapioca flour, graham flour, or starches, such as corn starch, wheat starch, rice starch, potato starch, tapioca starch, physically and/or chemically modified flours or starches, such as pregelatinized starches, and mixtures thereof. The flour may be bleached or unbleached. Wheat flour or mixtures of wheat flour with other grain flours are preferred.

The amount of gelatinized starch-based bulking agent, or the RS III ingredient, may generally be at least about 25% by weight, for example at least about 40% by weight, preferably from about 50% by weight to about 75% by weight, based upon the total weight of the gelatinized bulking agent and the flour component, such as conventional, ungelatinized wheat flour.

The total amount of the flour component and the RS III bulking agent used in the compositions of the present invention may range, for example, from about 20% by weight to about 80% by weight, preferably from about 45% by weight to about 75% by weight, based upon the weight of the dough. Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The flour component may be replaced in whole or in part by conventional flour substitutes or bulking agents, such as polydextrose, hollocellulose, microcrystalline cellulose, mixtures thereof, and the like. Corn bran, wheat bran, oat bran, rice bran, mixtures thereof, and the like may also be substituted in whole or in part for the flour component to enhance color, or to affect texture.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments of the present invention, the total sugar solids content, or the texturizing ingredient content, of the doughs of the present invention may range from zero up to about 50% by weight, based upon the weight of the dough.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making the reduced calorie baked goods of the present invention. Exemplary replacement amounts may be at least about 25% by weight, for example at least about 40% by weight, preferably from about 50% by weight to about 75% by weight, of the original sugar solids content.

In embodiments of the invention, the amount of the conventional sugar substitute, conventional bulking agent, or conventional flour substitute, preferably polydextrose, may be from about 10% by weight to about 35% by weight, preferably from about 15% by weight to about 25% by weight, based upon the weight of the dough.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), the moisture content of the RS III ingredient, and the moisture content of other dough additives included in the formulation, such as high fructose corn syrup, invert syrups, or other liquid humectants.

Taking into account all sources of moisture in the dough or batter, including separately added water, the total moisture content of the doughs or batters of the present invention is generally less than about 50% by weight, preferably less than about 35% by weight, based upon the weight of the dough or batter. The cracker doughs of the present invention generally have a moisture content of about 27% by weight to about 33% by weight, based upon the weight of the dough. Cookie doughs of the present invention may have a moisture content of less than about 30% by weight, generally from about 10% by weight to about 20% by weight, based upon the weight of the dough.

Oleaginous compositions which may be used to obtain the doughs and baked goods of the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

Baked goods which may be produced in accordance with the present invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs of the invention may include other additives conventionally employed in crackers and cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like in conventional amounts.

A source of protein, which is suitable for inclusion in baked goods, may be included in the doughs of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs of the present invention may include antimycotics or preservatives, such as calcium propionate, potassium sorbate, sorbic acid, and the like. Exemplary amounts may range up to about 1% by weight of the dough, to assure microbial shelf-stability.

Emulsifiers may be included in effective, emulsifying amounts in the doughs of the present invention. Exemplary emulsifiers which may be used include, mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough.

Production of the doughs of the present invention may be performed using conventional dough mixing techniques and equipment used in the production of cookie and cracker doughs. For example, the doughs may be sheeted, wire cut, extruded, coextruded, or rotary molded using conventional equipment. The resistant starch type III ingredient is preferably preblended with the flour component to obtain a substantially homogeneous mixture for mixing with the other dough ingredients.

While baking times and temperatures will vary for different dough or batter formulations, oven types, etc., in general, commercial cracker-, cookie-, brownie- and cake-baking times may range from about 2.5 minutes to about 15 minutes, and baking temperatures may range from about 250° F. (121° C.) to about 600° F. (315° C.).

The baked products of the present invention may have a relative vapor pressure ("water activity") of less than about 0.7, preferably less than about 0.6, for preservative free microbial shelf-stability. The water content of the cracker products is generally less than about 6% by weight, for example, from about 0.25% by weight to about 4% by weight, based upon the weight of the baked product, exclusive of inclusions. Cookie, brownie and cake products generally have a moisture content of less than about 20% by weight, for example, from about 2% by weight to about 9% by weight for cookies, based upon the weight of the baked product, exclusive of inclusions.

The cookie dough or batter compositions of the present invention may be used for the production of reduced calorie bar-type cookies, drop-type cookies such as chocolate chip cookies, oatmeal cookies, sugar cookies, fruit cookies, sandwich cookies, brownies, and the like.

The present invention is further illustrated in the following examples, where all parts, ratios, and percentages are by weight, and all temperatures are in °C., unless otherwise stated:

EXAMPLE 1

Preparation of Resistant Starch Ingredient and Analysis

In this example, an enzyme resistant starch type III bulking agent, or resistant starch ingredient, comprising resistant starch type III is prepared and analyzed to determine the yield of resistant starch type III and the melting profile of the resistant starch type III:

1A. Preparation of Resistant Starch Ingredient or Bulking Agent

In this example, an enzyme resistant starch type III bulking agent, or resistant starch ingredient, was produced using Hylon VII as a starting starch. The Hylon VII is a corn starch containing about 70% amylose, and is a product of National Starch and Chemical Company, Bridgewater, N.J. The moisture content of the Hylon VII was about 11% by weight. Hylon VII in an amount of 150 parts by weight (wet basis) and 450 parts by weight of distilled water were admixed in three Teflon® coated baking pans (batches A, B, and C) to obtain a substantially homogenous starch slurry. The weight ratio of the starch to the water was about 0.33:1. The starch slurry was autoclaved at about 130° C. for about 15 minutes to at least substantially gelatinize the starch.

The gelatinized starch was then subjected to four cycles of crystal nucleation and propagation. In the first cycle, the gelatinized starch slurry was cooled at a cooling rate of about 2° C./min to a nucleation temperature of about 70° C. The gelatinized starch slurry was then incubated at about 70° C. for three hours in a humidified enclosure to nucleate crystals of resistant starch III. The humidified enclosure was operated at about atmospheric pressure and in the presence of a beaker of water to minimize drying of the surface of the starch gel. The starch slurry was then heated at a rate of about 6° C./min to a crystal propagating temperature of 130° C. in an autoclave. The temperature of 130° C. was held for about 3 hours to grow crystals of enzyme resistant starch type III.

In the second cycle, the starch slurry was then cooled at a rate of about 2° C./min to a crystal nucleation temperature of about 70° C. The starch slurry was incubated at that temperature of about 70° C. in the humidified enclosure overnight (about 18 hours) to nucleate crystals of resistant starch III. The starch slurry was then heated at a rate of about 6° C./min to a crystal propagation temperature of 130° C. in an autoclave and held at that temperature of 130° C. for about 3 hours to grow crystals of enzyme resistant starch type III.

In the third cycle, the gelatinized starch slurry was cooled at a cooling rate of about 2° C./min to a nucleation temperature of about 70° C. The gelatinized starch slurry was then incubated at about 70° C. for three hours in the humidified enclosure to nucleate crystals of enzyme resistant starch III. The starch slurry was then heated at a rate of about 6° C./min to a crystal propagating temperature of 130° C. in an autoclave and held at that temperature for about 3 hours to grow crystals of enzyme resistant starch type III.

In the fourth cycle, the starch slurry was then cooled at a rate of about 2° C./min to a crystal nucleation temperature of about 70° C. The starch slurry was incubated at that temperature of about 70° C. in the humidified enclosure overnight (about 18 hours) to nucleate crystals of enzyme resistant starch III. The starch slurry was then heated at a rate of about 6° C./min to a crystal propagation temperature of 130° C. in an autoclave and held at that temperature of 130° C. for about 3 hours to grow crystals of enzyme resistant starch III.

The gelatinized starch gel was then cooled at a rate of about 1° C./min to freeze it. The frozen gel was then freeze dried at a temperature of about −30° C. and a pressure of about 10 mTorr to a moisture content of about 0 to 2% by weight to obtain a resistant starch ingredient or resistant starch bulking agent in accordance with the present invention. A portion of the sample was then subjected to analysis to determine: a) the yield of the enzyme resistant starch type III, and b) the melting profile or thermal characteristics of the enzyme resistant starch type III as below in Examples 1B and 1C, respectively:

1B. Isolation of Resistant Starch III and Determination of Yield

The enzyme resistant starch type III was isolated from the resistant starch type III ingredient or bulking agent of Example 1A above to determine its yield based upon the original, or starting starch (Hylon VII). The yield of enzyme resistant starch type III for batches A, B, and C were found to be 34.6%, 35.5%, and 35.8%, respectively. The average yield of resistant starch III was found to be about 35.3%.

The method used for the isolation and determination is adopted and modified from the Prosky method for Total Dietary Fiber in Foods set forth in AOAC, *J. Assoc. Anal. Chem.*, 68(2) p.399 (1985) and *AOAC, Official Methods of Analysis*, J. Assoc. Anal. Chem. 15th ed., pp. 1105–1106 (1990). The AOAC method for Total Dietary Fiber in Foods involves: a) treatment with 0.1 ml α-amylase, Sigma Chemical Co., followed by b) treatment with 5 mg protease, Sigma Chemical Co., then treatment with 0.3 ml amyloglucosidase, Sigma Chemical Co., d) precipitation of soluble fiber by ethanol, and e) filtering and drying. The adopted method used in the present invention is more stringent, involving higher amounts of enzymes and freeze drying, and results in lower values for the yield of resistant starch. The adopted method employed in the present invention is:

Adopted and Modified Prosky Method for Total Dietary Fiber

The pH and temperature of the system is adjusted to maximize enzyme activity. The buffers and enzymes used in the analysis are:

| Buffer Preparation | | |
|---|---|---|
| Phosphate Buffer pH = 6 | Phosphate Buffer pH = 7.5 | 2% Phosphoric Acid |
| 0.875 g $NaHPO_4$ | 53.2 ml 0.02 M $NaH_2PO_4$ | 1.18 ml of 85% Phosphoric Acid |
| 6.05 g $NaH_2PO_4$ | 297.8 ml 0.01 M $NaHPO_4$ | 50 ml distilled $H_2O$ |
| dissolve in 700 ml distilled $H_2O$ dilute to 1 liter with distilled $H_2O$ check pH = 6 | dilute to 1 liter with distilled $H_2O$ check pH = 7.5 | |

Enzymes
1. Termamyl:
   a. endo-alpha-amylase (*Bacillus licheniformis*)
   b. maximum activity at 100° C. (extremely heat stable) and pH+6
   c. hydrolyzes 1,4-alpha-glucosidic linkages in amylose & amylopectin
   d. activity=120 KNU/g (available as 120 liquid)
   e. produced by Novo Nordisk Bioindustrials, Danbury, Conn.
2. Amyloglucosidase (AMG):
   a. exo-1,4,-a-D-glucosidase (*Aspergillus niger*)
   b. maximum activity at 60° C. and pH+4.5
   c. hydrolyzes 1,4-(more readily) & 1,6-alpha-linkages of starch glucose units are removed in a stepwise manner from non-reducing end of substrate
   d. activity=300 AGU/g
   e. produced by Novo Nordisk Bioindustrials, Danbury, Conn.
3. Protease:
   a. type XIV bacterial (Streptomyces griseus) Pronase E
   b. non-specific protease
   c. activity approx. 4 units/mg solid
   d. SIGMA Chemical Co.

The Determination of Yield

In determining yield, the dried starch sample is treated with the α-amylase enzyme (Termamyl), the amyloglucosidase (AMG), and the protease:

1. Treatment with α-amylase Enzyme (Termamyl)

Approximately 20 ml of the phosphate buffer having a pH of 6 is added to one gram of dried starch sample. The starch is homogenized to break up any large chunks of starch. Then, 0.4 ml of Termamyl a-amylase is added per gram of the dried starch sample. The mixture is placed in a 100° C. water bath for a minimum of 30 minutes. The mixture is shaken occasionally. If pieces of starch gel remain after 30 minutes, the time in the water bath is extended until no more pieces of starch gel are visible.

2. Treatment with Amyloglucosidase

For treatment with the amyloglucosidase, the pH of the reaction mixture obtained in step 1 above is adjusted to pH=4.5 using the 2% phosphoric acid. Then, 1.0 ml of the amyloglucosidase enzyme (AMG) per gram of the dried starch sample is added to the starch mixture and stirred. The starch mixture is placed in a 60° C. water bath for a minimum of 30 minutes and shaked occasionally.

3. Removal of Enzymatic Reaction Products by Centrifuging and Washing

After the enzymatic treatment with the α-amylase (Termamyl) and the amyloglucosidase, the starch mixture is centrifuged and washed two times with distilled water:

The enzyme-digested sample is poured into a disposable, 50 ml centrifuge tube and centrifuged at 1000 g (3000 rpm) for 10 minutes to obtain a pellet (residue) and supernatant liquid. The supernatant is poured off, being careful not to dislodge any particles from the pellet. Then, the pellet is subjected to washing by: a) adding 30 ml of distilled water to the tube, and breaking the pellet apart with a spatula, and b) centrifuging the resulting mixture to obtain a pellet and supernatant liquid and pouring off the supernatant. The pellet washing procedure is then repeated one more time.

4. Treatment with Protease

After the washing of the enzyme digested sample it is then treated with protease enzyme to remove the α-amylase (Termamyl) and amyloglucosidase enzymes:

After pouring off the supernatant in the last wash (above), 20 ml of the phosphate buffer of pH=7.5 are added to the pellet or residue. Then, a protease solution (a solution containing 16 mg protease (Pronase E) in 100 ml phosphate buffer pH=7.5) is added in an amount of 1 ml of solution per gram of initial dried starch sample. The resulting mixture is incubated in a 42° C. water bath for at least 4 hours.

5. Removal of Enzymatic Reaction Products by Centrifuging and Washing

After the enzymatic treatment with the protease, the starch mixture is centrifuged and washed 3 times with distilled water:

The protease-treated sample is poured into a disposable, 50 ml centrifuge tube and centrifuged at 1000 g (3000 rpm) for 10 minutes to obtain a pellet (residue) and supernatant liquid. The supernatant is poured off, being careful not to dislodge any particles from the pellet. Then, the pellet is subjected to washing by: a) adding 30 ml of distilled water to the tube, and breaking the pellet apart with a spatula, and b) centrifuging the resulting mixture to obtain a pellet and supernatant liquid and pouring off the supernatant. The pellet washing procedure is then repeated two more times to obtain an isolated material or pellet.

6. Freeze Drying of the Isolated Material

Vacuum filtering showed that only a small amount of isolated material was found in the supernatant. To save time, the isolated material, or pellet, is freeze dried for at least fifteen hours instead of being vacuum filtered.

7. Calculation of Yield of Resistant Starch

The yield of the resistant starch is calculated from the weight of the freeze dried sample:

Yield of Resistant Starch (%) =

$$\frac{\text{weight of freeze dried isolated material}}{\text{weight of sample (dry basis)}} \times 100$$

1C. Determination of Melting Profile of Resistant Starch Type III by MDSC

The melting profile or thermal characteristics of the resistant starch III was determined by modulating differential scanning calorimetry (MDSC). In this technique, the material being analyzed is heated at a steady rate with a programmed saw-tooth pattern of heating and cooling imposed upon the steady rate. The fluctuation in temperature in the saw-tooth pattern is about 1° C. The MDSC technique allows a more precise analysis of the equilibrium melting point because it separates overlapping thermal events such as irreversible decomposition.

The instruments and method used to characterize the isolate of Example 1B which was isolated from the RS Ingredient or bulking agent of Example 1A are:

Instrument: TA Instruments Modulated Differential Scanning Calorimeter (MDSC), which includes the TA Instruments DSC 2920 Controller, TA Instruments 2920 Module and the TA Instruments RCS 1061 unit.

Sample Pans: Perkin-Elmer Stainless Steel High Pressure Capsules with gold-plated copper seals.

Sample Preparation: The freeze dried isolate (Example 1B) of the RS Ingredient (Example 1A) is ground to a fine powder for analysis. The sample is weighed in a DSC sample pan, where water (three times the weight of the sample) is placed in the pan to provide a 1:3 solids to water ratio.

Instrument Calibration: The Modulated DSC is calibrated for Baseline, Cell Constant, Temperature and Heat Capacity in known manner:

Baseline Calibration: Using two empty sample pans the baseline slope and baseline offset are determined over a temperature range from 10° C. to 270° C., with a heating rate of 5° C./min.

Cell Constant Calibration: Indium is used to determine the cell constant.

Temperature Calibration: Calibrated at two points, indium and tin.

The DSC Calibration Data Analysis software program is used to make the proper DSC calibration corrections with the instrument in the calibration mode. Heat Capacity is calibrated and the sample is characterized with the MDSC in the Modulated mode, using the following method:
Equilibrate 30° C.
Data Storage OFF
Isothermal 5 min.
Modulate ±1.000 C. every 60 sec.
Data Storage ON
Ramp 5° C./min to 110° C.
Data Sampling interval 0.2 sec/pt.
Ramp 5.00° C./min to 220° C.
Isothermal 2.00 min.
Data Storage: OFF
Air Cool: ON
Equilibrate at 30° C.
Air Cool: OFF
initial temperature: 30° C.
Heat Capacity Calibration: With sapphire, high density polyethylene, and polyethylene terephalate, in known manner.
Sample Characterization: The Reversing Heat Flow curve is integrated from 130° C. to 164° C. to measure the enthalpy of the enzyme resistant starch type III.

Typical results of the MDSC analysis for a sample from one of the three pans are shown in: a) FIG. 1A for the ingredient or bulking agent obtained in Example 1A above, and b) FIG. 1B for the isolated material or pellet obtained in Example 1B above.

As shown in FIG. 1A, for the bulk ingredient, the onset of melting occurs at about 135.3° C., the endothermic peak or the melting point is about 150.7° C., and the endpoint of melting occurs at about 160° C. The enthalpy of the enzyme resistant starch type III ingredient or bulking agent, as shown in FIG. 1A is about 1.89 J/g. Also, as shown in FIG. 1A essentially no other peaks occur down to 50° C. indicating the substantial absence of amylose-lipid complexes as well as the substantial absence of other crystalline forms of starch.

As shown in FIG. 1B, for the isolated enzyme resistant starch, the onset of melting occurs at about 130.7° C., the endothermic peak or the melting point is about 153.6° C., and the endpoint of melting occurs at about 166.2° C. The enthalpy of the isolated resistant starch type III, as shown in FIG. 1B is about 9.37 J/g. Also, as shown in FIG. 1B essentially no other peaks occur down to 50° C. indicating the substantial absence of amylose-lipid complexes as well as the substantial absence of other crystalline forms of starch.

EXAMPLE 2

Preparation of Resistant Starch Ingredient and Analysis

In this example, an enzyme resistant starch type III bulking agent, or resistant starch ingredient, comprising resistant starch type III is prepared and analyzed to determine the yield of resistant starch type III and the melting profile of the resistant starch type III bulking agent:

2A. Preparation of Resistant Starch Ingredient or Bulking Agent

In this example, an enzyme resistant starch type III bulking agent, or resistant starch ingredient, was produced using Hylon VII (about 70% by weight amylose) as a starting starch. The moisture content of the Hylon VII was about 11% by weight. Hylon VII in an amount of 125 parts by weight (wet basis) and 375 parts by weight of distilled water were admixed in a Teflon® coated baking pan to obtain a substantially homogenous starch slurry. The weight ratio of the starch to the water was about 0.33:1. The starch slurry was autoclaved at about 110° C. for about 15 minutes to at least substantially gelatinize the starch.

The gelatinized starch was then subjected to four cycles of crystal nucleation and propagation. In the first cycle, the gelatinized starch slurry was cooled at a cooling rate of about 2° C./min to a nucleation temperature of about 58.2° C. The gelatinized starch slurry was then incubated at about 58.2° C. for three hours in a convection oven to nucleate crystals of resistant starch III. The incubation in the convection oven was in the presence of a beaker of water to minimize drying of the surface of the starch gel. The starch slurry was then heated at a rate of about 6° C./min to a crystal propagating temperature of 120° C. and autoclaved at that temperature for about 3 hours to grow crystals of resistant starch type III.

In the second cycle, the starch slurry was then cooled at a rate of about 2° C./min to a crystal nucleation temperature of about 58.2° C. The starch slurry was incubated at that temperature of about 58.2° C. in the convection oven overnight (about 18 hours) to nucleate crystals of resistant starch III. The starch slurry was then heated at a rate of about 6° C./min to a crystal propagation temperature of 120° C. and autoclaved at that temperature of 120° C. for about 3 hours to grow crystals of resistant starch III.

In the third cycle, the gelatinized starch slurry was cooled at a cooling rate of about 2° C./min to a nucleation temperature of about 58.2° C. The gelatinized starch slurry was then incubated at about 58.2° C. in the convection oven overnight (about 18 hours) to nucleate crystals of resistant starch III. The starch slurry was then heated at a rate of about 6° C./min to a crystal propagating temperature of 120° C. and autoclaved at that temperature for about 3 hours to grow crystals of resistant starch type III.

In the fourth cycle, the starch slurry was then cooled at a rate of about 2° C./min to a crystal nucleation temperature of about 58.2° C. The starch slurry was incubated at that temperature of about 58.2° C. in the convection oven overnight (about 18 hours) to nucleate crystals of resistant starch III. The starch slurry was then heated at a rate of about 6° C./min to a crystal propagation temperature of 120° C. and autoclaved at that temperature of 120° C. for about 3 hours to grow crystals of resistant starch III.

The gelatinized starch gel was then cooled at a rate of about 1° C./min to freeze it. The frozen gel was then freeze dried at a temperature of about −30° C. and a pressure of about 10 mTorr to a moisture content of about 0 to 2% by weight to obtain a resistant starch ingredient or resistant starch bulking agent in accordance with the present invention. A portion of the sample was then subjected to analysis to determine: a) the yield of the enzyme resistant starch type III, and b) the melting profile or thermal characteristics of the enzyme resistant starch type III as below in Examples 2B and 2C, respectively:

2B. Isolation of Resistant Starch III and Determination of Yield

The resistant starch type III was isolated from the resistant starch type III ingredient or bulking agent of Example 2A above to determine its yield based upon the original, or starting starch (Hylon VII). The isolation of the resistant starch III and the determination of yield were performed on two samples (A and B) using the method set forth in Example 1B above. The yield of resistant starch III was found to be about 29.7% for sample A and about 29.5% for sample B, with the average yield being about 29.6%.

2C. Determination of Melting Profile of Resistant Starch Type III Ingredient by MDSC The melting profile or thermal characteristics of the resistant starch III bulking agent or RS III ingredient obtained in Example 2A above was determined by modulating differential scanning calorimetry (MDSC). The MDSC method was the same as described in Example 1C above except the material analyzed was the bulking agent rather than the isolated material.

Figure 2A:
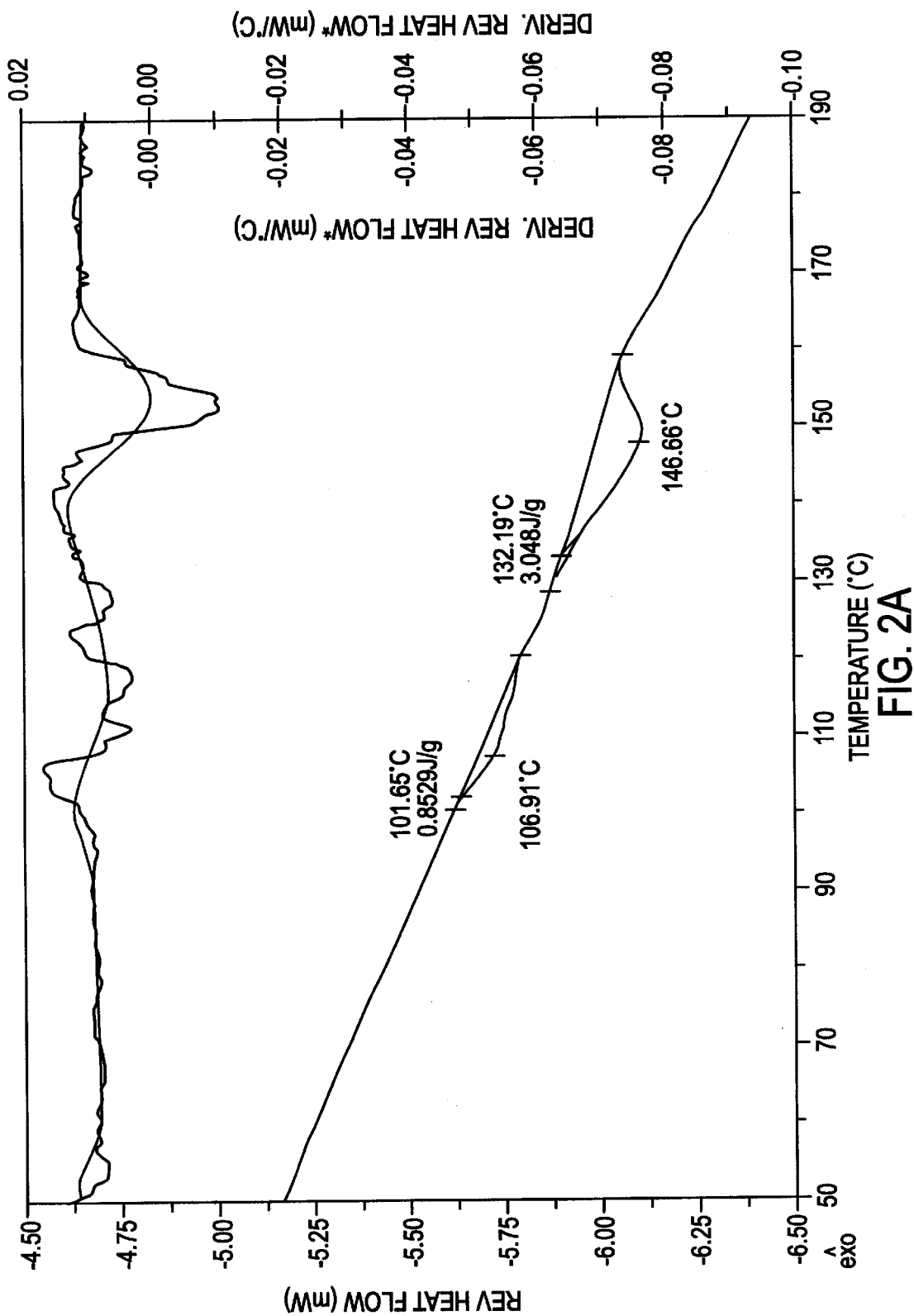
FIGS. 2A and 2B show MDSC curves for two samples (A and B) of an enzyme-resistant starch type III ingredient or bulking agent, obtained in Example 2A using a nucleation temperature of about 58° C. and a propagation temperature of about 120° C., in accordance with the present invention.
Figure 2B:
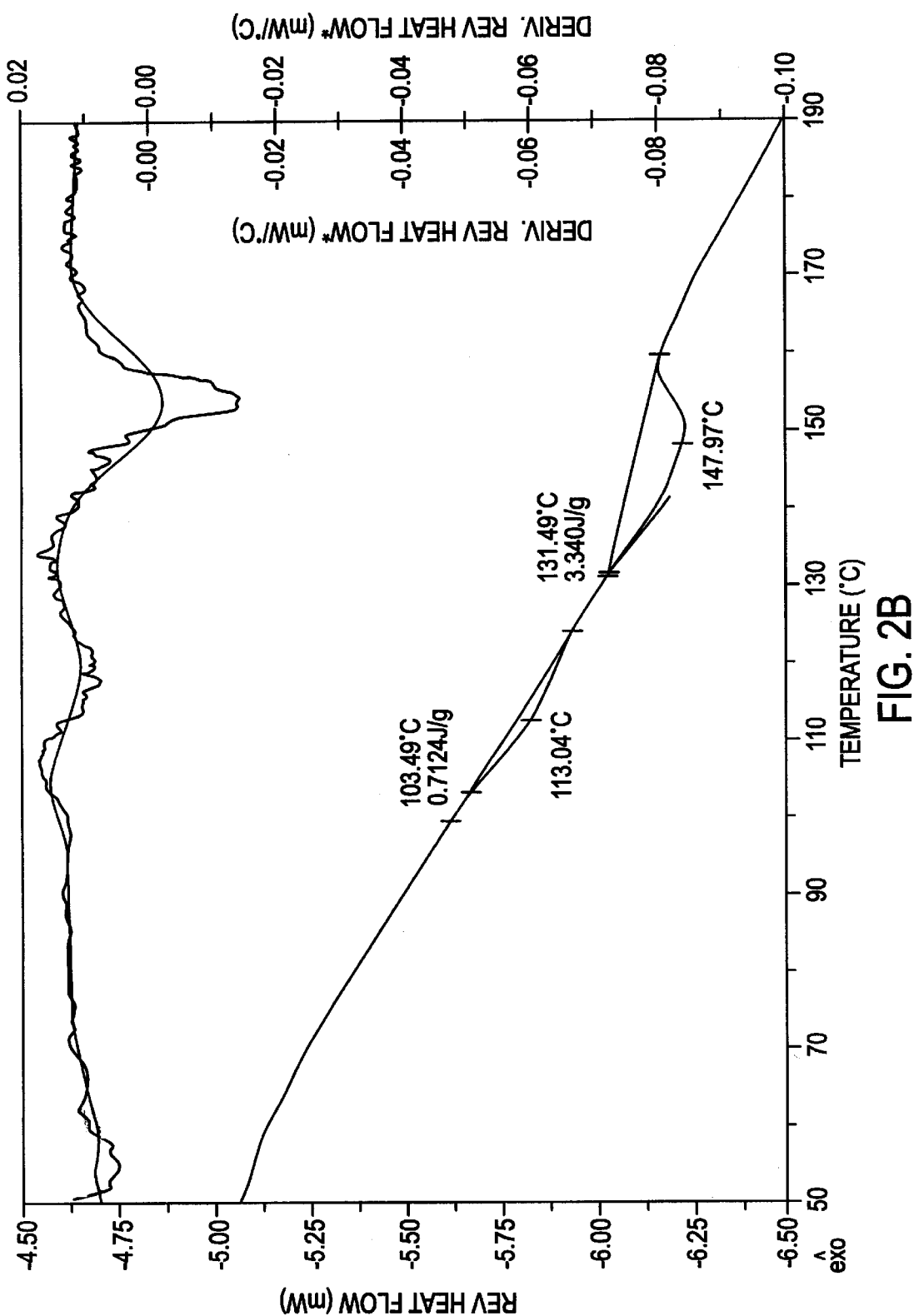

The results of the MDSC analysis are shown in FIGS. 2A and 2B for two samples A and B, respectively of the resistant starch bulking agent (resistant starch ingredient) obtained in Example 2A above. As shown in FIG. 2A, for Sample A, the onset of melting occurs at about 132.2° C., the endothermic peak or the melting point is about 146.7° C., and the endpoint of melting is about 160° C. Also, as shown in FIG. 2A essentially no other peaks occur down to 50° C. except for one which indicates the presence of a small amount of amylose-lipid complexes as shown by the relatively small size of the peak. The onset of melting for the amylose-lipid complexes occurs at about 101.5° C., the endothermic peak or melting point is about 106.9° C. and the endpoint of melting occurs at about 120° C. The enthalpy of the resistant starch bulking agent, as shown in FIG. 2A is about 3.048 J/g.

As shown in FIG. 2B, for Sample B, the onset of melting occurs at about 131.6° C., the endothermic peak or the melting point is about 147.97° C., and the endpoint of melting is about 162° C. Also, as shown in FIG. 2B essentially no other peaks occur down to 50° C. except for one which indicates the presence of amylose-lipid complexes. The onset of melting for the amylose-lipid complexes occurs at about 103.5° C., the endothermic peak or melting point is at about 113.04° C. and the endpoint of melting is about 126° C. The enthalpy of the resistant starch bulking agent, as shown in FIG. 2B is about 3.340 J/g.

EXAMPLE 3

Preparation of Resistant Starch Ingredient Using Pullulanase

In this example, an enzyme resistant starch type III bulking agent, or resistant starch ingredient, comprising resistant starch type III is prepared and then reacted with pullulanase to increase the yield of resistant starch type III in the bulking agent. The bulking agent is analyzed to determine the yield of resistant starch type III before and after reaction with the pullulanase. The melting profile of the resistant starch type III bulking agent before treatment with the pullulanase is also determined:

3A. Preparation of Resistant Starch Ingredient or Bulking Agent

In this example, an enzyme resistant starch type III bulking agent, or resistant starch ingredient, was produced using Hylon VII (about 70% by weight amylose) as a starting starch. The moisture content of the Hylon VII was about 11% by weight. Hylon VII in an amount of 150 parts by weight (wet basis) and 450 parts by weight of distilled water were admixed in Teflon® coated baking pans to obtain a substantially homogenous starch slurry. The weight ratio of the starch to the water was about 0.33:1. The starch slurry was autoclaved at about 130° C. for about 15 minutes to at least substantially gelatinize the starch.

The gelatinized starch was then subjected to four cycles of crystal nucleation and propagation followed by a fifth nucleation step. In the first cycle, the gelatinized starch slurry was cooled at a cooling rate of about 2° C./min to a nucleation temperature of about 70° C. The gelatinized starch slurry was then incubated at about 70° C. for three hours in a humidified enclosure to nucleate crystals of resistant starch III. The humidified enclosure was operated at about atmospheric pressure and in the presence of a beaker of water to minimize drying of the surface of the starch gel. The starch slurry was then heated at a rate of about 6° C./min to a crystal propagating temperature of 130° C. in an autoclave. The temperature of 130° C. was held for about 3 hours to grow crystals of enzyme resistant starch type III.

In the second cycle, the starch slurry was then cooled at a rate of about 2° C./min to a crystal nucleation temperature of about 70° C. The starch slurry was incubated at that temperature of about 70° C. in the humidified enclosure overnight (about 18 hours) to nucleate crystals of resistant starch III. The starch slurry was then heated at a rate of about 6° C./min to a crystal propagation temperature of 130° C. and autoclaved at that temperature of 130° C. for about 3 hours to grow crystals of enzyme resistant starch III.

In the third cycle, the gelatinized starch slurry was cooled at a cooling rate of about 2° C./min to a nucleation temperature of about 70° C. The gelatinized starch slurry was then incubated at about 70° C. overnight (about 18 hours) in the humidified enclosure to nucleate crystals of enzyme resistant starch III. The starch slurry was then heated at a rate of about 6° C./min to a crystal propagating temperature of 130° C. in an autoclave and held at that temperature for about 3 hours to grow crystals of enzyme resistant starch type III.

In the fourth cycle, the starch slurry was then cooled at a rate of about 2° C./min to a crystal nucleation temperature of about 70° C. The starch slurry was incubated at that temperature of about 70° C. in the humidified enclosure 1.5 hours to nucleate crystals of enzyme resistant starch III. The starch slurry was then heated at a rate of about 6° C./min to a crystal propagation temperature of 130° C. in an autoclave and held at that temperature of 130° C. for about 3 hours to grow crystals of enzyme resistant starch type III.

In a fifth nucleation step, the gelatinized starch slurry was cooled at a cooling rate of about 2° C./min to a nucleation temperature of about 70° C. The gelatinized starch slurry was then incubated at about 70° C. overnight (about 18 hours) in the humidified enclosure to nucleate crystals of enzyme resistant starch type III.

The gelatinized starch gel was then cooled at a rate of about 1° C./min to freeze it. The frozen gel was then freeze dried at a temperature of about −30° C. and a pressure of about 10 mTorr to a moisture content of about 0 to 2% by weight to obtain a resistant starch ingredient or resistant starch bulking agent in accordance with the present invention. A portion of the sample was then subjected to analysis to determine the melting profile or thermal characteristics of the enzyme resistant starch type III as below in Example 3B. Numerous portions of the sample or bulking agent were also analyzed for the yield of the resistant starch III and treated with pullulanase as below in Example 3C:

3B. Determination of Melting Profile of Resistant Starch Type III Ingredient by MDSC The melting profile or thermal characteristics of the enzyme resistant starch III bulking agent or RS III ingredient obtained in Example 3A above was determined by modulating differential scanning calorimetry (MDSC). The MDSC method was the same as described in Example 1C above except the material analyzed was the bulking agent rather than the isolated material.

Figure 3:
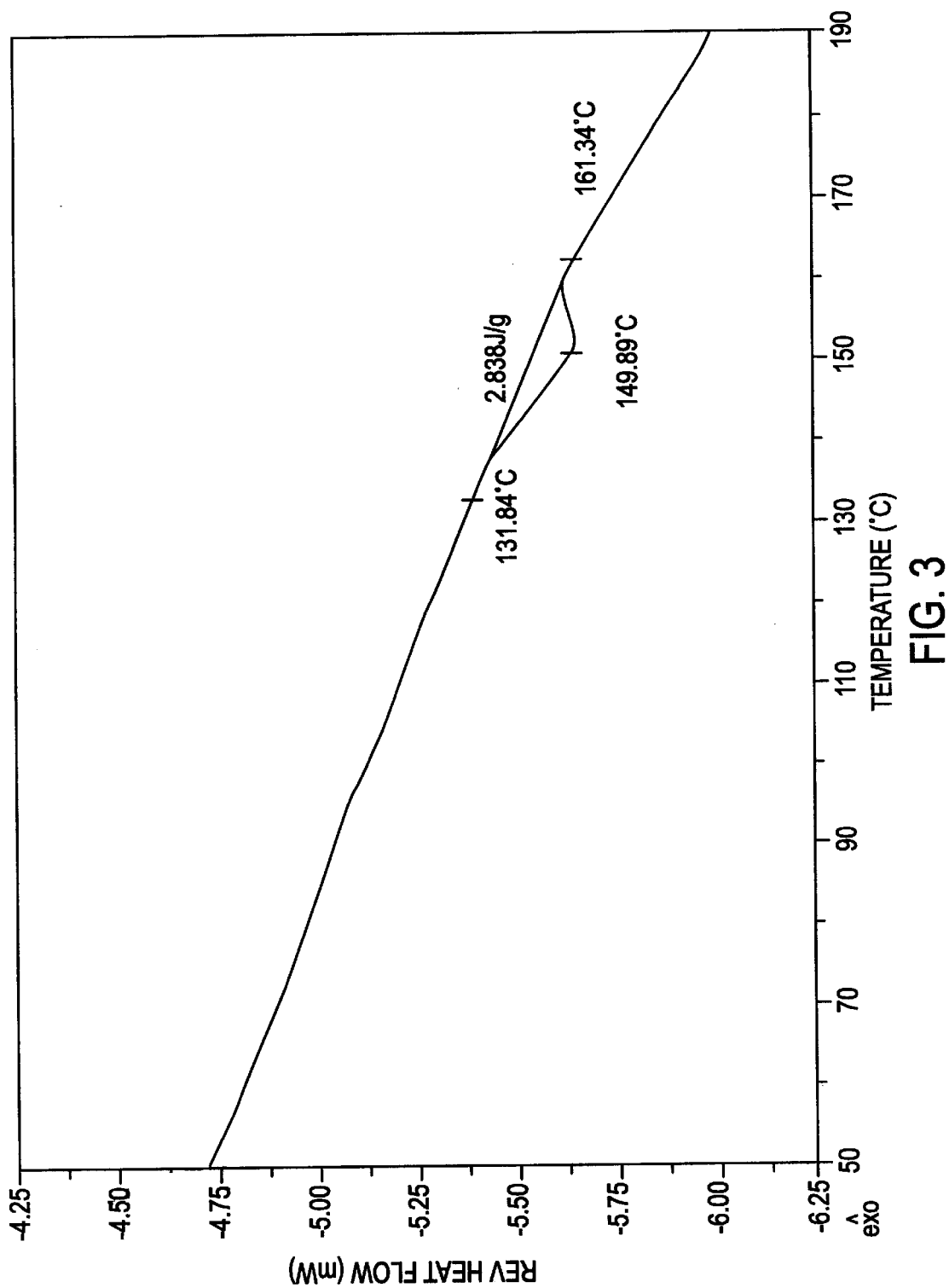
FIG. 3 shows a MDSC curve for an enzyme-resistant starch type III ingredient or bulking agent, obtained in Example 3A, which was subsequently treated with pullulanase, the bulking agent being prepared using a nucleation temperature of about 70° C. and a propagation temperature of about 130° C.

The results of the MDSC analysis are shown in FIG. 3 for the resistant starch bulking agent (resistant starch ingredient) obtained in Example 3A above. As shown in FIG. 3, the onset of melting occurs at about 131.8° C., the endothermic peak or the melting point is about 149.9° C., and the endpoint of melting occurs at about 161.3° C. Also, as shown in FIG. 3 essentially no other peaks occur down to 50° C. which indicates the at least substantial absence of amylose-lipid complexes as well as the at least substantial absence of other forms of crystalline starch. The enthalpy of the resistant starch bulking agent, as shown in FIG. 3 is about 2.84 J/g.

3C. Treatment of Bulking Agent with Pullulanase and Determination of Yields

The resistant starch type III ingredient or bulking agent of Example 3A above was used to obtain a control and also divided into twelve samples: Samples PA-1, PA-2, PB-1, PB-2, PC-1, PC-2, PD-1, PD-2, PE-1, PE-2, D-1, and D-2. For the control and each of the twelve samples, the resistant starch type III was isolated from the resistant starch type III ingredient or bulking agent to determine its yield based upon the original, or starting starch (Hylon VII). The isolation of the resistant starch III and the determination of yield for the control and for the twelve pullulanase-treated samples were performed using the method set forth in Example 1B above. The yield of resistant starch III is reported for the control and for each of the twelve pullulanase-treated samples in Table 1 below.

To show the effect of pullulanase on yield of resistant starch type III, the RS ingredient or RS bulking agent of each of the twelve samples was enzymatically treated by pullulanase with various conditions in incubation time (1 hour, 2 hours, 3 hours, and 4 hours) and amount of pullulanase (4.0 μl, 40.0 μl, and 0.4 ml). The same incubation temperature of 60° C. was used for each of the twelve samples. The pullulanase enzyme used was Promozyme 200L, produced by Novo Nordisk Bioindustrials, Danbury, Conn. The Promozyme 200L is a debranching pullulanase enzyme (*Bacillus acidopullulyticus*) having a maximum activity at 60° C. and pH+4.5. The enzyme catalyzes the hydrolysis of 1,6-alpha-linkages in pullulan and amylopectin which has been partially hydrolyzed by alpha-amylase and is well suited for debranching starch after liquefaction. The buffer used was a 0.05M citrate buffer of pH 5.0. The procedure used to treat each of the twelve samples of the resistant starch III bulking agent or RS III ingredient with the pullulanase was:

1. Weigh about 1 g of each sample of RS III ingredient and add 4 ml of the citrate buffer to each sample to obtain a RS III ingredient slurry, except for samples D-1 and D-2 the amount of buffer added is 9 ml.

2. Add the appropriate amount of the Promozyme 200L pullulanase enzyme to each RS III ingredient slurry. The amounts of enzyme used were: a) 4.0 μl for samples PA-1, PB-1, PC-1, and PD-1, b) 40 μl for samples PA-2, PB-2, PC-2, PD-2, D-1 and D-2, and c) 0.4 ml for samples PE-1 and PE-2.

3. Incubate each of the RS III ingredient slurries at 60° C. The incubation times used were: a) 1 hour for samples PA-1, PA-2, PE-1, and D-1, b) 2 hours for samples PB-1, PB-2, PE-2, and D-2, c) 3 hours for samples PC-I and PC -2, and d) 4 hours for samples PD-1 and PD-2.

4. After the enzymatic reaction, incubate each of the samples at 100° C. for 10 minutes to inactivate the enzyme reaction.

5. Wash each of the samples twice with distilled water.

6. Dry each of the samples in an air oven at about 60° C. for about 24 hours and measure the recovery of each sample.

7. Isolate the resistant starch III from each pullulanase-treated sample to determine the yield of the resistant starch III based upon the original, or starting starch (Hylon VII). The isolation of the resistant starch III and the determination of yield were performed on each of the twelve pullulanase treated samples using the method set forth in Example 1B above. The yield of resistant starch III after the pullulanase treatment is reported in Table 1 below.

Summarized in Table 1 for the pullulanase treatments of the twelve samples are: a) the enzyme incubation time or reaction time, b) the amount of enzyme used, c) the weight of each sample recovered after the Promozyme enzyme treatment, d) the weight of resistant starch from recovered samples after treatment with the Promozyme, e) the yield of resistant starch, f) the percentage increase in yield obtained by the Promozyme treatment, and g) the total recovery of resistant starch based on 1 gram of control sample (before enzyme treatment). The latter is calculated as:

$$\text{Total Recovery of } RS = \frac{(Y_s)(W_s)}{(Y_c)(W_c)} \times 100\%$$

where $Y_s$ = resistant starch yield of recovered sample with Promozyme treatment $W_s$ = weight of recovered sample $Y_c$ = resistant yield of control, and $W_c$ = weight of control (1 gram)

The Table 1 results for the pullulanase treatment are:

TABLE 1

Recovery Of Samples After Treatment With Promozyme Pullulanase And Their RS Yield

| Sample | Enzyme Incubation Time (hours) | Enzyme Amount (μl) | Wt. of samples recovered after enzyme treatment (g) | Wt. of RS from recovered samples (g) | RS Yield (%, db) | Yield increase compared to control (%) | Total recovery of RS compared to control (%) |
|---|---|---|---|---|---|---|---|
| Control | — | — | — | 0.3220 | 33.9 | — | 100.0 |
| PA-1 | 1 | 4 | 0.9110 | 0.3485 | 40.0 | 18.0 | 107.5 |
| PA-2 | 1 | 40 | 0.9358 | 0.3549 | 39.5 | 16.5 | 109.0 |
| PB-1 | 2 | 4 | 0.9132 | 0.3513 | 40.1 | 18.3 | 108.0 |
| PB-2 | 2 | 40 | 0.8868 | 0.3509 | 41.3 | 21.8 | 108.0 |
| PC-1 | 3 | 4 | 0.9087 | 0.3479 | 39.8 | 17.4 | 106.7 |
| PC-2 | 3 | 40 | 0.9156 | 0.3466 | 39.4 | 16.2 | 106.4 |
| PD-1 | 4 | 4 | 0.8587 | 0.3498 | 42.4 | 24.5 | 107.4 |
| PD-2 | 4 | 40 | 0.8648 | 0.3501 | 42.2 | 25.1 | 107.7 |
| PE-1 | 1 | 400 | 0.9401 | 0.3487 | 38.6 | 13.9 | 107.0 |
| PE-2 | 2 | 400 | 0.9458 | 0.3505 | 38.6 | 13.9 | 107.7 |
| D-1 | 1 | 40 | 0.9253 | 0.3463 | 39.0 | 15.0 | 106.5 |
| D-2 | 2 | 40 | 0.9255 | 0.3496 | 39.3 | 15.9 | 107.3 |

As indicated in Table 1, the treatment of the resistant starch III ingredient with the pullulanase increased yield of the resistant starch III from about 13.9% to about 25.1%. The largest percentage increase in yield was obtained with the longest incubation times of 4 hours for samples PD-1 and PD-2. The results also indicate that for a given incubation time and buffer amount, increasing the amount of enzyme from 4.0 μl to 40.0 μl or 0.4 ml may tend to decrease yields as indicated by a comparison of the % yield increase for samples PA-1, PA-2, and PE-1; PB-1, PB-2, and PE-2; PC-1 and PC-2; and PD-1 and PD-2.

EXAMPLE 4

Heat Treatment of Enzyme Resistant Starch to Increase Yield

In this example, an enzyme resistant starch type III bulking agent is heat treated to increase the yield of enzyme resistant starch. Two 1 gram portions of the resistant starch type III ingredient or bulking agent produced in Example 1A (batch B) above were subjected to heat treatment to increase the yield of enzyme resistant starch. The heat treatment was conducted by autoclaving each 1 gram sample at 130° C. for one hour.

After the heat treatment, the enzyme resistant starch was isolated from the heat-treated, enzyme resistant starch ingredient or bulking agent to determine its yield based upon the original, or starting starch (Hylon VII). The isolation of the enzyme resistant starch and the determination of yield were performed on the two samples using the method set forth in Example 1B above. The yield of enzyme resistant starch was found to be about 41.5% for one sample and about 41.7% for the other sample, with the average yield being about 41.6%. Thus, the heat treatment resulted in an unexpectedly superior increase in the average yield of enzyme resistant starch from the average yield of 35.3% obtained by the process of Example 1A.

The melting profile or thermal characteristics of the isolated, heat-treated resistant starch type III samples were determined by modulating differential scanning calorimetry (MDSC). The MDSC method was the same as described in Example 1C above.

Figure 4:
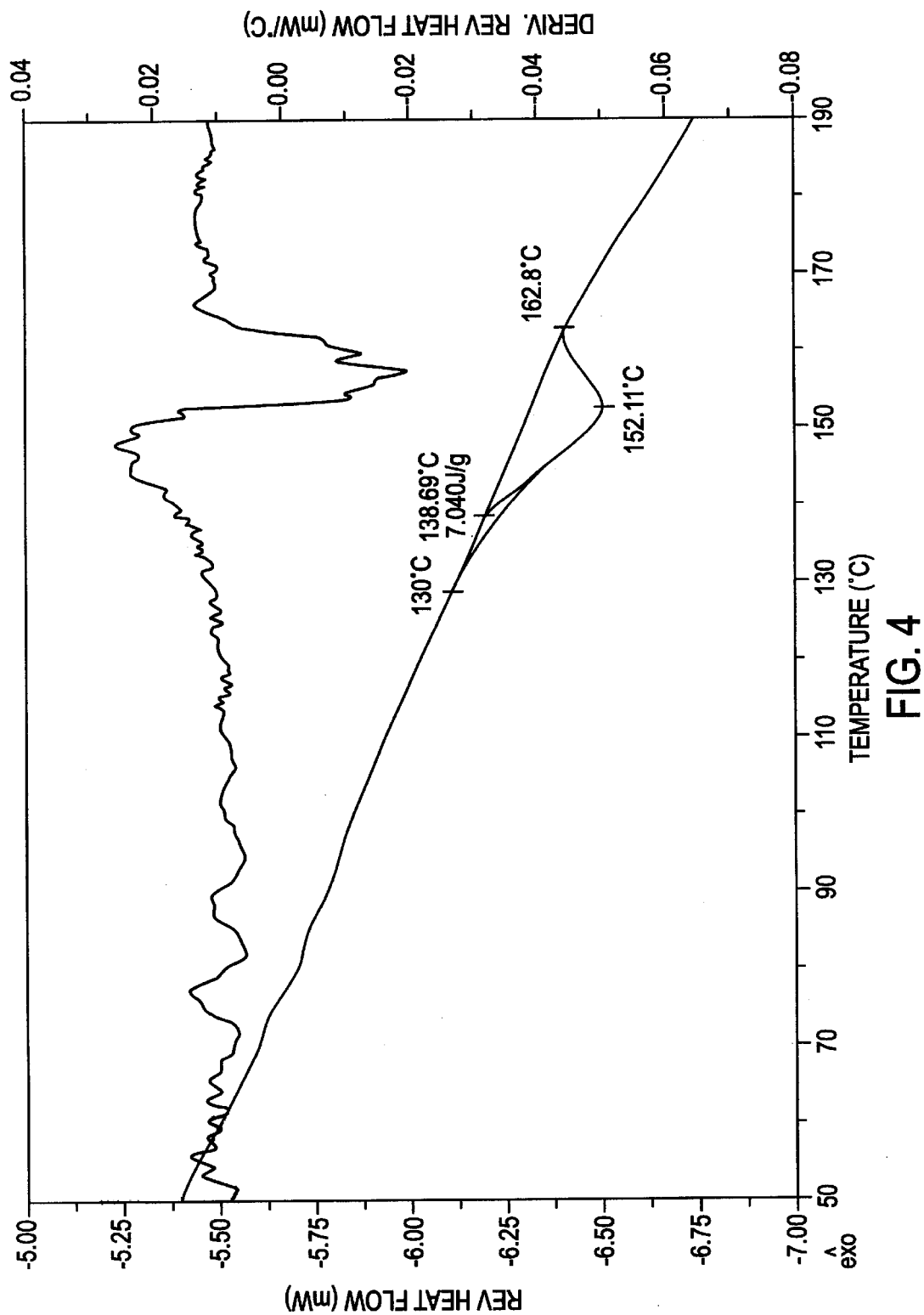
FIG. 4 shows a MDSC curve for a heat-treated enzyme-resistant starch type III ingredient or bulking agent obtained in Example 4 by heat-treating a sample of the bulking agent of Example 1A.
Figure 5A:
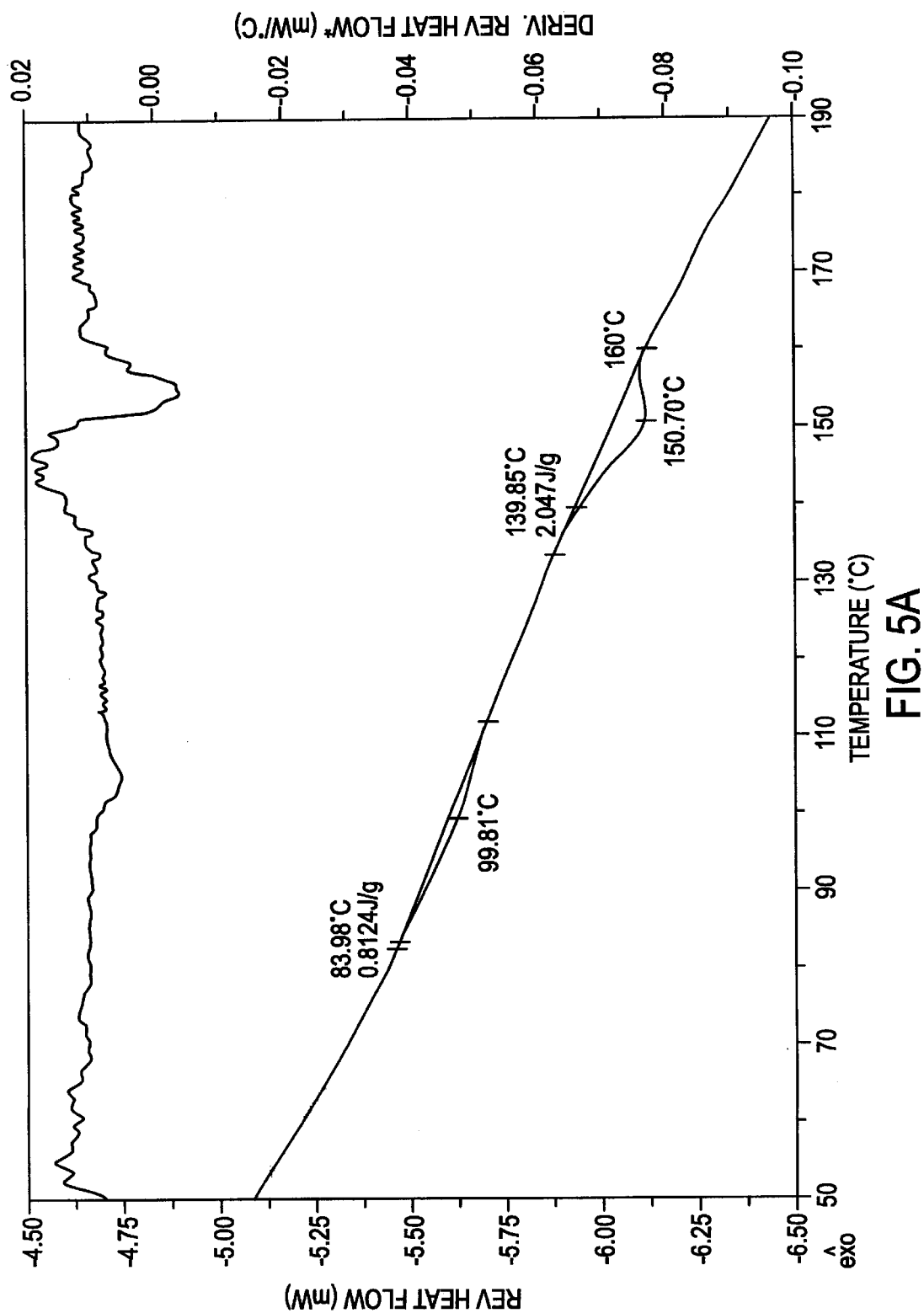
FIG. 5A shows a MDSC curve for an enzyme-resistant starch type III ingredient or bulking agent control sample, obtained in Example 6 using a nucleation temperature of about 70° C. and a propagation temperature of about 130° C.
Figure 5B:
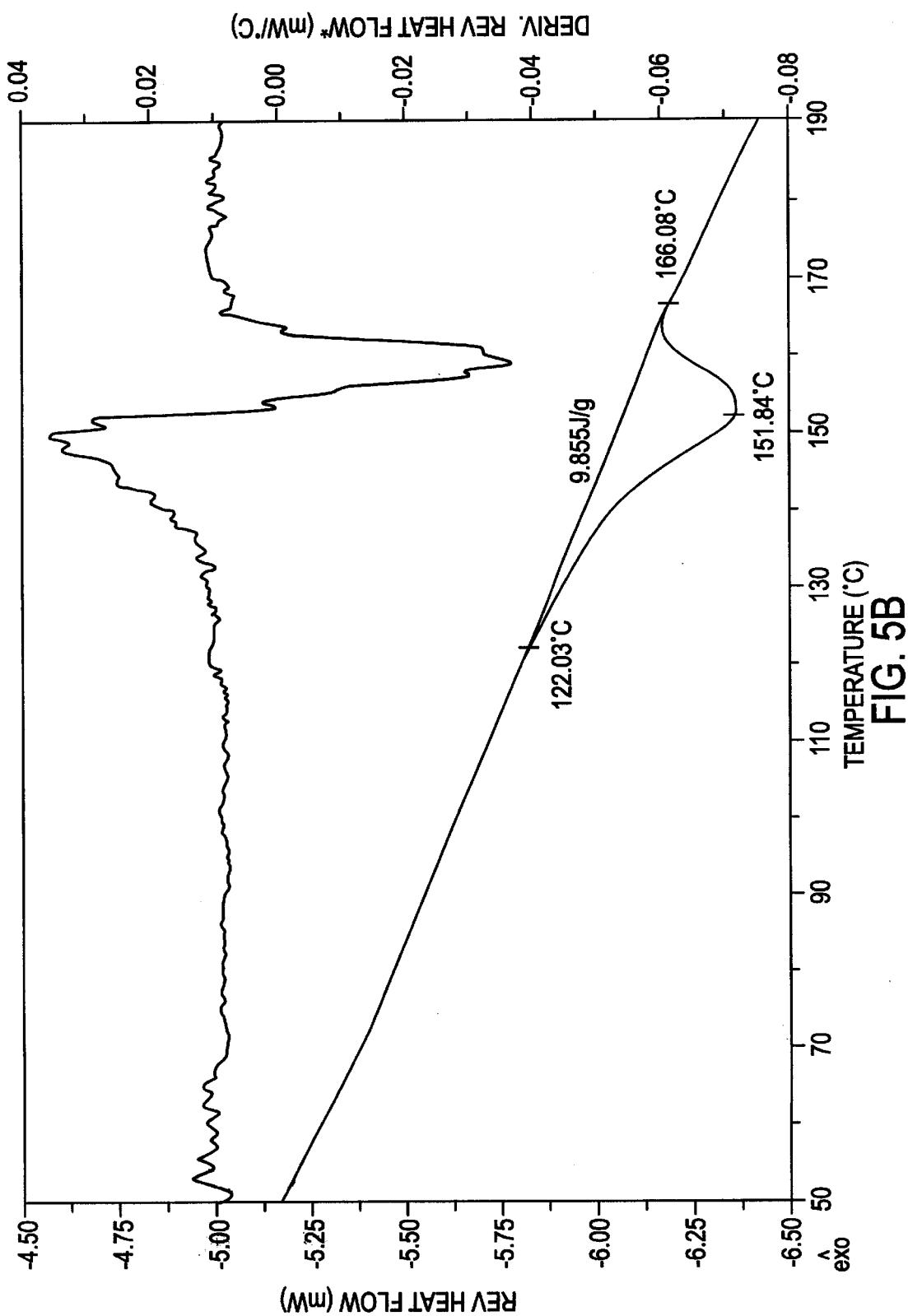
FIG. 5B shows a MDSC curve for an isolated enzyme-resistant starch type III control sample, obtained in Example 6, which was isolated from the ingredient or bulking agent of Example 6.
Figure 5C:
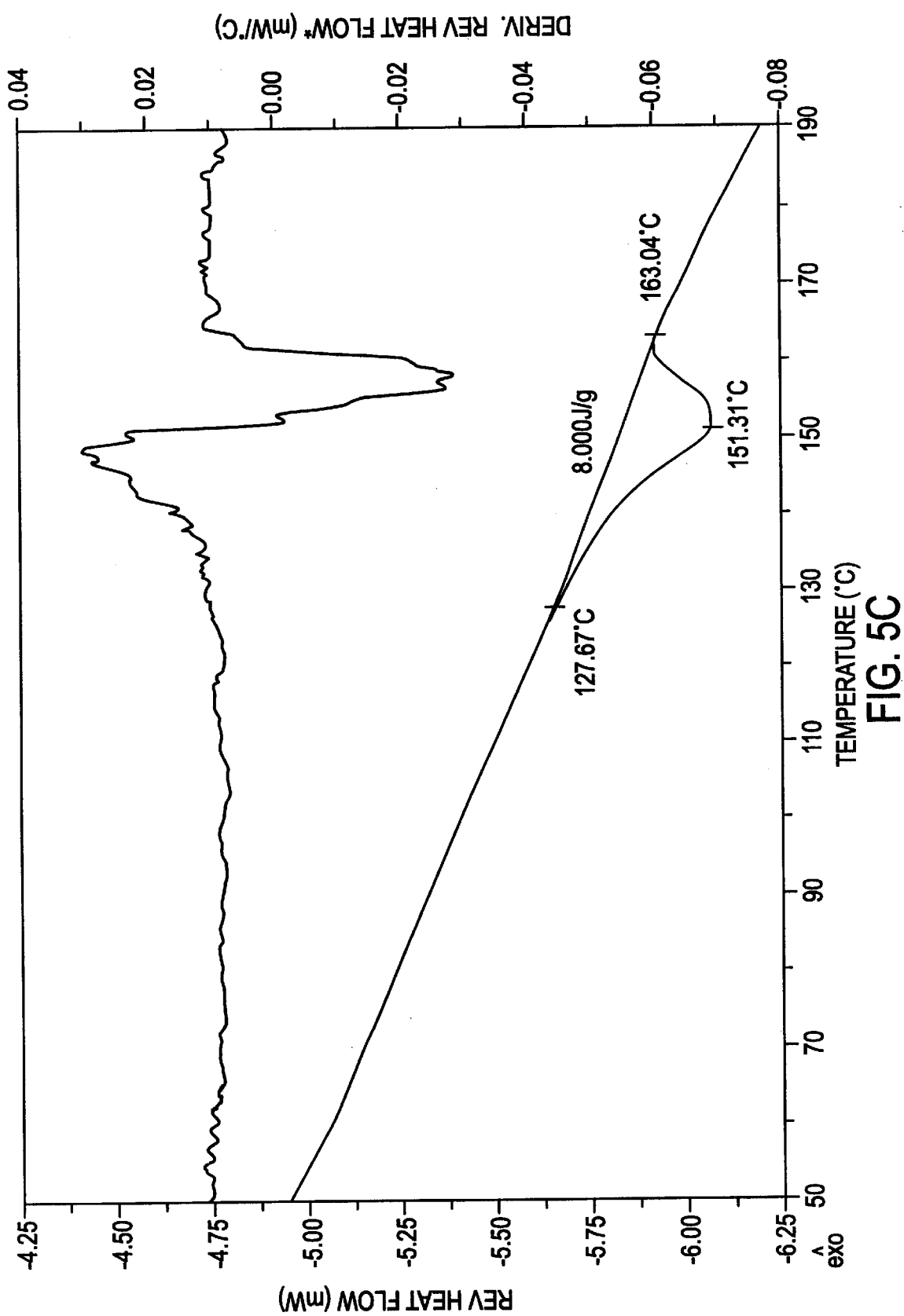
FIG. 5C shows a MDSC curve for an isolated, heat-treated enzyme-resistant starch, obtained in Example 6 by heat-treating a sample of the enzyme-resistant starch type III bulking agent of Example 6 at a heat-treating temperature of 130° C. for one hour and at a moisture content of 20% by weight, followed by isolation of the RS from the heat-treated bulking agent.
Figure 5D:
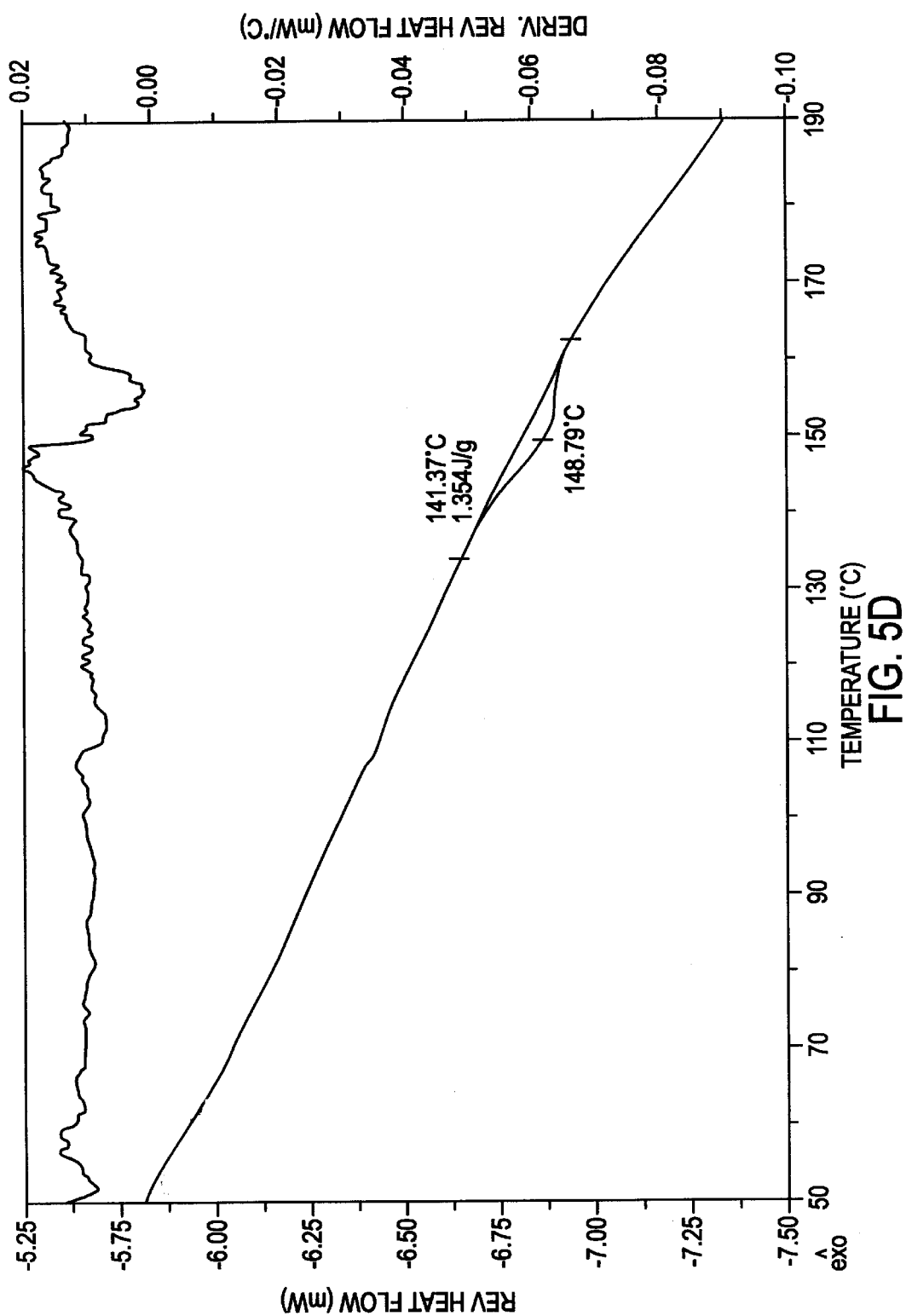
FIG. 5D shows a MDSC curve for a heat-treated enzyme-resistant starch bulking agent obtained in Example 6 by heat-treating a sample of the enzyme-resistant starch type III bulking agent of Example 6 at a heat-treating temperature of 130° C. for one hour and at a moisture content of 14.8% by weight.
Figure 5E:
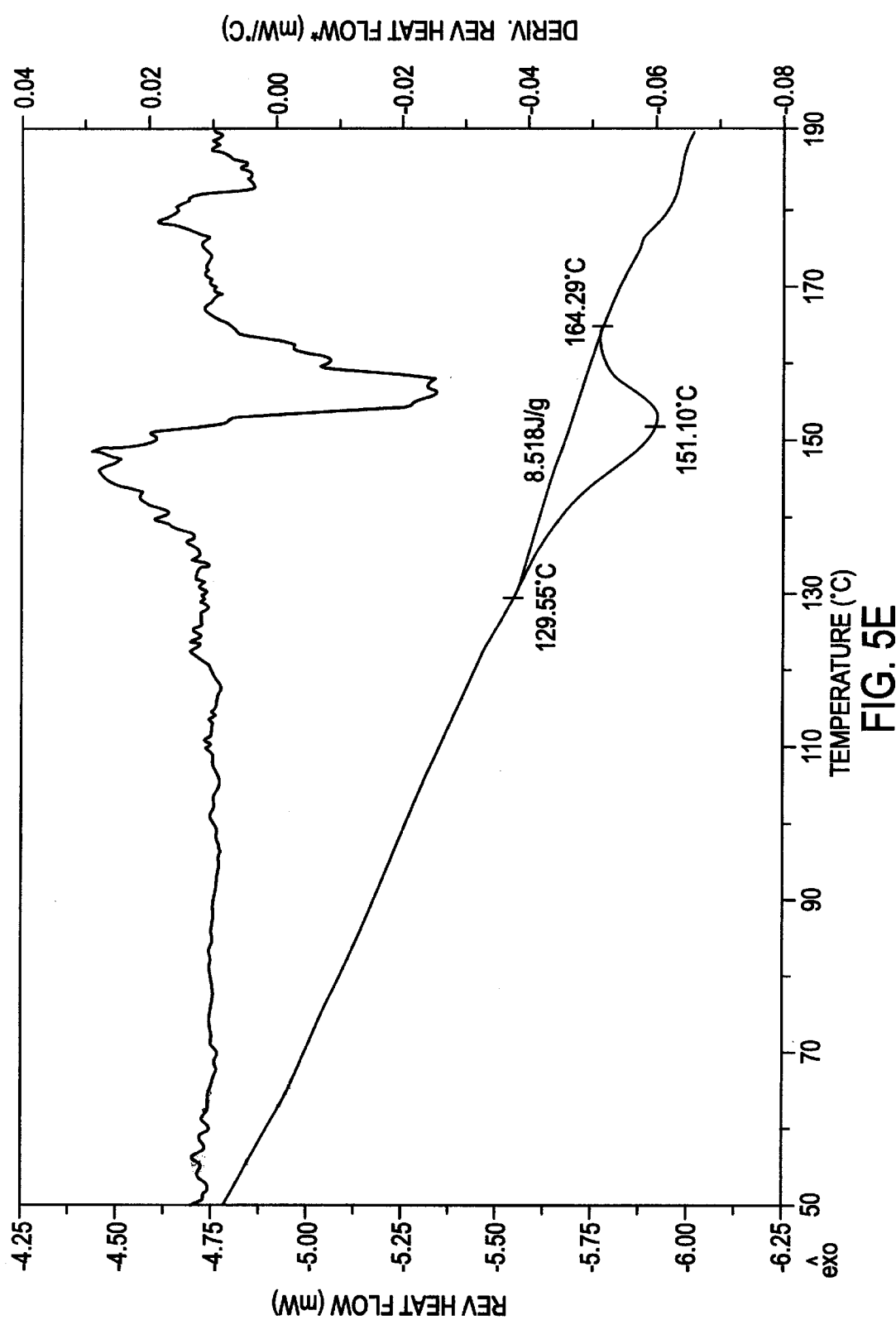
FIG. 5E shows a MDSC curve for an isolated, heat-treated enzyme-resistant starch, obtained in Example 6 by heat-treating a sample of the enzyme-resistant starch type III bulking agent of Example 6 at a heat-treating temperature of 130° C. for one hour and at a moisture content of 14.8% by weight, followed by isolation of the RS from the heat-treated bulking agent.
Figure 5F:
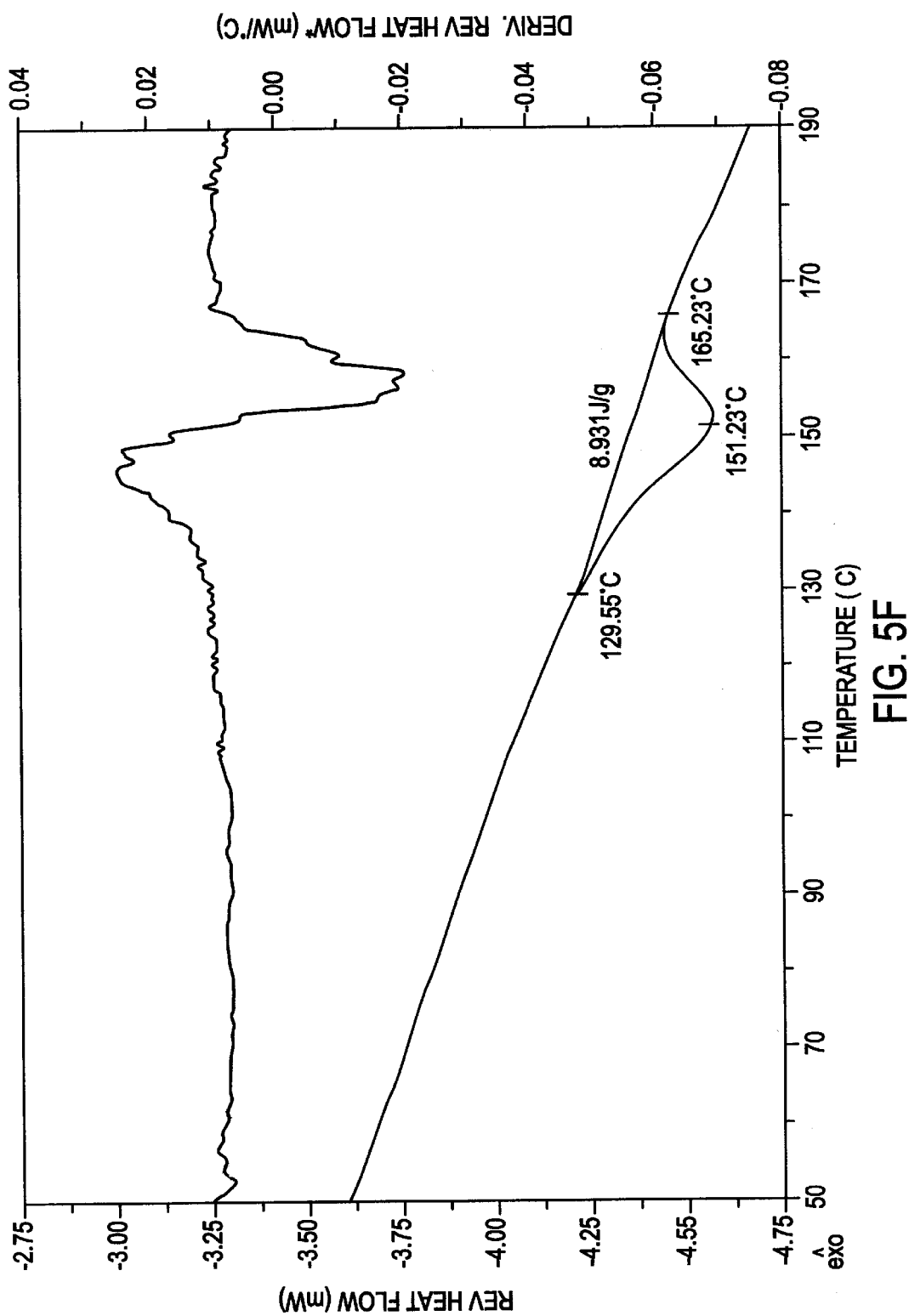
FIG. 5F shows a MDSC curve for an isolated, heat-treated enzyme-resistant starch, obtained in Example 6 by heat-treating a sample of the enzyme-resistant starch type III bulking agent of Example 6 at a heat-treating temperature of 130° C. for one hour and at a moisture content of 18.4% by weight, followed by isolation of the RS from the heat-treated bulking agent.

The results of the MDSC analysis for one of the isolated heat-treated samples is shown in FIG. 4. As shown in FIG. 4, the onset of melting occurs at about 130° C., the endothermic peak or the melting point is about 152.1° C., and the endpoint of melting is about 162.8° C. Also, as shown in FIG. 4 essentially no other peaks occur down to 50° C. indicating the substantial absence of amylose-lipid complexes as well as the substantial absence of other crystalline forms of starch. The enthalpy of the isolated heat-treated, enzyme resistant starch bulking agent, as shown in FIG. 4 is about 7.04 J/g.

Thus, the heat-treatment of the enzyme resistant starch increased the yield of enzyme resistant starch (from 35.3% without heat-treatment, to 41.6% with heat-treatment) but the enthalpy decreased (from 9.37 J/g without heat-treatment, to 7.04 J/g with heat-treatment). Also, as shown by a comparison of the MDSC curves shown in FIG. 1B and FIG. 4 no additional crystalline or amylose-lipid peaks resulted from the heat-treatment. Accordingly, it is believed that the heat treatment increases the amount of non-crystalline or amorphous enzyme resistant starch. The increase in enzyme resistance and dietary fiber content is believed to result from a densification of the amorphous portion. The densification makes it more difficult for the enzyme to attack the amorphous portion of the starch or the non-crystalline dietary fiber created by the heat-treatment. of the starch.

EXAMPLE 5

Effect of Nucleation Temperature Upon Yield

In this example, the effect of nucleation temperature upon yield of enzyme resistant starch type III was evaluated by subjecting samples of a gelatinized starting starch to the same nucleation times and propagation conditions, but different nucleation temperatures, for a given number of nucleation steps. The different nucleation temperatures used were: A) 4° C., B) 20° C. (room temperature), C) 40° C., D) 60° C., E) 80° C., and F) 100° C. For each nucleation temperature (A–F), samples were run using 1, 2, and 3 nucleation steps with 0, 1, and 2 propagation steps, respectively.

Hylon VII, a corn starch containing about 70% amylose, and having a moisture content of about 11% by weight was used as a starting starch to produce each sample of resistant starch bulking agent. For each sample, Hylon VII in an amount of 1 g (wet basis) and 3 ml of distilled water were admixed to obtain a substantially homogenous starch slurry. The weight ratio of the starch to the water was about 0.33:1. Each starch slurry was autoclaved at about 130° C. for about 15 minutes to at least substantially gelatinize the starch.

The gelatinized starch samples were then subjected to different nucleation temperatures (A–F) and different numbers of nucleation steps (N) and propagation steps (P). Each propagation step was conducted at 120° C. for 3 hours. For each sample, the resistant starch III was isolated immediately after all of the nucleation steps were completed for determination of yield of the resistant starch III, based upon the original, or starting starch (Hylon VII). The isolation of the resistant starch III and the determination of yield were performed on the samples using the method set forth in Example 1B above.

A flow chart of the procedure for obtaining the samples for determination of yield is:

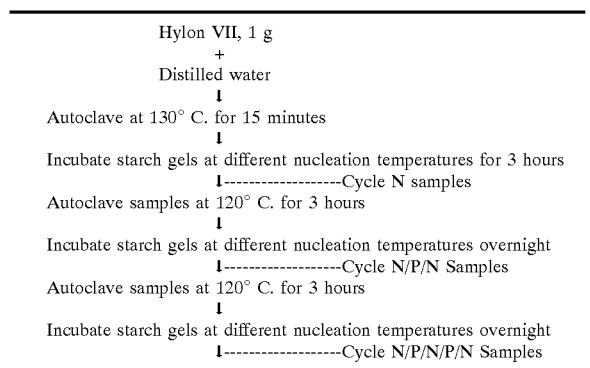

Cycle N Samples (One Nucleation Step and No Propagation Step)

Thus, to obtain the cycle N samples, the gelatinized starch slurry was cooled at a cooling rate of about 2° C./min to its nucleation temperature of either 4° C., 20° C. (room temperature), 40° C., 60° C., 80° C., or 100° C. Each of the gelatinized starch slurry samples was then incubated at its nucleation temperature for three hours to nucleate crystals of enzyme resistant starch type III.

Some of the samples were then cooled at a rate of about 1° C./min to freeze them. The frozen gel was then freeze dried at a temperature of about −30° C. and a pressure of about 10 mTorr to a moisture content of about 0 to 2% by weight to obtain samples which had been subjected to only one nucleation step and no propagation steps (Samples N1-A, N1-B, N1-C, N1-D, N1-E, and N1-F). The resistant starch type III was immediately isolated from each of the latter samples to determine the yield of resistant starch III based upon the original, or starting starch (Hylon VII).
Cycle N/P/N Samples (Two Nucleation Steps, One Propagation Step)

To obtain the cycle NPN samples, the remaining samples, were heated at a rate of about 6° C./min to a crystal propagating temperature of 120° C. and autoclaved at that temperature for about 3 hours to grow crystals of resistant starch type III. These samples were then cooled at a rate of about 2° C./min to their nucleation temperature of either 4° C., 20° C. (room temperature), 40° C., 60° C., 80° C., or 100° C. Each of these sample incubated at its nucleation temperature overnight (about 18 hours) to nucleate crystals of enzyme resistant starch III.

Some of the samples were then cooled at a rate of about 1° C./min to freeze them. The frozen gel was then freeze dried at a temperature of about −30° C. and a pressure of about 10 mTorr to a moisture content of about 0 to 2% by weight to obtain samples which had been subjected to two nucleation steps and one propagation step (Samples N2-A, N2-B, N2-C, N2-D, N2-E, and N2-F). The resistant starch type III was immediately isolated from each of the latter samples to determine the yield of enzyme resistant starch III based upon the original, or starting starch (Hylon VII).
Cycle N/P/N/P/N Samples (Three Nucleation Steps and Two Propagation Steps)

To obtain the N/P/N/P/N samples, the remaining samples, were heated at a rate of about 6° C./min to a crystal propagating temperature of 120° C. and autoclaved at that temperature for about 3 hours to grow crystals of resistant starch type III. These samples were then cooled at a rate of about 2° C./min to their nucleation temperature of either 4° C., 20° C. (room temperature), 40° C., 60° C., 80° C., or 100° C. Each of these samples was incubated at its nucleation temperature overnight (about 18 hours) to nucleate crystals of resistant starch III.

Some of the samples were then cooled at a rate of about 1° C./min to freeze them. The frozen gel was then freeze dried at a temperature of about −30° C. and a pressure of about 10 mTorr to a moisture content of about 0 to 2% by weight to obtain samples which had been subjected to three two nucleation steps and two propagation steps (Samples N3-A, N3-B, N3-C, N3-D, N3-E, and N3-F). The resistant starch type III was immediately isolated from each of the latter samples to determine the yield of enzyme resistant starch III based upon the original, or starting starch (Hylon VII).

The isolation of the resistant starch III and the determination of yield were performed on the samples using the method set forth in Example 1B above. MDSC was used as in Example 1C above to characterize the crystallinity of enzyme resistant starch type III that has a melting point or endothermic peak of over 140° C.

The results of the analyses for yields of enzyme resistant starch III obtained at the different nucleation temperatures and different numbers of nucleation steps are presented in Table 2:

TABLE 2

Effect of Nucleation Temperature and Cycles on Yield of Resistant Starch III

| Sample | Nucleation Temperature (° C.) | Nucleation Steps | Propagation Steps at 120° C. for 3 hrs | Yield of Resistant Starch (%, dry basis) | % Change in Yield Compared to Yield at 20° C. (R.T.) |
| --- | --- | --- | --- | --- | --- |
| N1-A | 4° C. | 1 | 0 | 16.6 | −0.6 |
| N1-B | 20° C. (R.T.) | 1 | 0 | 16.7 | 0 |
| N1-C | 40° C. | 1 | 0 | 16.3 | −2.4 |
| N1-D | 60° C. | 1 | 0 | 18.0 | 7.8 |
| N1-E | 80° C. | 1 | 0 | 17.4 | 4.2 |
| N1-F | 100° C. | 1 | 0 | 17.5 | 4.8 |
| N2-A | 4° C. | 2 | 1 | 22.3 | 0.45 |
| N2-B | 20° C. (R.T.) | 2 | 1 | 22.2 | 0 |
| N2-C | 40° C. | 2 | 1 | 22.1 | −0.45 |
| N2-D | 60° C. | 2 | 1 | 24.0 | 8.1 |
| N2-E | 80° C. | 2 | 1 | 24.5 | 10.4 |
| N2-F | 100° C. | 2 | 1 | 22.9 | 3.1 |
| N3-A | 4° C. | 3 | 2 | 26.8 | 0.75 |
| N3-B | 20° C. (R.T.) | 3 | 2 | 26.6 | 0 |
| N3-C | 40° C. | 3 | 2 | 26.7 | 0.38 |
| N3-D | 60° C. | 3 | 2 | 28.7 | 7.9 |
| N3-E | 80° C. | 3 | 2 | 30.6 | 15 |
| N3-F | 100° C. | 3 | 2 | 27.6 | 3.8 |

In Table 2, the percentage change in yield is calculated relative to the yield at 20° C. (room temperature) for a given number of nucleation steps. For example, for Sample N1-D (one nucleation step) the percentage change in yield is calculated relative to the yield for Sample N1-B (one nucleation step at 20° C.): (18.0–16.7)/16.7×100%=7.8%.

As shown in Table 2, for a given number of nucleation steps: nucleation temperatures of 60° C. to 100° C. resulted in unexpectedly higher yields of resistant starch III compared to the yields obtained at nucleation temperatures of 4° C. to 40° C. For example, for one nucleation step, the yield of resistant starch III was from 4.2% higher to 7.8% higher at nucleation temperatures of 60° C. to 100° C. compared to the yield at 20° C. For two nucleation steps, the yield of resistant starch III was from 3.1% higher to 10.4% higher at nucleation temperatures of 60° C. to 100° C. compared to the yield at 20° C. For three nucleation steps, the yield of resistant starch III was from 3.8% higher to 15% higher at nucleation temperatures of 60° C. to 100° C. compared to the yield at 20° C. For two or more nucleation steps, the highest yields were obtained at a nucleation temperature of 80° C. and the yield declined at a nucleation temperature of 100° C.

Also, as shown in Table 2, for a given nucleation temperature, the yield of resistant starch III that has a melting point over 140° C. substantially increases with an increasing number of nucleation and propagation steps. For example, at a nucleation temperature of 80° C., the yield of resistant starch III that has a melting point over 140° C. is unexpectedly about 1.75 times higher (30.6/17.4=1.75) after three nucleation steps and two propagation steps (Sample N3-E yield of 30.6%) compared to the yield obtained after one nucleation step and no propagation step (Sample N1-E yield of 17.4%).

EXAMPLE 6

Effect of heat Treatment Upon Yield

In this example, the effect of heat treatment upon yield of resistant starch type III was evaluated by subjecting samples of a resistant starch III ingredient or bulking agent having different moisture contents to the same heat treatment temperature and time. The heat treatment temperature was about 130° C. and the heat treatment time was one hour for each sample. The resistant starch samples having different moisture contents were obtained from the same non-heat treated resistant starch III ingredient or "two-stage product." The "two-stage product" was produced using a gelatinization stage (stage 1) and a nucleation/propagation stage (stage 2), but no heat treatment or third stage.

A LIST mixer model #AP80 equipped with three jacketed barrel segments and internally heated mixing shafts was used to produce the "two-stage product" or non-heat-treated resistant starch ingredient. The starting starch was Hylon VII, a corn starch containing about 70% amylose and a moisture content of about 11% by weight, produced by National Starch and Chemical Company, Bridgewater, N.J. Hylon VII in an amount of about 18 parts by weight (wet basis) and about 33.4 parts by weight of water were added to the LIST mixer and admixed and heated to obtain a substantially homogenous starch gel. The weight ratio of the starch to the water was about 0.54:1. The pressure in the LIST mixer was about 27 psi during heating up to the gelatinization temperature. The mixture was heated for about 1 hour to at least substantially gelatinize the starch while the temperature of all 3 segments and shafts were 130° C.

The gelatinized starch was then subjected to six cycles of crystal nucleation and propagation within the LIST mixer. In the first cycle, the gelatinized starch was cooled to a nucleation temperature of about 70° C. within about 15 minutes. The gelatinized starch was then maintained at about 70° C. overnight (about 14 hours) to nucleate crystals of enzyme resistant starch III. The starch was then heated to a crystal propagating temperature of about 130° C. within about 20 minutes. The temperature of 130° C. was applied for about 3 hours to grow crystals of enzyme resistant starch type III.

In the second cycle, starch was cooled to a nucleation temperature of about 70° C. within about 20 minutes. The gelatinized starch was then maintained at about 70° C. for about 3 hours to nucleate crystals of enzyme resistant starch III. The starch was then heated to a crystal propagating temperature of about 130° C. within about 20 minutes. The temperature of 130° C. was applied for about 2 hours to grow crystals of enzyme resistant starch type III.

In the third cycle, the starch was cooled to a nucleation temperature of about 70° C. within about 20 minutes. The gelatinized starch was then maintained at about 70° C. overnight (about 12.5 hours) to nucleate crystals of enzyme resistant starch III. The starch was then heated to a crystal propagating temperature of about 130° C. within about 30 minutes. The temperature of 130° C. was applied for about 1 hour to grow crystals of enzyme resistant starch type III.

In each of the fourth, fifth and sixth cycles, the starch was cooled to a nucleation temperature of about 70° C. within about 20 minutes. The gelatinized starch was then maintained at about 70° C. for about 1 hour to nucleate crystals of enzyme resistant starch III. The starch was then heated to a crystal propagating temperature of about 130° C. within about 20 minutes. The temperature of 130° C. was applied for about 1 hour to grow crystals of enzyme resistant starch type III.

The samples having different moisture contents were obtained by: 1) subjecting the wet, enzyme resistant starch type III ingredient to oven drying at 80° C. for varied times to obtain samples with the different moisture contents in the target range of about 2% by weight to about 20% by weight, and 2) adding water to a sample which had been dried at 80° C. to a moisture content of about 2% to obtain samples having a desired target water content of about 2% by weight to about 20% by weight.

The samples were subjected to grinding and sieved through a No. 20 Mesh screen and through a No. 80 mesh screen to obtain particles having a sieve analysis of less than about 355 μm but greater than 45 μm.

The moisture content of a portion of each sample was measured by drying in an air oven at 130° C. for one hour. The non-heat-treated resistant starch ingredient used as a control had a moisture content of about 1.6% by weight. The enzyme resistant starch type III content or yield for the control was about 33.4% by weight as determined by the procedure of Example 1B.

The heat treatment was conducted by autoclaving about 8 grams of each sample at a temperature of about 130° C. for one hour without covering the samples. Each sample was then cooled to room temperature.

The moisture content of a portion of each heat treated sample was then measured by drying in an air oven at 130° C. for one hour and discarded after the moisture measurement. Another approximately 1 gram portion of each sample was treated to isolate the enzyme resistant starch and to determine the yield of enzyme resistant starch, based upon the original, or starting starch (Hylon VII). The isolation of the enzyme resistant starch and the determination of yield were performed on the samples using the method set forth in Example 1B above.

The melting profile or thermal characteristics of the enzyme resistant starch samples were determined by modulating differential scanning calorimetry (MDSC). The MDSC method was the same as described in Example 1C above.

The heat treatment temperature and times, moisture contents before and after heat treatment, the yields of enzyme resistant starch after heat treatment, and the % change in yield resulting from the heat treatment compared to the yield obtained without the heat treatment (control) are presented in Table 3. Also presented in Table 3, and as shown in FIGS. 5A through 5F are the onset of melting, the melting point peak, the end point of melting, the bulk ingredient enthalpy of the crystalline melt (J/g) and the enzyme resistant starch enthalpy of the crystalline melt (J/g) for several of the samples:

enzyme resistant starch having a melting point greater than about the temperature of heat treating.

EXAMPLE 7

Effect of Nucleation/Propagation Temperatures Upon Yield

In this example, the effect of nucleation temperature and propagation temperature upon yield of enzyme resistant starch type III was evaluated by subjecting samples of a gelatinized starting starch to the same nucleation and propagation times, but different nucleation and propagation temperatures, for a given number of cycles.

Hylon VII, a corn starch containing about 70% amylose, and having a moisture content of about 11% by weight was used as a starting starch to produce each sample of resistant

TABLE 3

Effect of Heat Treatment Moisture Content on Yield of Resistant Starch III

| Sample | Moisture Content before Heat Treatment (weight %) | Heat Treatment Time and Temperature (hrs, ° C.) | Moisture Content after Heat Treatment (weight %) | Yield of Resistant Starch III After Heat Treating (%, dry basis) | % Change in Yield Compared to Yield without Heat Treatment | Onset of Melting for RS Isolate (° C.) | Melting Point Peak for RS Isolate (° C.) | End Point of Melting for RS Isolate (° C.) | Bulk Ingredient Enthalpy of Crystalline Melt (J/g) | Enzyme Resistant Starch Enthalpy of Crystalline Melt (J/g) |
|---|---|---|---|---|---|---|---|---|---|---|
| Control | 1.6 | none | no heat treatment | 33.4 | 0 | 122° C. | 151.8° C. | 166.1 | 2.0 | 9.9 |
| MC-2 | 1.6 | 1 hr at 130° C. | 8.3 | 37.9 | 13.5 | — | — | — | — | — |
| MC-2-10 | 10 | 1 hr at 130° C. | 11.6 | 42.9 | 28.4 | — | — | — | — | — |
| MC-2-20 | 20 | 1 hr at 130° C. | 17.9 | 44.3 | 32.6 | 127.7 | 151.3 | 163 | — | 8.0 |
| MC-10 | 14.8 | 1 hr at 130° C. | 15.0 | 45.6 | 36.5 | 129.6 | 151.1 | 164.3 | 1.4 | 8.5 |
| MC-15 | 18.4 | 1 hr at 130° C. | 18.3 | 45.7 | 36.8 | 129.6 | 151.2 | 165.2 | — | 8.9 |
| MC-20 | 24 | 1 hr at 130° C. | 23.0 | 43.0 | 28.7 | — | — | — | — | — |

In Table 3, the percentage change in yield is calculated relative to the 33.4% yield of resistant starch III in the resistant starch ingredient control which has not been heat treated. For example the percentage change in yield for Sample MC-2 is calculated as: (37.9−33.4/33.4×100%= 13.5%.

As shown in Table 3, the heat treatment of the resistant starch III ingredient or bulking agent unexpectedly increased the yield of the resistant starch III by about 13.5% to about 36.8% compared to the yield of resistant starch III without heat treating (control). Also as shown in Table 3, the amount of increase in yield depended upon the moisture content of the resistant starch III ingredient during heat treatment. The highest increases in yield were obtained when the moisture content during heat treatment was about 15% by weight to about 18.3% by weight.

As shown in Table 3 and in FIGS. 5A through 5F, the heat-treatment of the enzyme resistant starch increased the yield of enzyme resistant starch but the enthalpy decreased (from 9.9 J/g for the control without heat-treatment). As shown by a comparison of the MDSC curve shown in FIG. 5A with the MDSC curves of FIGS. 5B–5F no additional crystalline or amylose-lipid peaks resulted from the heat-treatment. In fact, the small amylose-lipid peak (melting point 99.8° C., enthalpy of 0.81 J/g) observed for the control (FIG. 5A) is absent in the MDSC curves shown for the heat-treated samples (FIGS. 5B through 5F). These results indicate that the heat-treatment destroys amylose-lipid complexes or lower melting crystals, while: 1) increasing the amount of non-crystalline enzyme resistant starch, and 2) retaining at least a substantial portion of the crystalline starch bulking agent. For each sample, Hylon VII in an amount of 5 g (wet basis) and water were admixed to obtain a substantially homogenous 40% by weight starch slurry. Each starch slurry was autoclaved at about 130° C. for about 15 minutes to at least substantially gelatinize the starch.

The gelatinized starch samples were then subjected to different nucleation and propagation temperatures and steps. Each propagation step was conducted for 3 hours. For each sample, the resistant starch III was isolated immediately after all of the nucleation steps were completed for determination of yield of the resistant starch III, based upon the original, or starting starch (Hylon VII). The isolation of the resistant starch III and the determination of yield were performed on the samples using the method set forth in Example 1B above.

The procedure for gelatinization, nucleation/propagation temperature cycling conditions, and analysis was:

Procedure

1. Weigh 5 g of Hylon VII into pressure tube and add water to make 40% starch slurry.
2. Autoclave at either 120° C. or 130° C. for 15 minutes.
3. Nucleate at either 70° C. or 4° C. for 3 hours.
4. Propagate at either 120° C. or 130° C. for 3 hours.
5. Nucleate at either 70° C. or 4° C. overnight (18 hours).
6. Propagate at either 120° C. or 130° C. for 3 hours.
7. Nucleate at either 70° C. or 4° C. overnight (18 hours).
8. Freeze dry the starch gels.
9. Determine RS yield by Prosky method and analyze the bulk RS ingredients by MSDC.

The isolation of the resistant starch III and the determination of yield were performed on the samples using the method set forth in Example 1B above. MDSC was used as in Example 1C above to characterize the crystallinity of enzyme resistant starch type III that has a melting point or endothermic peak of over 140° C.

The results of the analyses for yields of enzyme resistant starch III obtained at the different nucleation and propagation temperatures and different numbers of cycles are presented in Table 4. In Table 4, the N/P cycle number is equal to: a) the number of propagation steps, and b) the number of nucleation steps minus one:

TABLE 4

RS Yield and DSC Characteristics Of Freeze Dried Starch Gels (Bulk RS Ingredient)

| Propagation Temperature (° C.) | Nucleation Temperature (° C.) | N/P Cycle (number) | RS Yield (%, db) | DSC of Bulk RS Ingredient | |
|---|---|---|---|---|---|
| | | | | Enthalpy (ΔH, J/g) | Peak Temp. (° C.) |
| 120 | 4 | 0 | 19.6 | — | — |
| 120 | 4 | 1 | 23.4 | — | — |
| 120 | 4 | 2 | 26.8 | 1.80 | 143.97 |
| 120 | 70 | 0 | 20.2 | — | — |
| 120 | 70 | 1 | 24.8 | — | — |
| 120 | 70 | 2 | 27.2 | 1.83 | 143.45 |
| 130 | 4 | 0 | 19.3 | — | — |
| 130 | 4 | 1 | 24.8 | — | — |
| 130 | 4 | 2 | 29.4 | 2.29 | 145.92 |
| 130 | 70 | 0 | 19.5 | — | — |
| 130 | 70 | 1 | 26.7 | — | — |
| 130 | 70 | 2 | 31.1 | 2.61 | 146.77 |

As shown in Table 4, for a given number of cycles, the highest yields of enzyme resistant starch are obtained using the higher nucleation temperature of 70° C. and the higher propagation temperature of 130° C. Also as shown in Table 4, increasing the number of cycles increases the yield of enzyme resistant starch.

Increased amounts or yields of the high melting enzyme resistant starch (melting point peaks in the range of about 143° C. to about 147° C.) and greater enthalpy at the high melting point peaks are obtained at a 70° C. nucleation temperature compared to a 4° C. nucleation temperature. This effect is enhanced at a propagation temperature of 130° C. compared to a propagation temperature of 120° C.

Also, both the mass of enzyme resistant starch (as measured by the modified Prosky test of Example 1B) and the MDSC enthalpy of the crystalline melt at the melting point peaks (about 143° C. to about 147° C.) each increase. This indicates that the enzyme resistant starch produced through Stage 2 (gelatinization and nucleation/propagation temperature cycling, but no heat-treatment) is a high melting (melting point peak greater than about 140° C.) crystalline resistant starch type III.

EXAMPLE 8

Heat Treatment of Enzyme Resistant Granular Starch

In this example, a commercially available enzyme resistant granular starch ingredient (an RS type III ingredient) Novelose 240 (produced by National Starch and Chemical Co.) is heat treated to increase the yield of enzyme resistant starch. A 1 gram sample of the Novelose 240 resistant starch type II ingredient was subjected to heat treatment to increase the yield of enzyme resistant starch. The heat treatment was conducted by autoclaving the one gram sample at 130° C. for one hour.

After the heat treatment, the enzyme resistant starch was isolated from the heat-treated, enzyme resistant starch ingredient to determine its yield based upon the original, or starting starch (Novelose 240). The isolation of the enzyme resistant starch and the determination of yield were performed on the heat-treated sample as well as on a non-heat-treated Novelose 240 sample using the method set forth in Example 1B above. The yield of enzyme resistant starch was found to be about 38% for the heat-treated sample and about 32% for the non-heat-treated sample. Thus, the heat treatment resulted in an unexpectedly superior increase in the yield of enzyme resistant starch.

The melting profile or thermal characteristics of the isolated, heat-treated resistant starch type II samples were determined by modulating differential scanning calorimetry (MDSC). The MDSC method was the same as described in Example 1C above.

Figure 7:
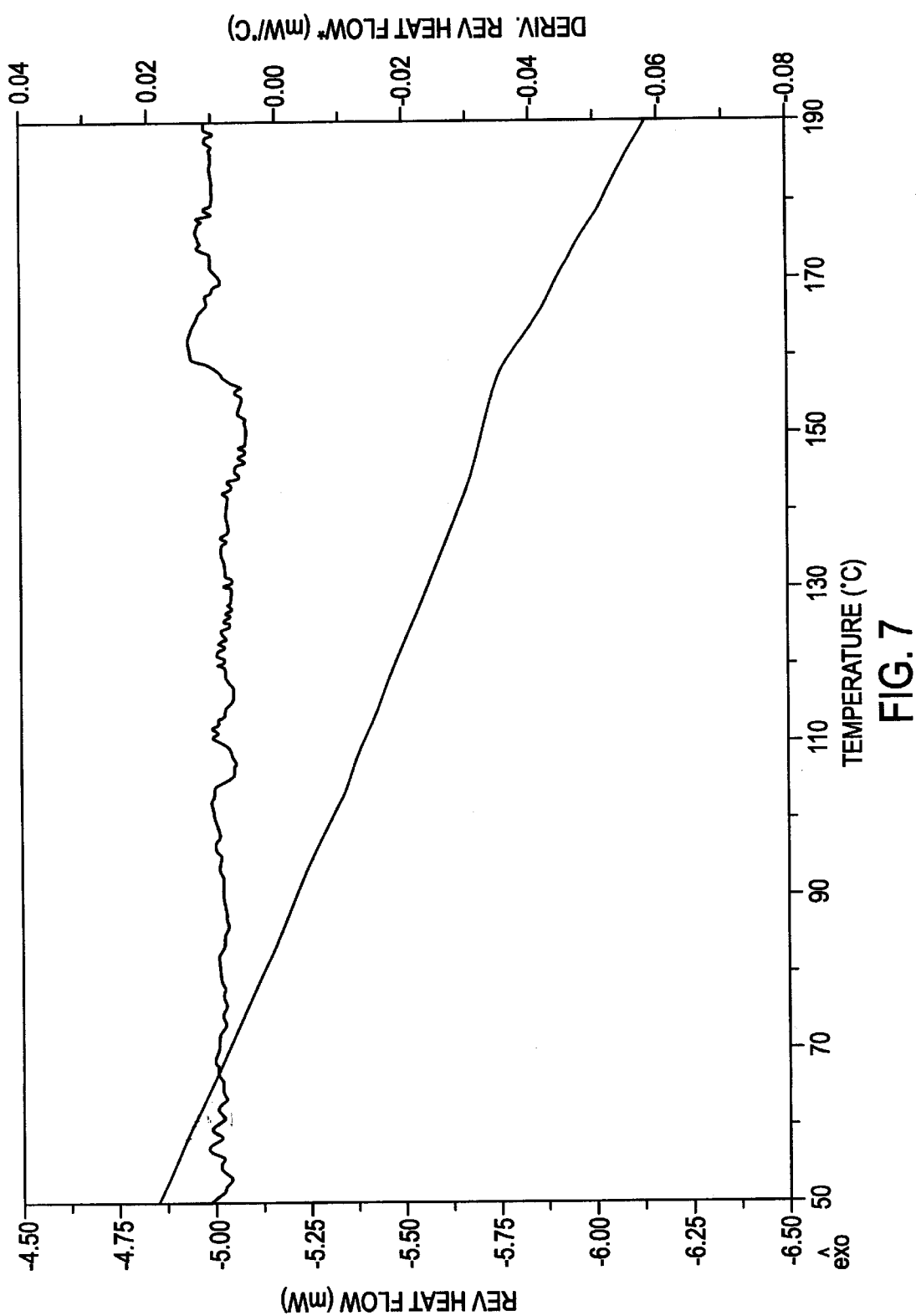
FIG. 7 shows a MDSC curve for an isolated, non-heat-treated enzyme-resistant granular starch type II (Novelose 240) of Example 8.
Figure 8:
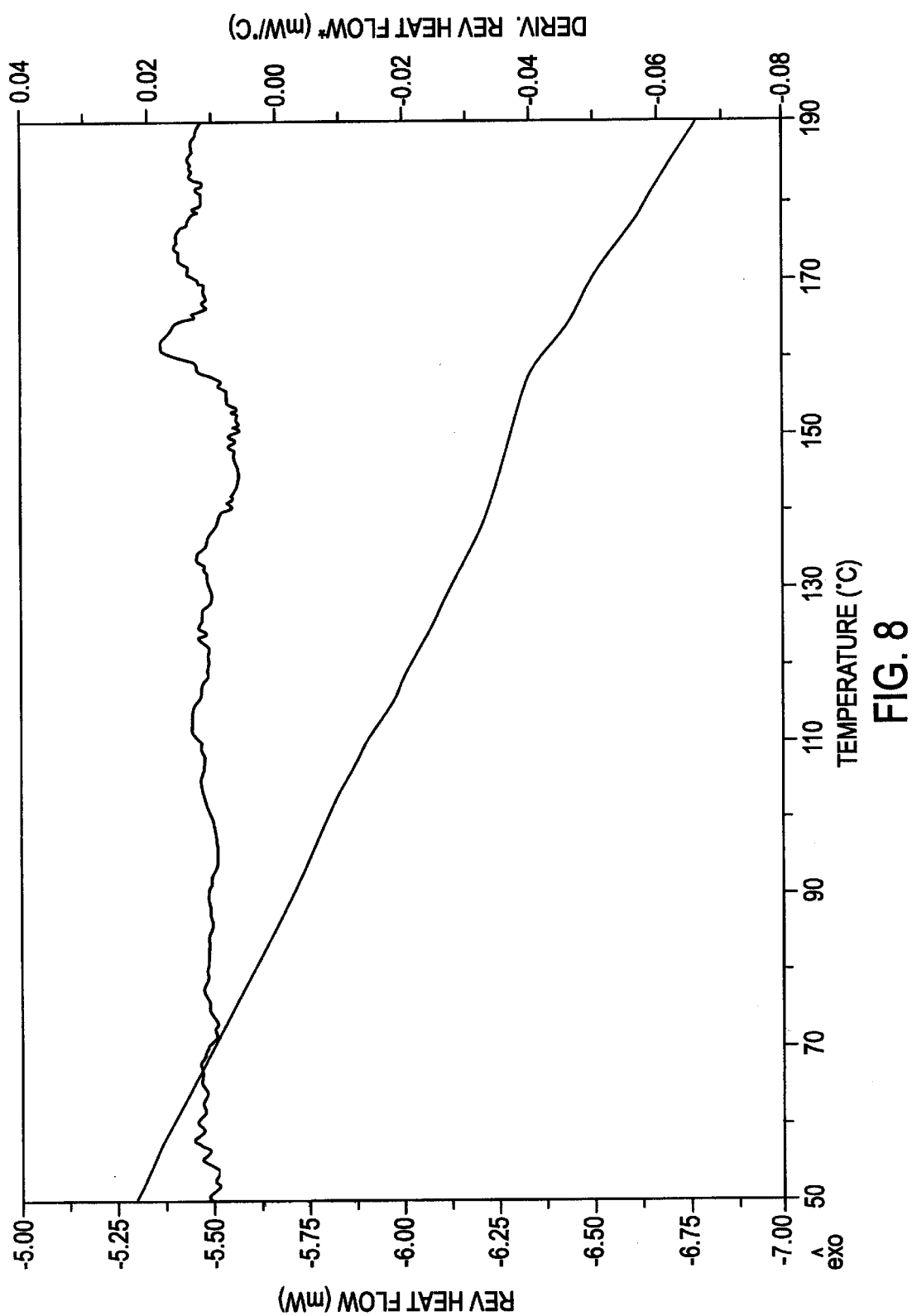
FIG. 8 shows a MDSC curve for an isolated, heat-treated enzyme-resistant granular starch type II, obtained in Example 8 by heat-treating a sample of the enzyme-resistant granular starch type II (Novelose 240) bulking agent of Example 8 at a heat-treating temperature of 130° C. for one hour, followed by isolation of the RS from the heat-treated bulking agent.

The results of the MDSC analysis for the isolated, non-heat-treated Novelose 240 sample is shown in FIG. 7. The results of the MDSC analysis for the isolated, heat-treated Novelose 240 sample is shown in FIG. 8. As shown in FIGS. 7 and 8, neither sample exhibits any endothermic melting peak in the range of 50° C. to 190° C. and the enthalpy is 0 J/g. This indicates that none of the enzyme resistant starch in the Novelose 240 samples, before or after heat-treatment is a high melting resistant starch type III. Accordingly, it is believed that the heat treatment increases the amount of non-crystalline or amorphous enzyme resistant starch.

EXAMPLE 9

Heat Treatment of enzyme Resistant Retrograded Starch

In this example, a commercially available enzyme resistant retrograded starch ingredient (an RS type III ingredient) Novelose 330 (produced by National Starch and Chemical Co.) is heat treated to increase the yield of enzyme resistant starch. The Novelose 330 has a moisture content of about 7% by weight, a resistant starch content of about 25% by the method of Example 1B, and a dietary fiber content by the less stringent AOAC method of about 33%. The Novelose 330 in an amount of about 150 grams was admixed with 20.12 ml of water to adjust its moisture content to about 18% by weight. The heat treatment was conducted by autoclaving the resulting sample at 130° C. for one hour. The heat-treated sample was cooled, for analysis.

Figure 9:
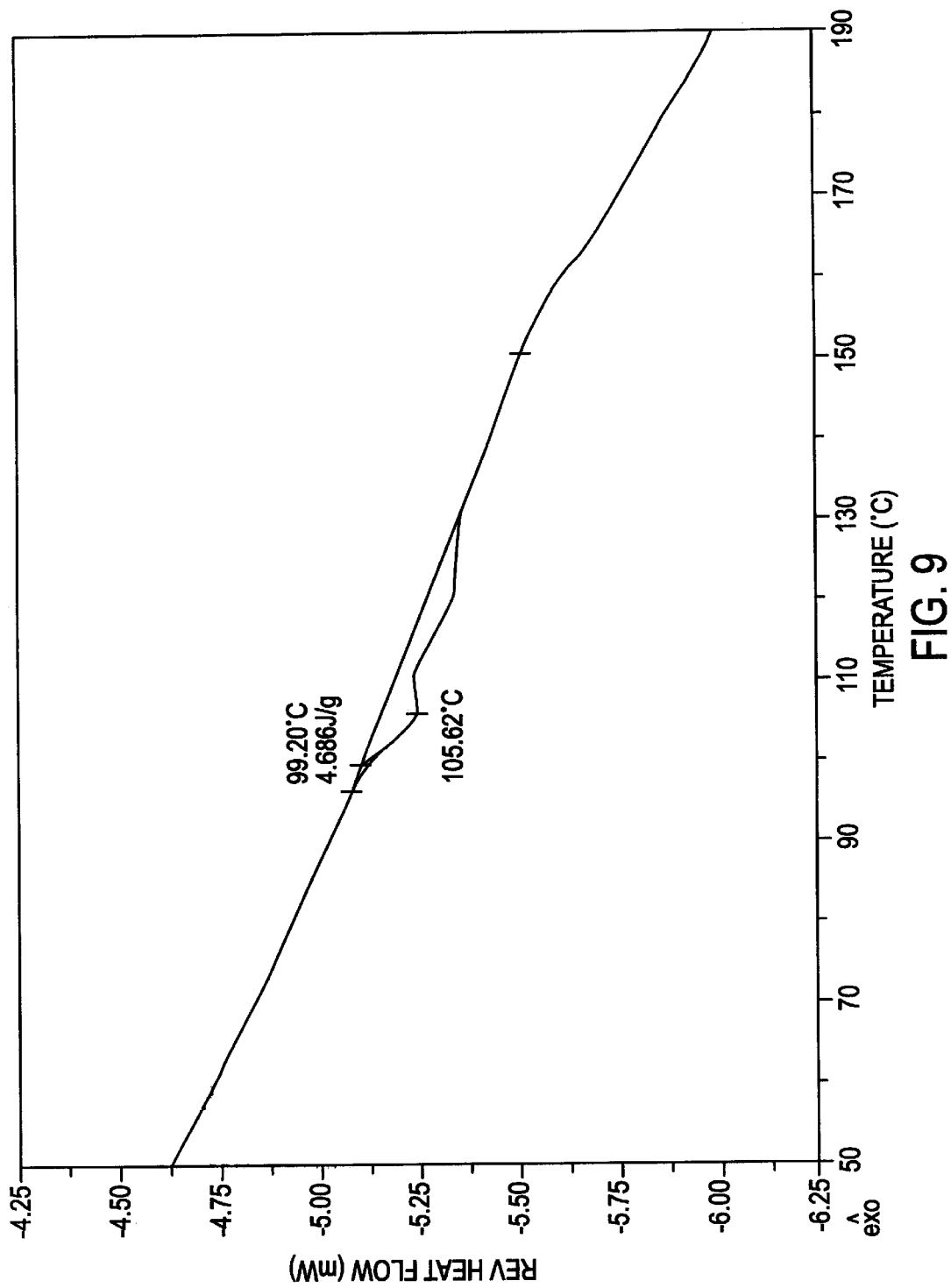
FIG. 9 shows a MDSC curve for a non-heat-treated enzyme-resistant retrograded starch (an RS type III ingredient, Novelose 330) bulk ingredient of Example 9.
Figure 10:
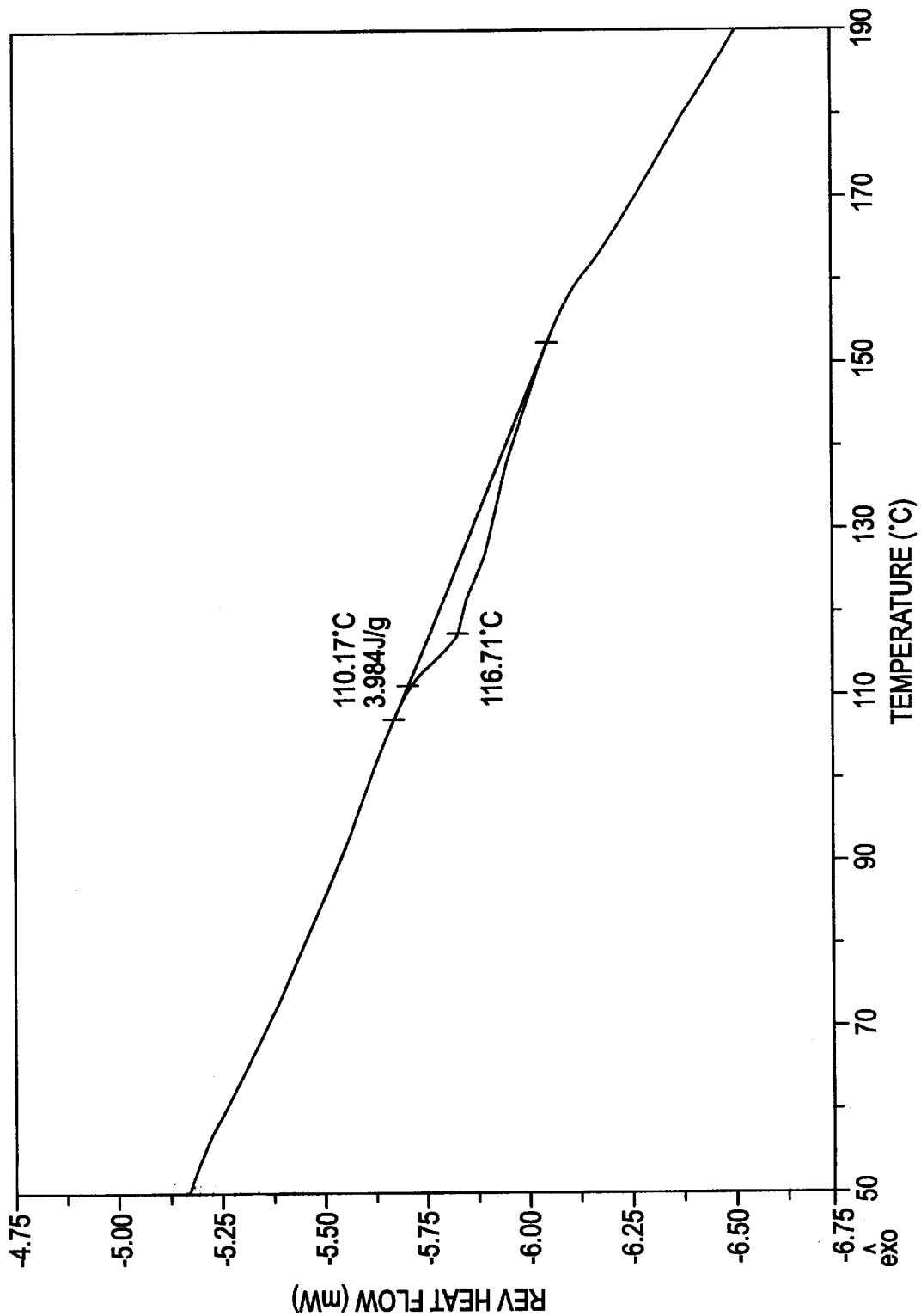
FIG. 10 shows a MDSC curve for a heat-treated enzyme-resistant retrograded starch (an RS type III ingredient) bulk ingredient, obtained in Example 9 by heat-treating a sample of the enzyme-resistant retrograded starch (novelose 330) bulking agent of Example 9 at a heat-treating temperature of 130° C. for one hour.

The enzyme resistant starch was isolated from the heat-treated, enzyme resistant starch ingredient to determine its yield based upon the original, or starting starch (Novelose 330). The isolation of the enzyme resistant starch and the determination of yield were performed on the heat-treated sample using the method set forth in Example 1B above. The total dietary fiber content was also determined using the AOAC method. The yield of enzyme resistant starch was found to be about 42.4% and total dietary fiber content by the AOAC method was found to be about 56.6% for the heat-treated sample. Thus, the heat treatment resulted in an unexpectedly superior increase in the yield of enzyme resistant starch and total dietary fiber. Also, MDSC analysis of non-heat-treated Novelose 330 and heat-treated Novelose 330 performed as in Example 1C indicates no melting point peak at a temperature greater than about 140° C., as shown in FIGS. 9 and 10. A peak is shown in FIG. 9 at 105.62° C.

for the non-heat-treated sample, and a peak is shown in FIG. 10 at 116.71° C. for the heat-treated sample.

EXAMPLE 10

Baking Functionality Resistant Starch Ingredients

In this example, the baking functionality of enzyme resistant starches prepared in accordance with the present invention was compared to the baking functionality of commercially available, enzyme resistant starch ingredients (Novelose 240 and Novelose 330 (produced by National Starch and Chemical Co.) using conventional, non-heat-treated wheat flour as a control. The baking functionality was evaluated by measurement of cookie width or spread. Resistant starch ingredients which resulted in a cookie width as close to the width achieved with the wheat flour control were considered to have the best baking functionality.

The resistant starch content or yield for each starch ingredient was measured using the method of Example 1B. The total dietary fiber content for each starch ingredient was measured used the AOAC method. The MDSC enthalpy (at a temperature of at least about 140° C.) for the bulk ingredient was measured as in Example 1C.

The cookie test baking method used to evaluate baking functionality of the enzyme resistant starch compositions was the AACC 10-53 Cookie Test Baking Method:

AACC 10-53 Cookie Test Baking Method

The AACC 10-53 Cookie Test Baking Method was designed at Nabisco Biscuit Company for evaluation of ingredient functionality and predictive correlation between sensory and mechanical texture analysis (mechanical texture analysis by Instron 3-point bend or puncture test). The test is an improvement over AACC 10-52 Sugar-Snap Cookie Test Baking Method as confirmed by USDA Soft Wheat Quality Lab (Wooster, Ohio). The AACC 10-53 test was adopted as the official method of the American Association of Cereal Chemists after collaborative testing by the Soft Wheat Quality Committee in 1992. The equipment, cookie dough composition, mixing procedure, baking procedure, measurement procedure, etc. used in the test are:

Equipment

Moisture Analyzer, disposable sample pans for determination of flour moisture.

Digital Thermometer (Omega model 872A) with thermocouple.

C-100 Hobart Mixer with 3-quart mixing bowl and paddle.

National Test Baking Oven.

Aluminum cookie sheet–26 cm width×30 cm length with 2 gauge bars 12 mm width×30 cm length×70 mm height.

Cookie cutter (60 mm internal diameter).

Rolling pin with sleeve (sleeve lines run along length of pin).

Spatulas, brown absorbent paper, aluminum foil, plastic beakers.

TA-XT2 Texture Technologies Corporation. Optional t for dough rheology–special pan dimensions width 10 cm, length 10.5 cm, height 3.2 cm.

Standard Formulation AACC 10-53 Single Batch to Make 4 Test cookies

| Stage-1 | |
|---|---|
| NFDM (nonfat dry milk powder) | 2.25 g |
| Salt | 2.81 g |
| Soda (sodium bicarbonate) | 2.25 g |
| FGS (sucrose, fine granulation) | 94.50 g |
| fat (all vegetable shortening) | 90.00 g |
| Stage-2 | |
| ABC (ammonium bicarbonate) | 1.13 g |
| HFCS (high fructose corn syrup; 42% fructose, 71.5% solids) | 3.38 g |
| Water | 49.50 g |
| Stage-3 | 225.00 g |
| Flour (moisture content 13% by weight) | |

General Mixing Procedure

Stage-1: blend dry ingredients (NFDM, salt, soda, FGS)
 add to fat
 mix in Hobart mixer 3 minutes at low speed
 scrape paddle and sides of bowl after each minute of mixing
Stage-2: dissolve ABC in water; use tap water
 add solution of HFCS;
 add total solution to Stage-1;
 mix 1 min at low speed, scraping bowl and paddle after each 30 sec. mix 2 min at med speed, scraping bowl and paddle after each 30 sec.
Stage-3: add flour to Stage-2;
 fold into liquid mixture 3 times;
 mix 2 min at low speed, scraping bowl and paddle after each 30 sec.

Baketime Determination

The standard baketime is defined as the time required to produce a weight loss of 13.85% during baking of the control formulation at 400° F.

To Measure Standard Baketime

Bake control formulation at 400° F. for 10, 11, 12, 13 minutes.

Plot % weight loss during baking vs. baking time in minutes.

Interpolate baketime required to achieve 13.58% weight loss.

Baking Specifications

Preheat oven to 400° F. (202° C.).

Record weight of cold cookie sheet.

Place cookie sheet in oven for standard baketime; record weight of hot sheet.

Procedure for preparation of 4 dough blanks for cookie test baking: Portion four 60 g pieces of dough with minimum deformation and place on cookie sheet. Lay rolling pin across gauge bars of cookie sheet allowing weight of pin to compress the dough pieces without additional compressive force. Pick up rolling pin and place on gauge bars at end of cookie sheet, and roll ONLY ONCE away from you. Cut cookies with 60 mm cutter, and carefully lift scrap dough with small spatula. Lift cutter straight up to avoid horizontal distortion.

Record weight of dough blanks and cookie sheet.

Place dough blanks and cookie sheet in the oven in the direction of sheeting. Bake cookies at 400° F. for predetermined baketime.

Weigh cookie sheet with cookies on it immediately upon removal from oven. Carefully remove cookies from sheet with flat spatula and place on flat brown paper in the same direction in which they were sheeted and baked.

Geometry Measurements (Taken When Cookies are Cooled at Least, 30 Minutes)

Width—diameter perpendicular to direction of sheeting. Lay 4 cookies in a row with rolling-pin-sleeve lines parallel to length of meter stick. Record measurement in cm. Target is 32.6 cm, with standard deviation <0.3 cm.

Length—diameter parallel to sheeting. Rotate cookies 90° so rolling-pin-sleeve lines are perpendicular to meter stick. Record measurement in cm. Target is 33.0 cm, with standard deviation <0.2 cm.

Stack Height—stack 4 cookies, and place stack on side between flat guides. Record measurement in cm. Gently shuffle cookie order and repeat measurement. Target is 3.90 cm, with standard deviation <0.1 cm.

In testing the resistant starch ingredients, a portion (e.g. 50% by weight) of the wheat flour in the standard dough formulation was replaced by the enzyme resistant starch ingredient to obtain a blend. For each of the starch compositions, the amount of wheat flour replacement, the processing, the enzyme resistant starch content or yield, the AOAC total dietary fiber content, the cookie width and the MDSC enthalpy (at a temperature of at least about 140° C.) for the bulk ingredient are set forth in Table 5:

As shown in Table 5, the heat-treated RS type III ingredient (Sample 2) exhibits both a higher fiber content and unexpectedly superior baking characteristics (cookie width and baked color closest to control) compared to those of: 1) Comparative Example 2, a commercially available, retrograded resistant starch (Novelose 330), or 2) Comparative Example 1, a processed granular starch (Novelose 240) which do not exhibit the high melting point of the RS type III ingredient.

Furthermore, the Stage 3 heat treatment applied to the other resistant starch of Comparative Examples 1 and 2, provides an improvement or enhancement in both the dietary fiber content and baking functionality (cookie width) as shown by a comparison of the results with Samples 3 and 4, respectively. However, the baking functionalities (cookie width) of the heat-treated Novelose ingredients of Samples 3 and 4 are still inferior to the baking functionalities (cookie width) of the heat-treated resistant starch type III of Sample 2.

We claim:

1. A method for producing a starch-based composition comprising an enzyme-resistant starch which has a melting point of at least about 140° C., said method comprising:

TABLE 5

Baking Functionality of RS Ingredients Used To Replace Wheat Flour

| Sample | Starch Ingredient | Wheat Flour Replacement (% by weight) | Processing | RS Content | AOAC Total Dietary Fiber | Cookie Width | Cookie Color L* | a* | b* | MDSC Enthalpy @ >140° C. Bulk Ingredient |
|---|---|---|---|---|---|---|---|---|---|---|
| Control | Wheat Flour | 0 | None | 0% | 3% | 33.0 cm | 72.7 | 6.9 | 31.8 | 0 J/g |
| 1 | Non-Heat Treated RS III Ingredient | 50% | Stage 1 & Stage 2, oven dried | 32% | 37% | 32.4 cm | — | — | — | 1.9 J/g |
| 2 | Heat Treated RS III Ingredient | 50% | Stage 1 & Stage 2 & Stage 3 | 47% | 63% | 35.5 cm | 64.6 | 8.0 | 32.6 | 2.0 J/g |
| Comparative 1 | Novelose 240 | 50% | granular starch | 34% | 64% | 29.3 cm | 82.4 | 2.1 | 27.5 | 0 J/g |
| 3 | Heat Treated Novelose 240 | 50% | granular starch + stage 3 | 46% | 70% | 29.2 cm | — | — | — | 0 J/g |
| Comparative 2 | Novelose 330 | 50% | Retrograded starch | 28% | 33% | 26.3 cm | 80.7 | 2.4 | 18.1 | 0 J/g |
| 4 | Heat Treated Novelose 330 | 50% | Retrograded starch + stage 3 | 43% | 57% | 28.3 cm | — | — | — | 0 J/g |

In Table 5, L*, a*, and b* are standard color measurements of the Committee on International Illuminescence.

The Stage 3 heat treatments were all conducted at 130° C. for one hour at moisture contents of about 18% by weight.

Figure 11:
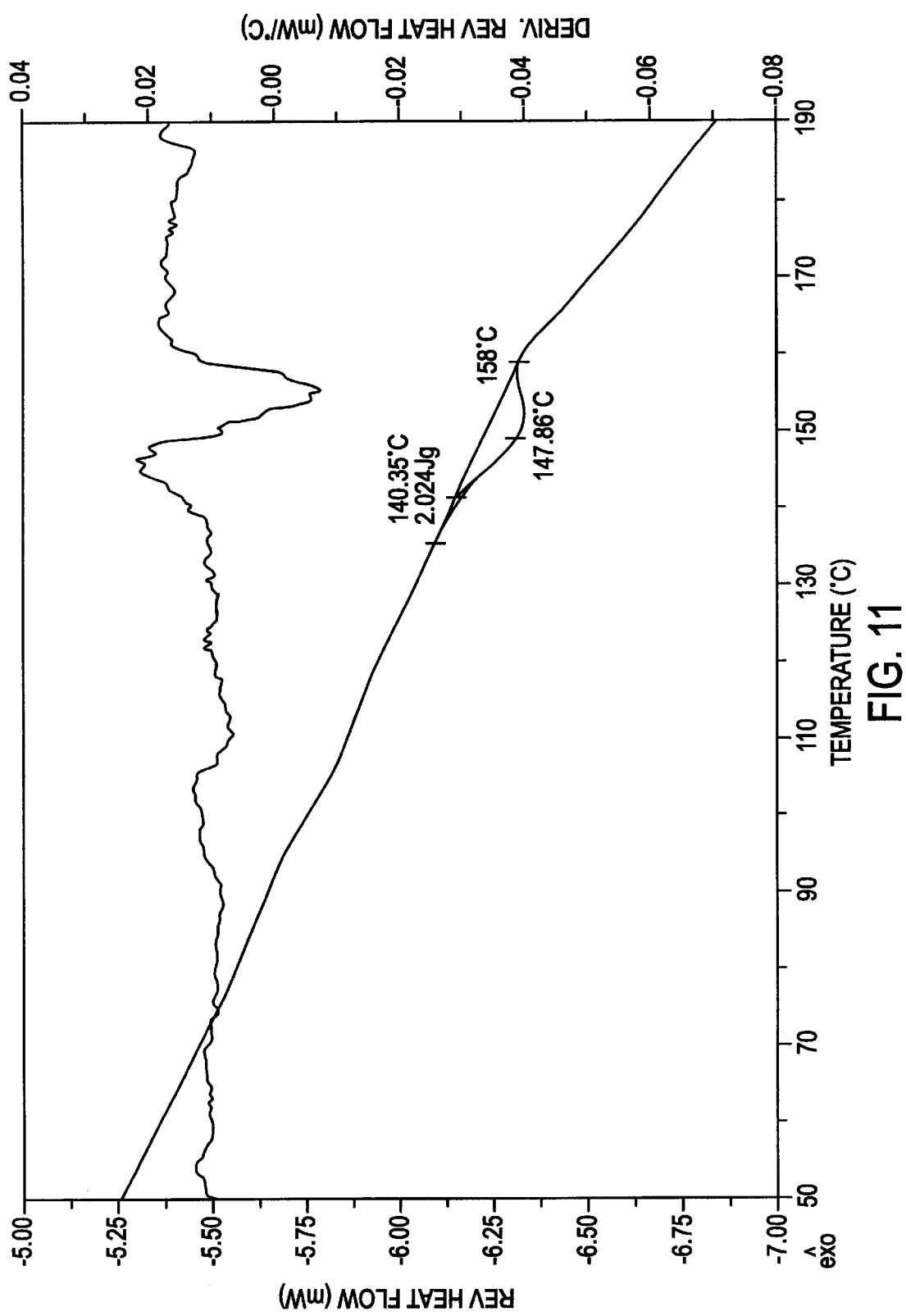
FIG. 11 shows a MDSC curve for a heat-treated enzyme-resistant starch type III bulking agent of Example 10, Sample 2.

As shown in Table 5, samples 1 and 2 were the only enzyme resistant starch ingredients having a high melting point of over 140° C. as evidenced by the MDSC enthalpy of the bulk ingredient. For example, as shown in FIG. 11 an MDSC analysis of the heat-treated enzyme resistant starch type III of Sample 2, performed as in Example 1C, indicates an enthalpy of 2.02 J/g and an onset of melting at about 140.4° C., an endothermic peak or melting point of 147.86° C., and an end point of melting of about 158° C. Also, no additional crystalline or amylose-lipid peaks are shown in FIG. 11 down to a temperature of 50° C.

a) heating a starch ingredient in the presence of water to gelatinize the starch at a temperature above the melting point of any amylose-lipid complex which may be present in the starch ingredient, but below the melting point of said enzyme-resistant starch, b) cooling the gelatinized starch to a nucleating temperature above the melting point of amylopectin starch, c) maintaining the gelatinized starch at said nucleating temperature to nucleate crystals of said enzyme-resistant starch, d) raising the temperature of the gelatinized starch above the melting point of said amylose-lipid complex to a crystal-propagating temperature below the melting point of said enzyme-resistant starch, e) maintaining the temperature of the gelatinized starch at said crystal-propagating temperature to grow crystals of said enzyme-resistant starch, f) cooling the gelatinized starch, and g) drying the gelatinized starch.

2. A method as claimed in claim 1 wherein steps b), c), d), and e) are sequentially repeated in at least one cycle.

3. A method as claimed in claim 2 wherein steps b), c), d), and e) are sequentially performed in a total of from two to four cycles.

4. A method as claimed in claim 3 wherein steps b), c), d), and e) are sequentially performed in four cycles.

5. A method as claimed in claim 2 wherein said nucleating temperature is in the range of from about 55° C. to about 100° C.

6. A method as claimed in claim 2 wherein said crystal-propagating temperature is in the range of from about 115° C. to about 135° C.

7. A method as claimed in claim 1 wherein said nucleating temperature is in the range of from about 60° C. to about 80° C. and said crystal-propagating temperature is in the range of from about 120° C. to about 130° C.

8. A method as claimed in claim 1 wherein the starch ingredient has linear chains of at least about 20 glucose units.

9. A method as claimed in claim 1 wherein the starch ingredient has linear chains of at least about 100 glucose units.

10. A method as claimed in claim 1 wherein the amylose content of said starch ingredient is at least about 50% by weight, based upon the total weight of amylose and amylopectin.

11. A method as claimed in claim 1 wherein the starch ingredient comprises amylomaize starch.

12. A method as claimed in claim 1 wherein the starch ingredient comprises a legume starch.

13. A method as claimed in claim 12 wherein the legume starch comprises wrinkled pea starch.

14. A method as claimed in claim 1 wherein said starch ingredient comprises brewer's spent grain.

15. A method as claimed in claim 1 wherein during nucleation and propagation of crystals of said enzyme-resistant starch the starch-to-water weight ratio is from about 0.15:1 to about 1:1.

16. A method as claimed in claim 1 wherein seed crystals of said enzyme-resistant starch are admixed with the gelatinized starch at a temperature above the melting point of said amylose-lipid complex to provide nucleation sites from which to propagate crystals of said enzyme-resistant starch.

17. A method as claimed in claim 1 wherein said gelatinized starch ingredient is subjected to enzymatic treatment with pullulanase to debranch at least a portion of the starch, and the debranched starch is subjected to said nucleating temperature to nucleate crystals of said enzyme-resistant starch.

18. A method as claimed in claim 1 wherein seed crystals of said enzyme-resistant starch are admixed with the debranched starch at a temperature above the melting point of said amylose-lipid complex to provide nucleation sites from which to propagate crystals of said enzyme-resistant starch.

19. A method as claimed in claim 18 wherein said starch ingredient is gelatinized in a scraped-surface heat exchanger.

20. A method as claimed in claim 16 wherein said seed crystals are obtained by enzymatic isolation from a mixture comprising said enzyme-resistant starch and a lower melting-point starch.

21. A method as claimed in claim 1 wherein said crystals of enzyme-resistant starch are subjected to enzymatic treatment with a debranching enzyme.

22. A method as claimed in claim 1 wherein after drying, the gelatinized starch is subjected to heat treatment to increase the enzyme-resistant starch content of the starch-based composition.

23. A method as claimed in claim 22 wherein said heat treatment is conducted at a temperature of from about 100° C. to about 140° C.

24. A method as claimed in claim 22 wherein said heat treatment is conducted at a temperature of from about 125° C. to about 135° C.

25. A method as claimed in claim 22 wherein said heat treatment is conducted at a moisture content of from about 1% by weight to about 30% by weight.

26. A method as claimed in claim 24 wherein said heat treatment is conducted at a moisture content of from about 14% by weight to about 24% by weight.

27. A method as claimed in claim 24 wherein prior to said heat treatment, the dried, gelatinized starch is ground.

28. A method for increasing the enzyme-resistant starch content or total dietary fiber content of an enzyme-resistant starch composition, comprising subjecting said composition to heat treatment at a temperature of from about 100° C. to about 140° C., the moisture content of said composition during the heat treatment being from about 14% by weight to about 24% by weight.

29. A method as claimed in claim 28 wherein the enzyme-resistant starch composition which is subjected to said heat treatment comprises a retrograded, enzyme-resistant starch.

30. A method as claimed in claim 28 wherein the enzyme-resistant starch composition which is subjected to said heat treatment comprises an enzyme-resistant starch type III having a melting point of at least about 140° C.

31. A method as claimed in claim 28 wherein the enzyme-resistant starch composition which is subjected to said heat treatment comprises a granular, enzyme-resistant starch.

32. A method as claimed in claim 28 wherein said heat treatment is conducted at a temperature of from about 125° C. to about 135° C.

33. A method for enhancing the baking functionality of an enzyme-resistant starch composition, comprising subjecting said composition to heat treatment at a temperature of from about 100° C. to about 140° C. for a period of time of from about 5 minutes to about 6 hours, the moisture content of said composition during the heat treatment being from about 14% by weight to about 24% by weight.

34. A method as claimed in claim 33 wherein the enzyme-resistant starch composition which is subjected to said heat treatment comprises a retrograded, enzyme-resistant starch.

35. A method as claimed in claim 33 wherein the enzyme-resistant starch composition which is subjected to said heat treatment comprises an enzyme-resistant starch type III having a melting point of at least about 140° C.

36. A method as claimed in claim 33 wherein the enzyme-resistant starch composition which is subjected to said heat treatment comprises a granular, enzyme-resistant starch.

37. A method as claimed in claim 34 wherein said heat treatment is conducted at a temperature of from about 125° C. to about 135° C.

* * * * *